(12) United States Patent
Bartlett et al.

(10) Patent No.: US 12,252,248 B2
(45) Date of Patent: *Mar. 18, 2025

(54) WIRELESS POWER TRANSFER SYSTEM AND METHOD THEREOF

(71) Applicant: Solace Power Inc., Mount Pearl (CA)

(72) Inventors: Andrew Bartlett, Mount Pearl (CA); Shuyan Chen, Mount Pearl (CA); Nagesh Polu, Sunnyvale, CA (US); Mark Snow, Mount Pearl (CA)

(73) Assignee: Solace Power Inc., Mount Pearl (CA)

( * ) Notice: Subject to any disclaimer, the term of this patent is extended or adjusted under 35 U.S.C. 154(b) by 664 days.

This patent is subject to a terminal disclaimer.

(21) Appl. No.: 17/467,586

(22) Filed: Sep. 7, 2021

(65) Prior Publication Data
US 2022/0060053 A1    Feb. 24, 2022

Related U.S. Application Data

(63) Continuation of application No. 16/138,344, filed on Sep. 21, 2018, now Pat. No. 11,139,690.

(51) Int. Cl.
*H02J 50/12*      (2016.01)
*B64C 39/02*      (2023.01)
(Continued)

(52) U.S. Cl.
CPC .......... *B64C 39/024* (2013.01); *H02J 7/0013* (2013.01); *H02J 50/005* (2020.01); *H02J 50/05* (2016.02); *H02J 50/12* (2016.02)

(58) Field of Classification Search
CPC ........ B64C 39/024; B64U 50/34; H02J 50/05; H02J 50/005; H02J 50/12; H02J 7/0013
See application file for complete search history.

(56) References Cited

U.S. PATENT DOCUMENTS 7,330,152 B2    2/2008   Zhang et al.
7,517,769 B2    4/2009   Van Schuylenbergh et al.
(Continued)

FOREIGN PATENT DOCUMENTS

EP    3340432 A1    6/2018

OTHER PUBLICATIONS

International Search Report PCT/ISA/210 and Written Opinion of the International Searching Authority PCT/ISA/237 for International Application No. PCT/CA2019/051342 mailed on Nov. 27, 2019.

(Continued)

*Primary Examiner* — Richard Isla
*Assistant Examiner* — Sadia Kousar
(74) *Attorney, Agent, or Firm* — Harness, Dickey & Pierce, P.L.C.

(57) ABSTRACT

A wireless power transfer system is provided. The wireless power transfer system comprises a resonator comprising a capacitor. The capacitor comprises at least two active electrodes; and a passive electrode adjacent the active electrodes and configured to encompass the active electrodes to at least partially eliminate environmental influences affecting the active electrodes and to increase the overall capacitance of the system. The resonator further comprises at least one inductive coil electrically connected to the active electrodes, wherein the resonator is configured to extract power from a generated electric field via resonant electric field coupling.

20 Claims, 48 Drawing Sheets

(51) Int. Cl.
  *H02J 7/00* (2006.01)
  *H02J 50/00* (2016.01)
  *H02J 50/05* (2016.01)

(56) References Cited

U.S. PATENT DOCUMENTS

| | | | |
|---|---|---|---|
| 8,655,272 B2 | 2/2014 | Saunamaki | |
| 9,653,948 B2 | 5/2017 | Polu et al. | |
| 9,846,183 B2 | 12/2017 | Ichikawa | |
| 9,979,206 B2 | 5/2018 | Nyberg et al. | |
| 11,139,690 B2* | 10/2021 | Bartlett | B64U 30/20 |
| 2002/0041513 A1 | 4/2002 | Lee et al. | |
| 2006/0124740 A1 | 6/2006 | Woodard et al. | |
| 2009/0052111 A1* | 2/2009 | Bultitude | H01G 4/30 29/25.42 |
| 2012/0068550 A1 | 3/2012 | Boer et al. | |
| 2012/0193997 A1* | 8/2012 | Hong | H01Q 7/005 307/104 |
| 2012/0286583 A1* | 11/2012 | Ichikawa | H02J 50/70 307/104 |
| 2013/0270922 A1 | 10/2013 | Kato et al. | |
| 2013/0328416 A1 | 12/2013 | Whitworth et al. | |
| 2014/0009361 A1 | 1/2014 | Kato | |
| 2014/0361639 A1 | 12/2014 | Ichikawa et al. | |
| 2014/0368056 A1 | 12/2014 | Hosotani | |
| 2015/0333538 A1 | 11/2015 | Kusunoki et al. | |
| 2015/0372540 A1 | 12/2015 | Takahashi et al. | |
| 2016/0043570 A1 | 2/2016 | Jeong et al. | |
| 2016/0049232 A1 | 2/2016 | Covic et al. | |
| 2016/0072308 A1* | 3/2016 | Nyberg | H02J 7/0042 307/104 |
| 2016/0315504 A1 | 10/2016 | Ichikawa | |
| 2017/0040690 A1 | 2/2017 | Peralta et al. | |
| 2017/0040691 A1 | 2/2017 | Singh et al. | |
| 2017/0040692 A1 | 2/2017 | Peralta et al. | |
| 2017/0040696 A1 | 2/2017 | Peralta et al. | |
| 2017/0141582 A1 | 5/2017 | Adolf et al. | |
| 2017/0141583 A1* | 5/2017 | Adolf | H02J 50/80 |
| 2017/0141584 A1 | 5/2017 | DeVaul et al. | |
| 2017/0271926 A1 | 9/2017 | Plekhanov et al. | |
| 2017/0338696 A1 | 11/2017 | Bae et al. | |

OTHER PUBLICATIONS

Lu et al: "A Review on the Recent Development of Capacitive Wireless Power Transfer Technology"—Energies 2017 Special Issue Wireless Power Transfer and Energy Harvesting Technologies—Nov. 1, 2017 (Jan. 11, 2017), https://www.mdpi.com/1996-1073/10/11/1752.

Mostafa et al.: "Wireless Battery Charging System for Drones via Capacitive Power Transfer"—2017 IEEE PELS Workshop on Emerging Technologies: Wireless Power Transfer (WoV-I)—Jun. 29, 2017 (Jun. 29, 2017), DOI: 10. I 109/WoW.2017.7959357, https://ieeexplore.ieee.org/abstract/document/7959357.

Liu et al.: "Coupling Study of a Rotary Capacitive Power Transfer System"—2009 IEEE International Conference on Industrial Technology—May 19, 2009 (May 19, 2009) DOI: 10.1109/ICIT.2009.4939623, https://ieeexplore.ieee.org/abstract/document/4939623.

Search Report dated May 12, 2022 issued in corresponding European patent application No. 19861751.6.

* cited by examiner

Efficiency with Passive Electrode

| | 2 | 11.67 | 21.33 | 31 | 40.67 | 50.33 | 60 |
|---|---|---|---|---|---|---|---|
| 1E-04 | 93% | 93% | 93% | 93% | 93% | 93% | 93% |
| 0.001 | 93% | 93% | 93% | 93% | 93% | 93% | 93% |
| 0.01 | 93% | 93% | 93% | 93% | 93% | 93% | 93% |
| 0.1 | 93% | 93% | 93% | 93% | 93% | 93% | 93% |
| 1 | 90% | 92% | 92% | 92% | 93% | 92% | 92% |

Figure 39

Efficiency without Passive Electrode

| | 2 | 11.67 | 21.33 | 31 | 40.67 | 50.33 | 60 |
|---|---|---|---|---|---|---|---|
| 1E-04 | 93% | 93% | 93% | 93% | 92% | 92% | 92% |
| 0.001 | 93% | 93% | 93% | 93% | 92% | 92% | 92% |
| 0.01 | 92% | 93% | 93% | 92% | 92% | 92% | 92% |
| 0.1 | 88% | 90% | 91% | 91% | 91% | 92% | 92% |
| 1 | 63% | 78% | 83% | 86% | 87% | 88% | 89% |

Figure 40

Phase (degrees °) of the Input Impedance with Passive Electrode

| | 2 | 11.67 | 21.33 | 31 | 40.67 | 50.33 | 60 |
|---|---|---|---|---|---|---|---|
| 1E-04 | 1.3 | -0.4 | 2.8 | 3.9 | 3.2 | 3.8 | 6.0 |
| 0.001 | 1.3 | -0.4 | 2.8 | 3.9 | 3.2 | 3.8 | 6.0 |
| 0.01 | 1.4 | -0.4 | 2.8 | 3.9 | 3.2 | 3.8 | 6.0 |
| 0.1 | 1.4 | -0.4 | 2.8 | 3.9 | 3.2 | 3.8 | 6.0 |
| 1 | 0.7 | -3.3 | 2.4 | 4.0 | 3.3 | 3.8 | 5.5 |

Figure 41

Phase of the Input Impedance without Passive Electrode

| | 2 | 11.67 | 21.33 | 31 | 40.67 | 50.33 | 60 |
|---|---|---|---|---|---|---|---|
| 1E-04 | 9.6 | -28.2 | -38.3 | -42.5 | -46.4 | -43.9 | -49.5 |
| 0.001 | 9.6 | -28.2 | -38.3 | -42.5 | -46.4 | -43.9 | -49.5 |
| 0.01 | 9.4 | -28.2 | -38.3 | -42.5 | -46.4 | -43.9 | -49.4 |
| 0.1 | 7.8 | -28.0 | -38.2 | -42.2 | -45.3 | -43.8 | -49.4 |
| 1 | -9.7 | -32.2 | -43.8 | -43.8 | -47.9 | -45.6 | -51.9 |

Figure 42

WIRELESS POWER TRANSFER SYSTEM AND METHOD THEREOF

CROSS-REFERENCE TO RELATED APPLICATIONS

The present application is a continuation of and claims priority under 35 U.S.C. §§ 120/121 to U.S. patent application Ser. No. 16/138,344, filed on Sep. 21, 2018, the entire contents of which is incorporated by reference in its entirety.

FIELD

The subject application relates generally to wireless power transfer systems and methods thereof.

BACKGROUND

A variety of wireless power transfer systems are known. A typical wireless power transfer system includes a power source electrically connected to a wireless power transmitter, and a wireless power receiver electrically connected to a load. Examples of wireless power transfer systems include magnetic and electric wireless power transfer systems.

In magnetic wireless power transfer systems, the transmitter has an induction coil that transfers electrical energy from the power source to an induction coil of the receiver. Power transfer occurs due to coupling of magnetic fields between the induction coils of the transmitter and receiver. While an electric field is present, the magnitude of the electric field is low compared to the magnitude of the magnetic field. Therefore, very little, if any, power is transferred via electric field coupling. The range of these magnetic wireless power transfer systems is limited, and the induction coils of the transmitter and receiver must be in optimal alignment for efficient power transfer. Resonant magnetic wireless power transfer systems also exist, in which power is transferred due to coupling of magnetic fields between the induction coils of the transmitter and receiver. In resonant magnetic wireless power transfer systems, the induction coils are resonated using at least one capacitor. In resonant magnetic wireless power transfer systems very little, if any, power is transferred via resonant or non-resonant electric field coupling. The range of power transfer in resonant magnetic wireless power transfer systems is increased over that of non-resonant magnetic wireless power transfer systems and alignment issues are generally rectified.

In electric wireless power transfer systems, the transmitter and receiver have capacitive electrodes. Power transfer occurs due to coupling of electric fields between the capacitive electrodes of the transmitter and receiver. While a magnetic field is present, the magnitude of the magnetic field is low compared to the magnitude of the electric field. Therefore, very little, if any, power is transferred via magnetic field coupling. Similar to resonant magnetic wireless power transfer systems, resonant electric wireless power transfer systems also exist in which the capacitive electrodes of the transmitter and receiver are made resonant using at least one inductor. In resonant electric wireless power transfer systems very little, if any, power is transferred via resonant or non-resonant magnetic field coupling. Resonant electric wireless power transfer systems have an increased range of power transfer compared to that of non-resonant electric wireless power transfer systems and alignment issues are generally rectified.

Resonant electric and magnetic wireless power transfer systems require that the transmitter and receiver both resonate at the same frequency. This frequency is the resonant frequency of the system. In resonant electric wireless power transfer systems, the reactance of the inductor is balanced by the capacitance of the capacitive electrodes at the resonant frequency. Furthermore, in resonant electric wireless power transfer systems, transmitters and receivers may be tuned to a desired resonant frequency (e.g. 13.56 MHz) by varying the induction of the inductor and/or the capacitance of the capacitive electrodes.

Extraneous conductors and dielectric materials (dielectrics) within the environment influence the electric field generated by a resonant electric wireless power transfer system affecting the range and efficiency of the system. Even if the effects of static extraneous conductors and dielectrics are accounted for, movement of any extraneous conductors and/or dielectrics may impact efficient power transfer.

Specifically, the charge built up on the electrodes of resonant electric wireless power transfer systems interact with charged particles that move freely within extraneous conductors (free charges) in the environment of the system. This effectively turns the conductors into a floating electrode and increases the capacitance of the system. Movement of extraneous conductors with respect to the capacitive electrodes of the system will variably change the capacitance of the system, depending on the relative position of the extraneous conductors and the capacitive electrodes. The change in capacitance changes the resonant frequency of the system, detuning the system. Additionally, the resonant frequency of resonant electric wireless power transfer systems is extremely susceptible to its environment because the capacitance of a capacitor is dependent on the dielectric constants (real part of the relative permittivity) of the media surrounding the electrodes. If the capacitance of the capacitive electrodes of the system changes, for example due to the movement of dielectrics within the surrounding media, the resonant frequency of the system will change.

Dielectrics are made up of polar molecules which self-orientate along an electric field. When an electric field is applied to a dielectric, energy from the electric field rotates the molecules. The polarity of the molecules opposes that of the electric field, decreasing the intensity of the electric field, thereby reducing the transmission range of the wireless power system. The free charges in an extraneous conductor arrange themselves to create an opposing electric field to the electric field generated by the capacitive electrodes of the system. This opposition to the generated electric field reduces the range of the system. Furthermore, the charges in motion within the extraneous conductor dissipate energy as heat due to the resistance of the conductor. When the electric field is removed or reversed some of the rotational energy of the molecules is recovered, while the rest of the energy is lost as heat. The energy lost in the dissipated heat reduces the overall efficiency of the system. The capacity of a dielectric to store and lose energy when an electric field is applied (in comparison to a vacuum) is expressed as the real and imaginary parts of the relative permittivity of the dielectric, respectively.

One of the most common and problematic dielectrics is water. Because of water's high dielectric constant, a small amount of it can have a large impact on the capacitance of a system. The high dielectric constant also means low electric field magnitudes and rapid attenuation of the near field. Water readily dissolves charged particles making it conductive. Furthermore, water generally has at least a small concentration of free charges. Free charges in the water are accelerated by a potential difference from the generated electric field. The acceleration imparted by the electric field extracts energy from the electric field thereby reducing the magnitude of the electric field. At the same time the electric field caused by the reorientation of free charges within water will also oppose the electric field generated by the system. In an outdoor environment, resonant electric wireless power transfer systems will encounter varying amounts of water. Moisture in the air and water in soil may also be present in an uncontrolled outdoor environment. Accordingly, operating a resonant electric wireless power transfer system in outdoor environments can present challenges.

Resonant electric field coupling requires inductors to achieve resonance. Inductors are undesirable as they can be inefficient, intolerant to temperature variations, heavy, and large. It is desirable to minimize the disadvantages of inductors by increasing the capacitance of the system, which reduces the required inductance needed to reach a resonant state.

U.S. Patent Application Publication No. 2015/0333538 to Kusunoki et al. discloses a rectangular-hexahedron metallic enclosure that surrounds a transmit-resonator or receive-resonator to remove environmental effects. The rectangular cuboid structure has one open face to allow field coupling. The depth of the enclosure must be at least half the transmission distance. Such a casing can be bulky and does not significantly reduce the required inductance to achieve resonance. Furthermore, manufacturing such an enclosure can be costly in large volumes.

It is therefore an object to at least partially mitigate the disadvantages identified.

SUMMARY

Accordingly, in one aspect there is provided a wireless power transfer system comprising: a resonator comprising: a capacitor comprising: at least two active electrodes; and a passive electrode adjacent the active electrodes and configured to encompass the active electrodes to at least partially eliminate environmental influences affecting the active electrodes; and at least one inductive coil electrically connected to the active electrodes, wherein the resonator is configured to generate an electric field to transfer power or to extract power from a generated electric field.

In one embodiment, the passive electrode provides additional capacitance to the capacitor of the resonator and lowers the inductance of the inductive coil required to resonate the system.

In another embodiment, the resonator forms part of a transmitter configured to wirelessly transfer power, and wherein the resonator is configured to generate the electric field. In another embodiment, the resonator is configured to generate a resonant electric field. In another embodiment, an area of the passive electrode is greater than an area of the active electrodes of the transmit resonator by at least the area between the active electrodes of the transmit resonator.

In another embodiment, the resonator is a transmit resonator, and the system further comprises a receive resonator comprising at least two active electrodes.

In another embodiment, the resonator forms part of a receiver configured to wirelessly extract power, and wherein the resonator is configured to extract power from the generated electric field via resonant electric field coupling. In another embodiment, the resonator is configured extract power from a generated resonant electric field.

In another embodiment, the active electrodes are elongate plates. In another embodiment, the passive electrode have a width greater than or equal to two times the width of one of the active electrodes plus the lateral gap between the active electrode, and a length greater than or equal to the length of one of the active electrodes.

In another embodiment, the active electrodes are concentric.

In another embodiment, at least one of the active electrodes is a disc or a ring.

In another embodiment, the passive electrode is an elongate plate or a disc.

In another embodiment, the passive electrode is a ring with an inner radius that is less than or equal to the inner radius of an inner active electrode.

In another embodiment, the passive electrode comprises dissipative material affixed to edges of the passive electrode and/or along the perimeter of the passive electrode.

In another embodiment, the inductive coil is located on the opposite side of the passive electrode relative to the active electrodes, and the inductive coil is electrically connected to the active electrode through a hole in the passive electrode.

In another embodiment, the capacitor further comprises: a substrate upon which the active electrodes are affixed; and an actuator extending between the substrate and the passive electrode, the actuator controllable to vary a separation distance between the active electrodes and the passive electrode. In another embodiment, the capacitor further comprises: at least two telescopic supports extending between the substrate and the passive electrode, the supports configured to extend or telescope as the separation distance between the active electrodes and the passive electrode is varied. In another embodiment, actuation of the actuator is controlled by a microcontroller.

In another embodiment, the passive electrode is grounded.

In another embodiment, the passive electrode is ungrounded.

According to another aspect there is provided an unmanned aerial vehicle (UAV) comprising: a frame; a propulsion system mounted to the frame and configured to provide lift and thrust of the UAV; a power system mounted to the frame and configured to power the propulsion system, the power system comprising: a resonator comprising: a capacitor comprising: at least two active electrodes; and a passive electrode adjacent the active electrodes and configured to encompass the active electrodes to at least partially eliminate environmental influences affecting the active electrodes, wherein the passive electrode is opposite an electric field source relative to the active electrodes; and at least one inductive coil electrically connected to the active electrodes, wherein the resonator is configured to extract power from a generated electric field via resonant electric field coupling; and a control system mounted to the frame configured to control the propulsion system and the power system.

According to yet another aspect there is provided a wireless power transfer system the UAV as previously described; and a transmit resonator comprising: at least two active electrodes; and at least one inductive coil electrically connected to the active electrodes, wherein the transmit resonator is configured to generate an electric field to transfer power to the UAV via resonant electric field coupling.

BRIEF DESCRIPTION OF THE DRAWINGS

Embodiments will now be described more fully with reference to the accompanying drawings in which:

FIG. 39 is a table showing the RF efficiency versus dielectric properties for the transmitter and receiver of FIG. 38;

FIG. 40 is a table showing the RF efficiency versus dielectric constants for the transmitter and receiver of FIG. 38;

FIG. 41 is a table showing the phase of the impedance seen by power the power supply versus dielectric properties for the transmitter and receiver of FIG. 38;

FIG. 42 is a table showing the phase of the impedance seen by power the power supply versus dielectric constants for the transmitter and receiver of FIG. 38;

DETAILED DESCRIPTION OF EMBODIMENTS

Figure 1:
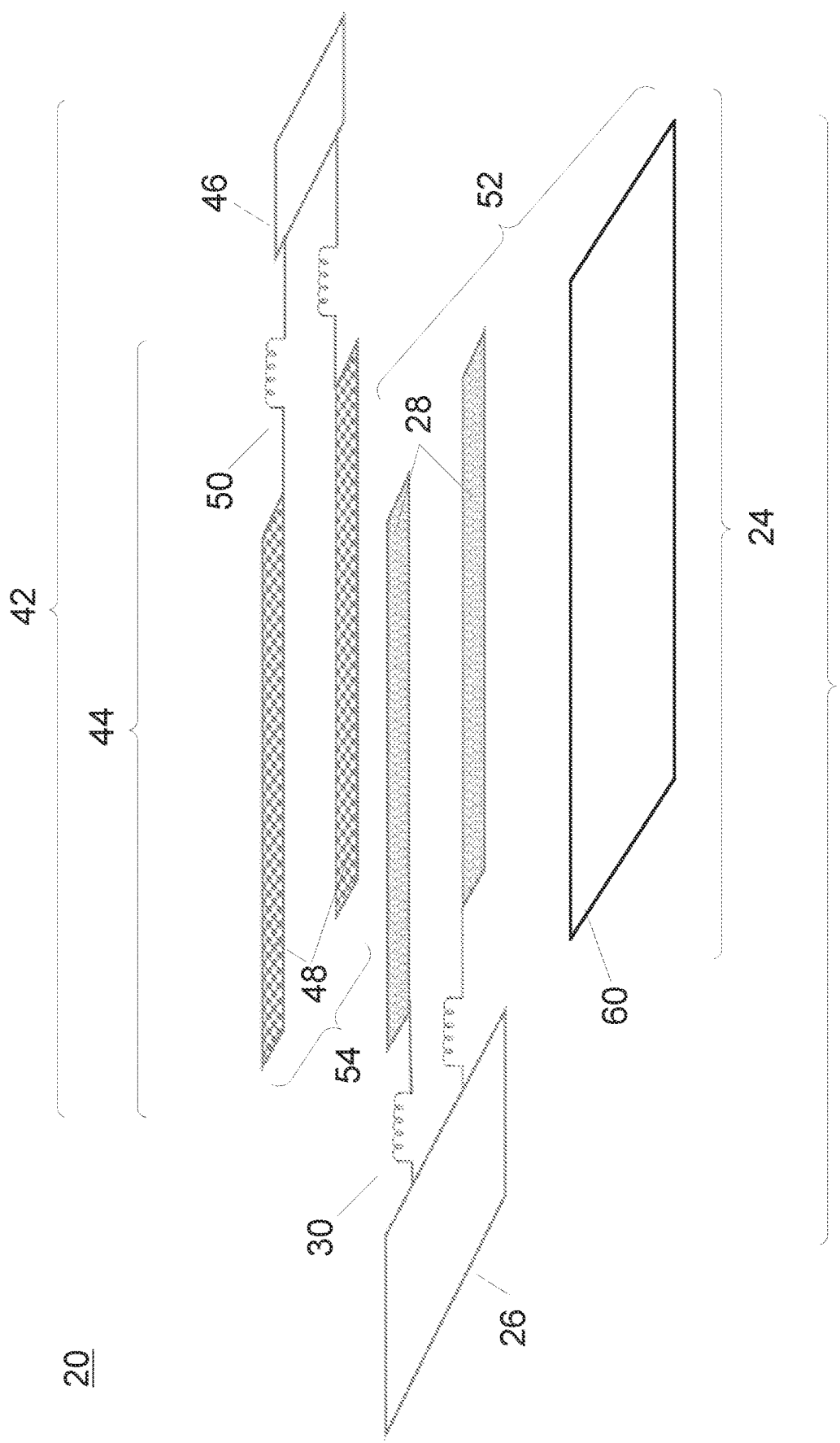
FIG. 1 is a schematic layout of a wireless power transfer system in accordance with an aspect of the disclosure.

The foregoing summary, as well as the following detailed description of certain examples will be better understood when read in conjunction with the appended drawings. As used herein, an element or feature introduced in the singular and preceded by the word "a" or "an" should be understood as not necessarily excluding the plural of the elements or features. Further, references to "one example" or "one embodiment" are not intended to be interpreted as excluding the existence of additional examples or embodiments that also incorporate the described elements or features. Moreover, unless explicitly stated to the contrary, examples or embodiments "comprising" or "having" or "including" an element or feature or a plurality of elements or features having a particular property may include additional elements or features not having that property. Also, it will be appreciated that the terms "comprises", "has", "includes" means "including by not limited to" and the terms "comprising", "having" and "including" have equivalent meanings. It will also be appreciated that like reference characters will be used to refer to like elements throughout the description and drawings.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, and/or designed for the purpose of performing the function. It is also within the scope of the subject application that elements, components, and/or other subject matter that is described as being adapted to perform a particular function may additionally or alternatively be described as being configured to perform that function, and vice versa. Similarly, subject matter that is described as being configured to perform a particular function may additionally or alternatively be described as being operative to perform that function.

It will be understood that when an element is referred to as being "on," "attached" to, "connected" to, "coupled" with, "contacting," etc., another element, it can be directly on, attached to, connected to, coupled with or contacting the other element or intervening elements may also be present.

Unless defined otherwise, all technical and scientific terms used herein have the same meaning as is commonly understood by one of skill in the art to which the subject disclosure pertains.

Turning now to FIG. 1, a wireless power transfer system is shown and is generally identified by reference numeral 20. The wireless power transfer system 20 comprises a resonator. The resonator comprises a capacitor 52 and two inductive coils 30. The capacitor 52 comprises two active electrodes 28 and a passive electrode 60 adjacent the active electrodes 28. The passive electrode 60 is configured to encompass the active electrodes 28 to at least partially eliminate environmental influences affecting the active electrodes 28. The passive electrode 60 is configured to provide additional capacitance to the system. The passive electrode 60 is configured to lower the inductance required to achieve resonance. Each inductive coil 30 is electrically connected to an active electrode 28.

For the purposes of the subject application, the passive electrode 60 is said to encompass the active electrodes 28 when at least one of the following: (i) if the areas defined by the perimeters of the active electrodes 28 are projected onto the area of the passive electrode 60, the projection is entirely within the area of the passive electrode 60; (ii) the projected areas of the active electrodes 28 are circumscribed by the area of the passive electrode 60; and (iii) the area of the passive electrode 60 is greater than the total area defined by the perimeters of the active electrodes 28 by at least the area between the active electrodes 28.

The passive electrode 60 is placed between the active electrodes 28 and the environment. The passive electrode at least partially eliminates environmental influences affecting the active electrodes 28 by presenting the active electrodes with a generally constant environment, despite the actual environment located on the side of the passive electrode 60 opposite to the active electrodes 28.

The passive electrode 60 increases the capacitance of the capacitor 52. This increase in capacitance lowers the required inductance of the inductive coils to achieve resonance at a particular frequency.

In this embodiment, the resonator is a transmit resonator 24. The transmit resonator 24 forms parts of a transmitter 22. The transmit resonator 24 is configured to generate an electric field to transfer power as will be described. The transmitter 22 comprises a power source 26 electrically connected to the transmit resonator 24. Specifically, the power source 26 is electrically connected to the inductive coils 30 of the transmit resonator 24.

In this embodiment, the components of the transmit resonator 24 are configured to operate in the near field as will be described. Therefore, the passive electrode 60 is configured to operate in the near field.

In this embodiment, the power source 26 is an RF power source that outputs a source signal. The source signal is a generally sinusoidal signal. For example, in this embodiment, the frequency of the source signal is 13.56 MHz.

While two inductive coils 30 have been shown as being connected in series to the power source 26, one of skill in the art will appreciate that a single inductive coil 30 may be used for both active electrodes 28 of the transmit resonator 24. In this embodiment, the single inductive coil 30 is electrically connected to the power source 26 and the active electrodes 28 in parallel.

Each active electrode 28 is electrically connected to an inductive coil 30 that is electrically connected to the power source 26. The capacitor 52 is configured to resonate with the inductive coil 30 to generate an electric field to transfer power as will be described.

In this embodiment, the active electrodes 28 of the transmit resonator 24 are laterally spaced. The active electrodes 28 are coplanar. The active electrodes 28 are conductors. In this embodiment, the conductors are elongate and generally rectangular planar plates. The conductors are formed of copper foil tape. While two active electrodes 28 are depicted, one of skill in the art will appreciate that more active electrodes 28 may be used. The use of copper foil tape in this embodiment is not meant to limit the scope or spirit of the disclosure, as one of skill in the art will appreciate that other conductive materials may be used, such as, but not limited to, aluminum foil or a printed circuit board (PCB).

In this embodiment, the passive electrode 60 comprises an elongate element. The elongate element is formed of electrically conductive material. The elongate element is in the form of a generally rectangular, planar plate with opposed major surfaces.

The passive electrode 60 is adjacent the active electrodes 28. The passive electrode 60 encompasses the active electrodes 28. The passive electrode 60 and the active electrodes 28 form the capacitor 52. In this embodiment, the passive electrode 60 is generally parallel to the active electrodes 28. The active electrodes 28 and the passive electrode 60 are in generally parallel planes.

In this embodiment, the passive electrode 60 is ungrounded. The passive electrode 60 is isolated.

In this embodiment, the passive electrode 60 is non-radiating.

In another embodiment, the passive electrode 60 is grounded.

In another embodiment, the passive electrode 60 is not isolated.

In this embodiment, the passive electrode 60 is electrically small. The passive electrode 60 is electrically small when the physical length of the passive electrode 60 is less than λ/10. λ is the wavelength of the source signal from a power source. For the source signal with a frequency of 13.56 MHz output by the power source 26, λ is approximately 22 m. Therefore, the passive electrode 60 is electrically small when the physical length of the passive electrode 60 is less than approximately 2.2 m.

The thickness of the passive electrode 60 is limited by the skin depth (d) of the current. The skin depth (d) is the depth below the surface of a conductor where the current is decreased by a factor of $e^{-1}$ in comparison to the surface current. The skin depth (d) is dependent on the conductivity (σ) and permeability (μ) of the passive electrode 60 and the frequency of the current (ω). It is defined by the following equation:

$$d = \sqrt{\frac{2}{\omega \sigma \mu}}$$

The passive electrode 60 should be at least five times as thick as the skin depth to allow current to flow unimpeded on both major faces of the passive electrode 60.

In this embodiment, the wireless power transfer system 20 further comprises a receiver 42. The receiver 42 comprises a receive resonator 44 electrically connected to a load 46. The receive resonator 44 is tuned to the resonant frequency of the transmit resonator 24. The receive resonator 44 comprises two active electrodes 48 and two inductive coils 50. The inductive coils 50 are electrically connected to the active electrodes 48 and electrically connected in series to the load 46. The load 46 comprises a device that requires power. For example, the load 46 comprises a battery.

While two inductive coils 50 have been shown as being connected in series to the load 46, one of skill in the art will appreciate that a single inductive coil 50 may be used for both active electrodes 48 of the receive resonator 44.

In this embodiment, two inductive coils 50 are electrically connected to the load 46 and the active electrodes 48 of the receive resonator 44 in parallel. One of skill in the art will also appreciate that more than two inductive coils 50 could be connected in series to the load 46.

Each active electrode 48 is electrically connected to an inductive coil 44 that is electrically connected to the load 46. The active electrodes 48 are configured to resonate with the inductive coils 44 to extract power from the transmitter 22 via resonant electric field coupling as will be described.

In this embodiment, the active electrodes 48 of the receive resonator 44 are laterally spaced. The active electrodes 48 are coplanar. The active electrodes 48 are parallel to the active electrodes 28 of the transmit resonator 24. The active electrodes 48 are conductors. In this embodiment, the conductors are elongate and generally rectangular planar plates. The conductors have opposite major surfaces. The conductors are formed of copper foil tape.

While two active electrodes 48 are depicted, one of skill in the art will appreciate that more active electrodes 48 may be used. While copper foil tape is referenced, one of skill in the art will appreciate that other conductive materials may be used including, but not limited to, aluminum or a PCB.

While the active electrodes 28 and 48 have been described as laterally spaced, elongate and generally planar rectangular plates, one of skill in the art will appreciate that other configurations are possible including, but not limited to, concentric, coplanar, circular, elliptical, disc, etc., electrodes. Other suitable electrode configurations are described in U.S. patent application Ser. No. 14/846,152 filed on Sep. 4, 2015, now issued as U.S. Pat. No. 9,979,206 on May 22, 2018, the relevant portions of which are incorporated herein by reference.

Other components may be connected to the load 46 but are not pictured in FIG. 1. These include, but are not limited to, a rectifier and a regulator.

Some of the components of the wireless power transfer system 20 are described in U.S. patent application Ser. No. 13/607,474 to Polu et al. filed on Sep. 7, 2012, now issued as U.S. Pat. No. 9,653,948 on May 16, 2017, the relevant portions of which are incorporated herein by reference.

Figure 2:
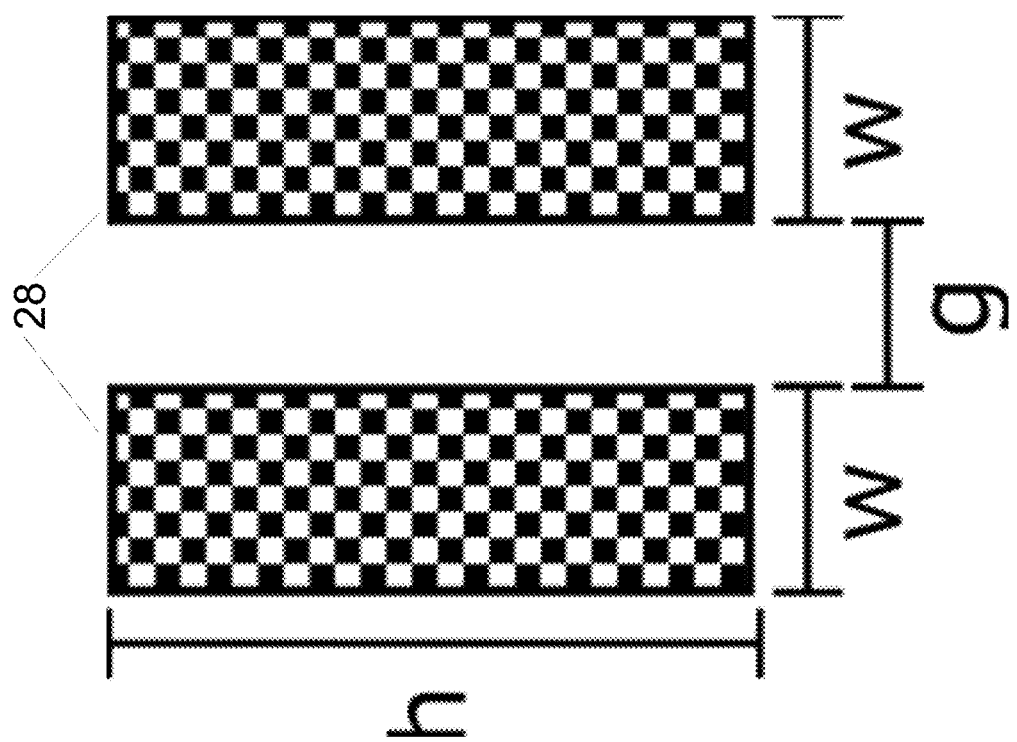
FIG. 2 is a plan view of active electrodes of a transmit resonator of the wireless power transfer system of FIG. 1.

While the active electrodes 28 and passive electrode 60 have been generally described, specific dimensions and configurations are further described for use in testing and simulation. Turning now to FIG. 2, a plan view of the active electrodes 28 of the transmit resonator 24 is shown. As previously stated, in this embodiment the active electrodes 28 are coplanar. The active electrodes 28 are elongate and generally rectangular planar plates. Each plate has a length of h=100 mm and a width of w=50 mm. The lateral gap g between the plates is 50 mm. As previously stated, the passive electrode 60 is parallel with the active electrodes 28. The separation between the passive electrode 60 and the active electrodes 28 is 6 mm. While the active electrodes 28 of the transmit resonator 24 are shown, the active electrodes 48 of the receive resonator 44 have the same dimensions.

As previously stated, in this embodiment the active electrodes 28 of the transmit resonator 24 are parallel with the active electrodes 48 of the receive resonator 44. The separation between the active electrodes 28 of the transmit resonator 24 and the active electrodes 48 of the receive resonator 44 is 75 mm. One of skill in the art will appreciate that while the active electrodes 28 of the transmit resonator 24 are parallel with the active electrodes 48 of the receive resonator 44 in this embodiment, other configurations are possible in which the active electrodes 28 of the transmit resonator 24 are not parallel with the active electrodes of the receive resonator 44.

Figure 3:
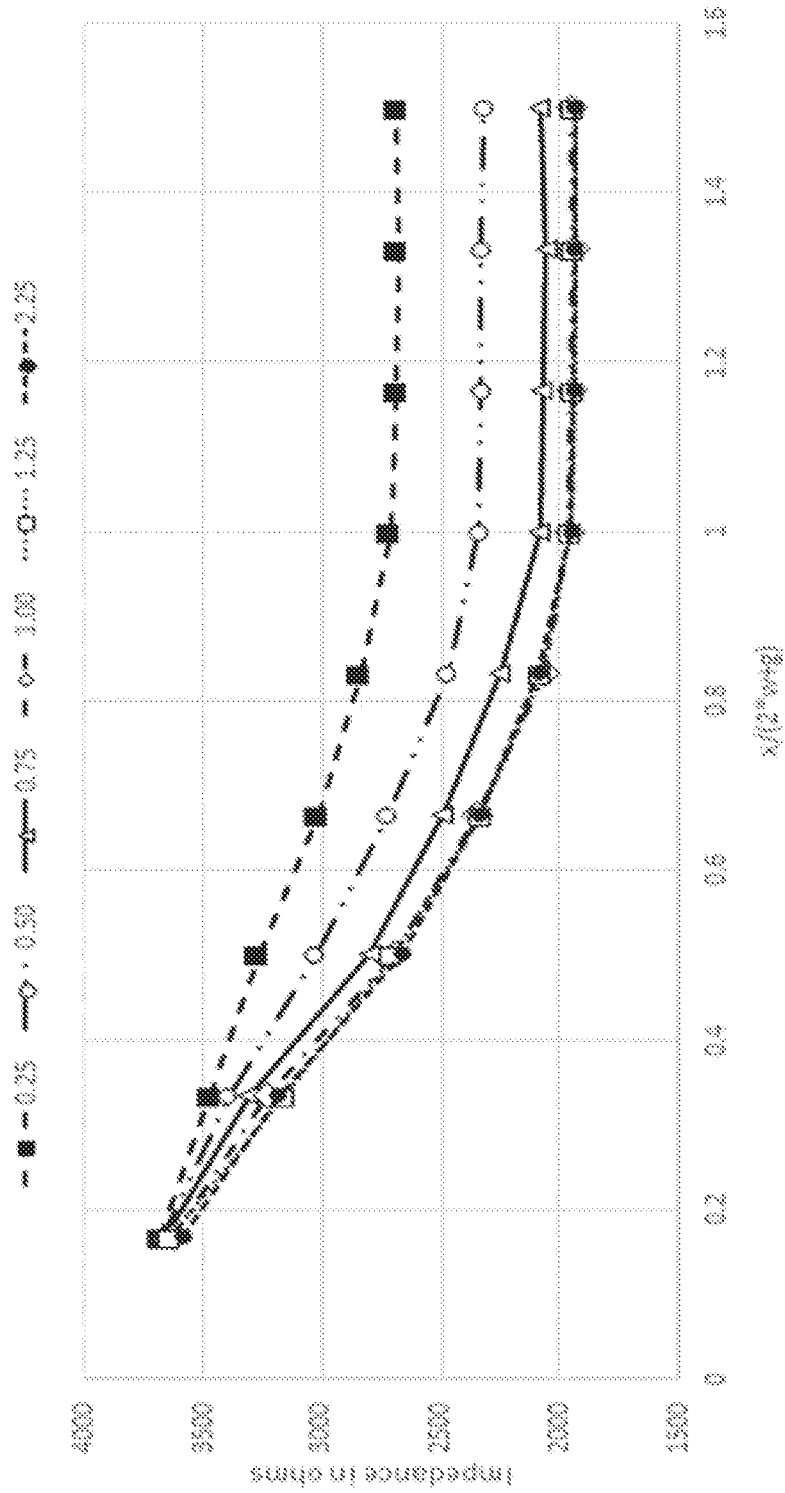
FIG. 3 is a graph of self-impedance of the active electrodes of the transmit resonator of the wireless power transfer system of FIG. 1 versus dimensionless width of a passive electrode of the wireless power transfer system for different passive electrode lengths.
Figure 4:
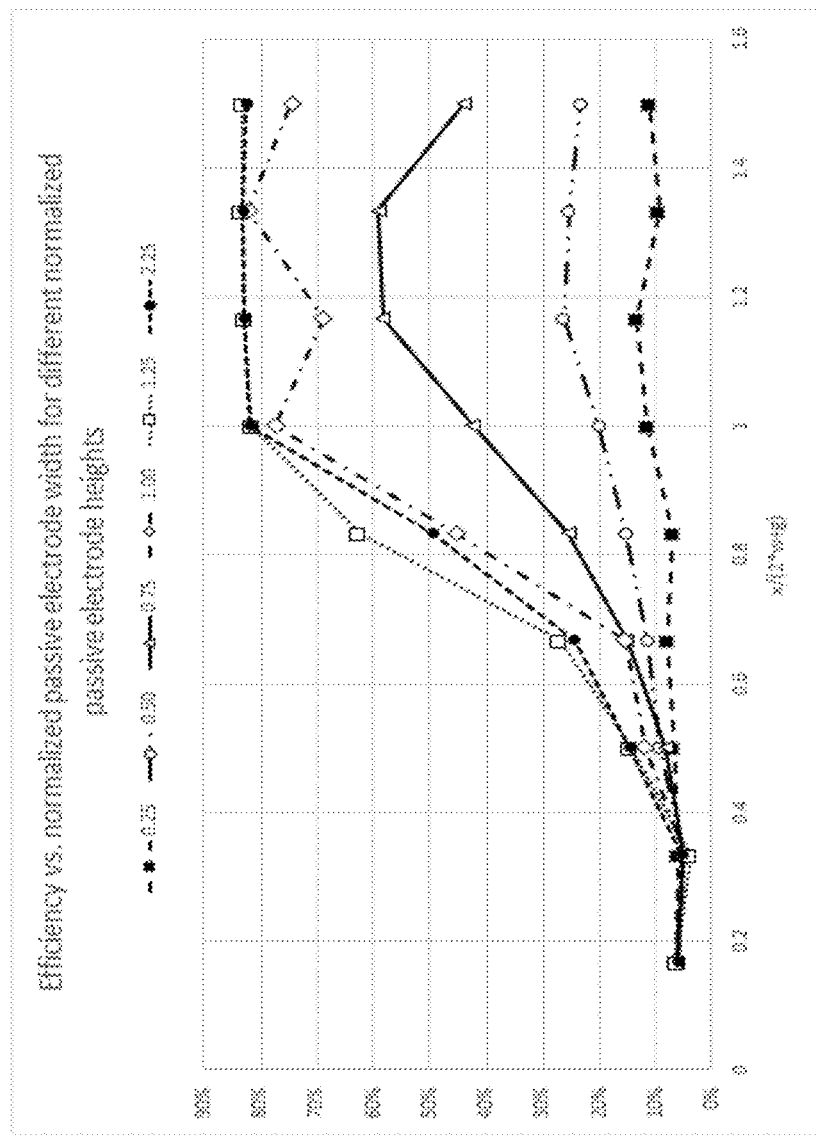
FIG. 4 is a graph of radio frequency (RF) efficiency of the wireless power system of FIG. 1 versus the dimensionless width of a passive electrode of the wireless power transfer system for different passive electrode lengths.

In this embodiment the passive electrode 60 has width (x) and length (y). Simulations were conducted with the active electrodes 28 and the passive electrode 60 with the above noted dimensions. The results of these simulations are depicted in FIGS. 3 and 4. FIG. 3 is a graph depicting the relationship between the ratio (x/(2*w+g)) and the self-impedance of the transmit resonator 24 for different length ratios (y/h) is shown. The different curves shown in the graph have different lengths (y), which are shown in the legend as a ratio of length (y) of the passive electrode 60 to the length (h) of the active electrodes 60. As the ratio (y/h) increases from 0.25 to 1.00, the self-impedance of the transmit resonator 24 increases; however, increasing this ratio beyond (y/h)=1 does not further increase the influence of the passive electrode 60 on the self-impedance of the transmit resonator 24. When the ratio (x/(2*w+g)) is greater than or equal to 1 the self-impedance of the transmit resonator 24 remains constant. When the length (y) of the passive electrode 60 is smaller than the length (h) of the active electrodes 28 and the width (x) of the passive electrode 60 is smaller than the value (2*w+g) the passive electrode 60 no longer encompasses the active electrodes 28 of the transmit resonator 24; therefore, the self-impedance of the transmit resonator 24 is susceptible to environmental influences. Thus, the passive electrode 60 has a minimum length (y) equal to the length (h) of the active electrodes 28. The passive electrode 60 has a minimum width (x) equal to the value (2*w+g). Thus, for the active electrodes 28 with a width (w) of 50 mm, a lateral gap (g) of 50 mm and a length (y) of 100 mm, the length (h) of the passive electrode 60 is 100 mm and the width (x) of the passive electrode 60 is 150 mm.

FIG. 4 is a graph depicting the relationship between the ratio of the width (x/(2*w+g)) of the passive electrode 60 and the RF efficiency of the system 20 for different length ratios (y/h) is shown. The RF efficiency of the system 20 is defined as the efficiency of the wireless power transfer between the transmit resonator 24 and the receive resonator 44. The RF efficiency does not take into account inefficiencies in other components present in the system 20 such as the power source 26 and the load 46. The different curves shown in the graph have different lengths (y), which are shown in the legend as a ratio of length (y) of the passive electrode 60 to the length (h) of the active electrodes 28. As the ratio (y/h) increases from 0.25 to 1.25, the RF efficiency of the system 20 increases. As shown in FIG. 4, increasing the ratio (y/h) beyond 1.25 materially increases the RF efficiency of the system 20. Furthermore, as shown in FIG. 4, when the width (x) of the passive electrode 60 is greater than two times the width (w) of the active electrodes 28 plus the lateral gap (2*w+g) and the length (y) of the passive electrode 60 is greater than the length (h) of the active electrode 28, the RF efficiency of the system 20 remains relatively constant. The RF efficiency stabilizes for a passive electrode 60 that has a length (y) that is greater than the length (h) of the active electrodes 28 and a width (x) that is greater than the value (2*w+g).

Based on the relationships depicted in the graphs of FIGS. 3 and 4, for the RF efficiency of the system 20 in this embodiment to exceed approximately 80% and for the self-impedance of the transmit resonator 24 to be less than or equal to approximately 2700Ω, the passive electrode 60 must have a length (y) that exceeds the length (h) of the active electrode 28 and a width (x) that exceeds the value (2*w+g). Generally, when the active electrodes 28 of the transit resonator 24 are coplanar elongated parallel plates, such that they can be described by FIG. 2, an effective passive electrode 60 will have a width (x) greater than or equal to the value (2*w+g) and a length (y) greater than or equal to the length (h) of the active electrode 28.

While the system 20 has been generally described and particular dimensions have been provided for the active electrodes 28 and passive electrode 60, one of skill in the art will appreciate that variations are possible. Furthermore, particular values of the components of the systems 20 are provided for use in testing and simulation. In another embodiment of the active electrodes 28 of the transmit resonator 24 shown in FIG. 2, each plate of the active electrodes 28 has a length of h=100 and a width of w=37.5 mm. The lateral gap g between the plates is 25 mm. Furthermore, in this embodiment, the passive electrode 60 has a width x=120 mm and a length y=120 mm. The active electrodes 48 of the receive resonator 44 have the same dimensions as the active electrodes 28 of the transmit resonator 24. The separation distance between the active electrodes 28 of the transmit resonator 24 and the active electrodes 48 of the receive resonator 44 is D=20 mm. The separation distance between the active electrodes 28 of the transmit resonator 24 and the passive electrode 60 is D1=2 mm.

Furthermore, in this embodiment the inductance of the inductors 30 of the transmit resonator 24 is 12.7 µH. In this embodiment the transmit resonator 24 has a quality factor of 250 (Q=250). The efficiency of the system 20 is 93%. The system 20 has an input impedance of Zin=70Ω. The input impedance is the impedance of the system 20 looking into the transmitter 22.

As previously described, the passive electrode 60 reduces the required inductance of the system 20. Removing the passive electrode 60 from the system 20 results in an increase in the required inductance. Specifically, in this embodiment removing the passive electrode 60 from the system 20 results in an increase in the inductance of the inductors 30 of the transmit resonator 24 from 12.7 µH to 63 µH. To maintain an acceptable quality factor of at least 30 (Q>30) the required size of the inductors 30 with an inductance of 63 µH would be prohibitive to the system 20. This is especially true if the system 10 is transferring more than 1 W.

The efficiency of the system 20 with the passive electrode 60 removed is 88%. The system 20 with the passive electrode 60 removed has an input impedance Zin=12.5 kΩ. This input impedance Zin with the passive electrode 60 removed is too large for meaningful power transfer (>1 W), as the output of the power source 26 will be limited by its maximum output voltage. Thus, a power source 26 rated to 1.25 is required to power the system 20. Most highly efficient RF power sources (>80% efficiency, such as class D inverts) are designed to operate in the range of 10-100Ω. Therefore, these RF power sources would not be suitable for a system 20 with such a large input impedance. Thus, the passive 60 electrode decreases the input impedance Zin. Specifically, in this embodiment, the passive electrode 60 decreases the input impedance Zin of the system 20 from 12.5 kΩ to 80Ω.

Figure 5:
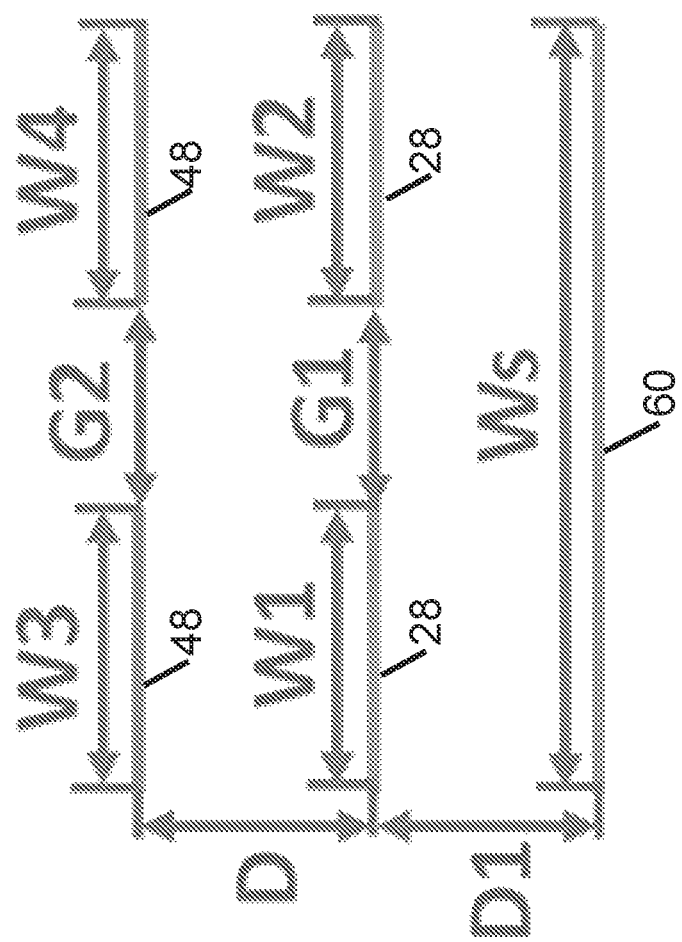
FIG. 5 is an end view of elements of the wireless power transfer system of FIG. 1.

While particular dimensions have been provided for the active electrodes 28 and 48, and the passive electrode 60, one of skill in the art will appreciate that variations are possible. Turning now to FIG. 5, an end view of the active electrodes 28 of the transmit resonator 24, the active electrodes 48 of the receive resonator 44 and the passive electrode 60 is shown. W1 and W2 represent the widths of the active electrodes 28 of the transmit resonator 24. G1 represents the lateral gap between the two active electrodes 28 of the transmit resonator 24. W3 and W4 represent the widths of the active electrodes 48 of the receive resonator 44. G2 represents the lateral gap between the two active electrodes 48 of the receive resonator 44. D represents the separation distance between the active electrodes 28 of the transmit resonator 24 and the active electrodes 48 of the receive resonator 44. Ws represents the width of the passive electrode 60. D1 represents the separation distance between the active electrodes 28 of the transmit resonator 24 and the passive electrode 60. In this embodiment, the active electrodes 28 of the transmit resonator 24, the active electrodes 48 of the receive resonator 44 and the passive electrode 60 are all in parallel planes. Furthermore, in this embodiment, W1=W2=W3=W4=2 inches, G1=G2=1 inch, D=D1=1 inch, and the length L of the electrodes (28, 48 and 60) into the page is 33 inches.

Figure 6:
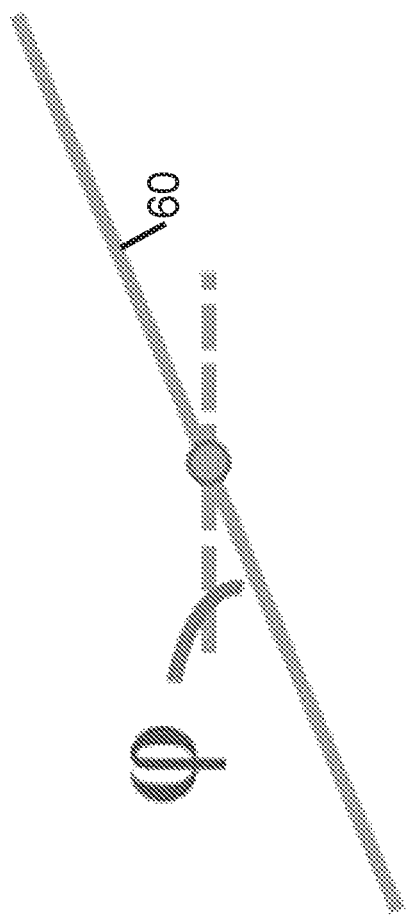
FIG. 6 is an end view of a passive electrode of the wireless power transfer system of FIG. 1.

Turning now to FIG. 6, an end view of the passive electrode 60 is shown. The angle of rotation of the passive electrode 60 relative to a plane parallel to the plane of the active electrodes 28 of the transmit resonator 24 is represented by φ. The angle of rotation (φ) represents a lengthwise or a widthwise rotation of the passive electrode 60. In this embodiment, the angle of rotation (φ) represents a lengthwise rotation of the passive electrode 60. Varying the angle of rotation (φ) effects system parameters as will be described.

During operation, power is transferred from the power source 26 to the active electrodes 28 via the inductive coils 30 of the transmit resonator 24. The source signal from the power source 26 that is transmitted to the active electrodes 28 via the inductive coils 30 excites the transmit resonator 24 causing the transmit resonator 24 to generate an electric field. In this embodiment, the generated electric field is a near field. A differential voltage is applied on the active electrodes 28 of the transmit resonator 24, which creates an electric field in the surrounding environment. When the receive resonator 44 is placed within the generated electric field and in tune with the resonant frequency of the transmit resonator 24, the receive resonator 44 extracts power from the transmit resonator 24 via resonant electric field coupling. The extracted power is then transferred from the receive resonator 44 to the load 46 via inductive coils 50. While the transmit resonator 24 generates a magnetic field, little, if any, power is transferred via magnetic field coupling.

As the power transfer is highly resonant, the active electrodes 28 and 48 of the transmit and receive resonators 24 and 44, respectively, need not be as close together or as well aligned as is the case with a non-resonant electric wireless power transfer system.

As previously stated, the passive electrode 60 serves to reduce environmental influences on the active electrodes 28 of the transmit resonator 24 such that the active electrodes 28 are presented with a generally constant environment regardless of the actual environment that lies on the other side of the passive electrode 60 relative to the active electrodes 28. A surface charge is induced on the passive electrode 60 instantaneously in response to the electric field generated by the transmit resonator 24. For metals (e.g. copper and aluminum), alloys (e.g. steel and brass) and other conductors like graphene or conducting fabrics the charge dissipation time is on the order of $10^{-19}$ s. The oscillation period of the electric field is approximately $10^{-9}$ s when the resonant frequency of the system 20 is 13.56 MHz. Thus, the charge dissipation time is many orders of magnitude less than the oscillation period of the electric field. Thus, the charge redistribution can be thought as being instantaneous.

The induced surface charge creates its own electric field that counteracts the electric field generated by the transmit resonator 24, as negatively charged particles will be drawn to areas on the surface of high potential where their presence will neutralize the electric field parallel to the surface. Consequently, the net electric field acting on a major surface of the passive electrode 60 adjacent the active electrodes 28 is perpendicular to the surface of the passive electrode 60. Thus, the electric field generated by the transmit resonator 24 terminates at the passive electrode 60 and does not circumvent the passive electrode 60. The conducting surface of the passive electrode 60 opposite the active electrodes 28 of the transmit resonator 24 acts as a boundary to the electric field generated by the passive electrode 60. Therefore, a change in the environment on the opposite side of the passive electrode 60 does not influence the electric field on other side.

As previously stated, the electric field generated by the transmit resonator 24 induces a surface charge on the passive electrode 60. Thus, the passive electrode 60 provides additional capacitance to the capacitor 52 of the transmit resonator 24 compared to a capacitor comprised of the active electrodes 28 without the passive electrode 60. The net electric field at the surface of the passive electrode 60 acts as an energy storage medium for the capacitor 52 of the transmit resonator 24. In this way, the active electrodes 28 of the transmit resonator 24 and the passive electrode 60 form the capacitor 52 with a capacitance greater than that of a capacitor comprising just the active electrodes 28.

The additional capacitance provided by the capacitor 52 formed by the active electrodes 28 and the passive electrode 60 reduces the amount of inductance needed to resonate at the resonant frequency. As previously stated, in this embodiment, the inductive coils 30 and 50 of the transmit and receive resonators 24 and 44, respectively, are ferrite core inductors. Commonly used ferrite-based inductors are heavy, lossy, and limit power due to core saturation and heating. Therefore, it is desirable to reduce the required inductance of inductor coils 30 and 50. The additional capacitance of capacitor 52 provided by the passive electrode 60 reduces the required inductance for each inductive coil 30 and 50. The closer the passive electrode 60 is to the active electrodes 28 of the transmit resonator 24, the greater the capacitance that is added to the capacitor 52 of the transmit resonator 24 and therefore the greater the reduction of the required inductance for the inductive coils 30 and 50.

However, as previously described, the surface charge induced on the passive electrode 60 creates an electric field opposing the electric field generated by the transmit resonator 24. The closer the passive electrode 60 is to the active electrodes 28 of the transmit resonator 24, the greater the opposing electric field which reduces the strength of the electric field generated by the active electrodes 28 of the transmit resonator 24. This reduces the potential range of the electric field generated by the transmit resonator 24, which therefore requires the receive resonator 44 to be closer to the transmit resonator 24 as the coupling field is weaker.

Therefore, a designer of the system 20 may balance the desired inductance of the inductive coils 30 and 50, the desired distance between the transmit resonator 24 and the receive resonator 44 and the desired additional capacitance added to the capacitor 52 of the transmit resonator 24. Depending on the application in which the system 20 will be used, the distance between the passive electrode 60 and the active electrodes 28 of the transmit resonator 24 may be altered to achieve the desired inductance, distance between resonators and additional capacitance.

Furthermore, as will be appreciated, the distance between the passive electrode 60 and the active electrodes 28 is selected to achieve the desired balance between capacitance of the capacitor 52 and the strength of the coupling field. The balance between capacitance of the capacitor 52 and the strength of the coupling field may be varied depending on the particular application of the system 20.

Without the passive electrode 60 the active electrodes 28 of the transmit resonator 24 may not provide adequate capacitance to resonate at the resonant frequency unless bulky inductors 30 are added that may double the weight of the system 20 which renders the system 20 impractical. As described above, placing the passive electrode 60 near the active electrodes 28 of the transmit resonator 24 increases the capacitance and lowers the required inductance. Smaller inductors 30 can provide the reduced inductance and reduce the overall system 20 weight compared to systems 20 that do not comprise the passive electrode 60.

Figure 7:
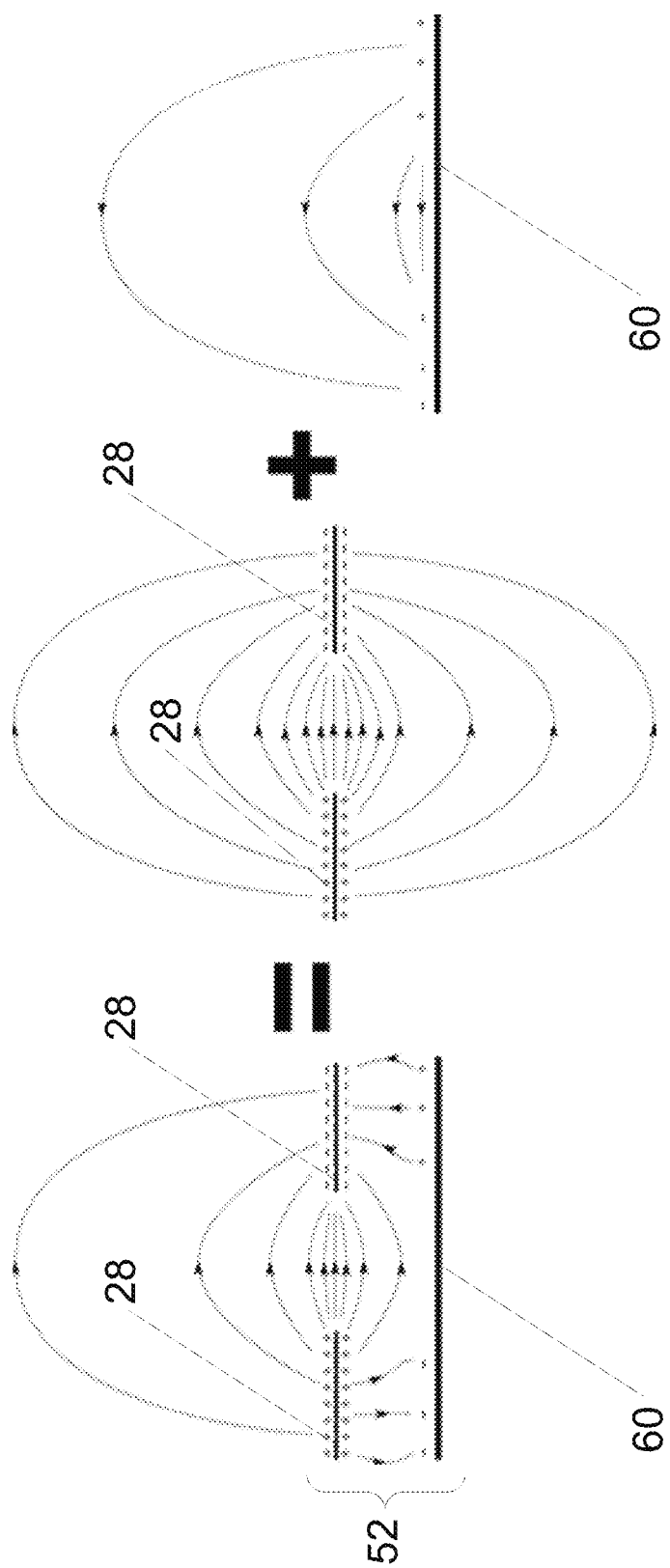
FIG. 7 is an electric field diagram of elements of the wireless power transfer system of FIG. 1.
Figure 8:
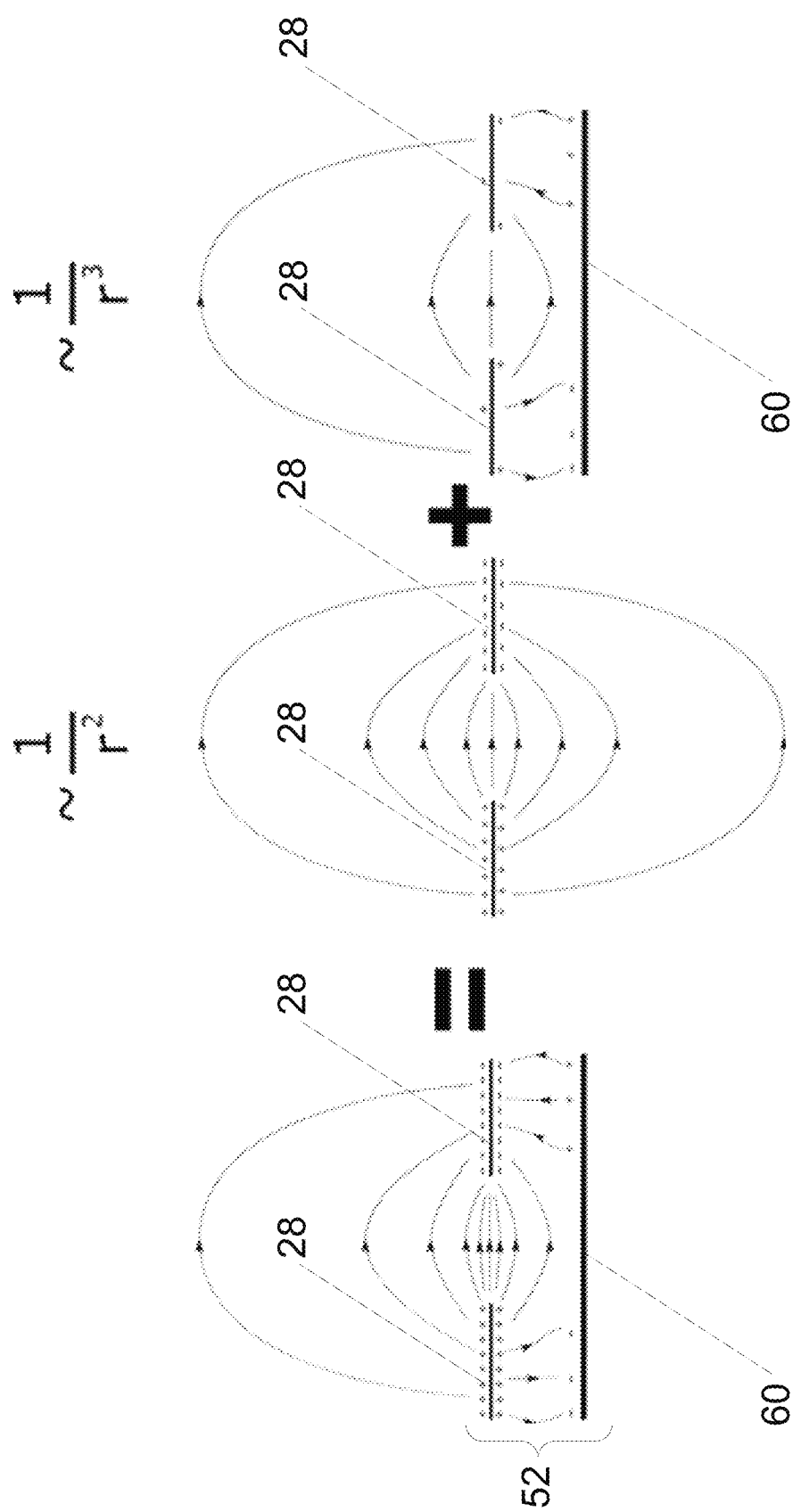
FIG. 8 is an electric field diagram of elements of the wireless power transfer system of FIG. 1.

Turning now to FIGS. 7 and 8, electric field diagrams of the active electrodes 28 and the passive electrode 60 of the system 20 during operation are shown. FIGS. 7 and 8 illustrate that the intensity of the electric field generated by the transmit resonator 24 is reduced when the passive electrode 60 is present. FIG. 7 is an electric field diagram which models the net electric field of the capacitor 52 formed by the active electrodes 28 and the passive electrode 60 as the sum of two opposing dipolar electric fields: the electric field generated by the transmit resonator 24 and the opposing electric field created by the surface charge induced on the passive electrode 60.

The electric field diagrams shown in FIGS. 7 and 8 indicate the presence of the passive electrode 60 in the system 20 produces a less intense dipolar electric field compared to a dipole surrounded by vacuum. Thus, the models also indicate that the presence of the passive electrode 60 in the system 20 produces a less intense dipolar electric field compared to a system that does not comprise a passive electrode 60.

Figure 9:
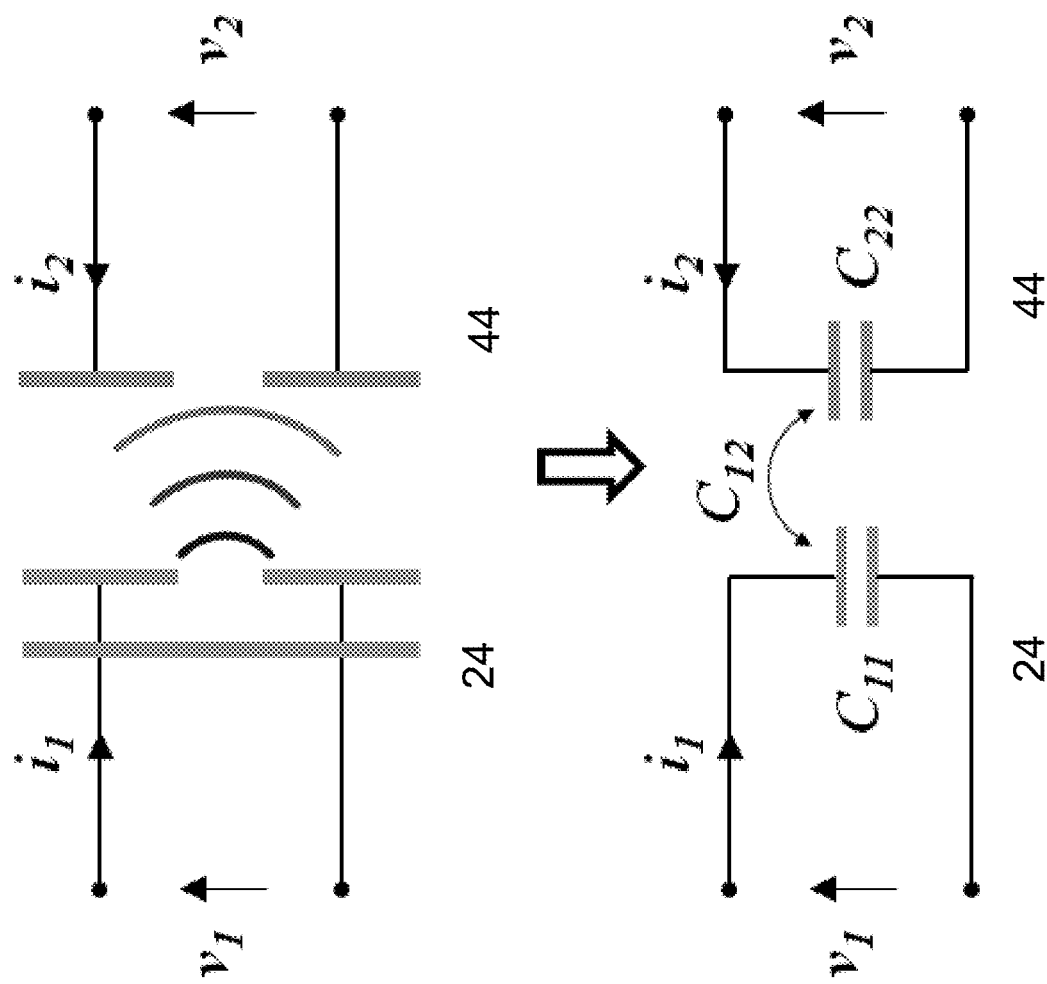
FIG. 9 is a circuit diagram of self-capacitances and mutual capacitance of the wireless power transfer system of FIG. 1.

Turning now to FIG. 9, circuit diagrams of the capacitances of the system 20 are shown. The equivalent capacitance of the transmit capacitor 52 ($C_{Tx}$) is the capacitance produced in the transmit capacitor 52 that does not contribute to the resonant electric field coupling with the active electrodes 48 of the receive resonator 44. The equivalent capacitance of the receive capacitor 54 ($C_{Rx}$) is the capacitance produced between the active electrodes 48 of the receive resonator 44 that does not contribute to the resonant electric field coupling with active electrodes 28 of the transmit resonator 24. The capacitances of the transmit capacitor 52 and the receive capacitor 54 ($C_{Tx}$ and $C_{Rx}$, respectively) lowers the resonant frequency of the system 20. The mutual capacitance of the transmitter-receiver pair ($C_M$) is the capacitance produced between the active electrodes 28 of the transmit resonator 24 and the active electrodes 48 of the receive resonator 44. The mutual capacitance is responsible for the coupling between the transmitter 22 and receiver 42 and therefore determines the coupling strength. The coupling coefficient between the transmitter 22 and the receiver 42 is (CC) and is given by the following formula:

$$CC = \frac{C_M^2}{C_{Tx} \times C_{Rx}}$$

Electromagnetic simulations carried out using Method of Moments examined the impact of the passive electrode 60 on the equivalent-capacitance ($C_{Tx}$)

Electromagnetic simulations carried out using Method of Moments examined the impact of the passive electrode 60 on the equivalent-capacitance ($C_{Tx}$) of the transmit capacitor 52, the equivalent-capacitance ($C_{Rx}$) between the active electrodes 48 of the receive resonator 44, the mutual capacitance ($C_M$) and the coupling coefficient (CC). D1, Ws and φ were varied in the electromagnetic simulations. The results of the simulations are shown in FIGS. 10 to 18 and described below.

Figure 10:
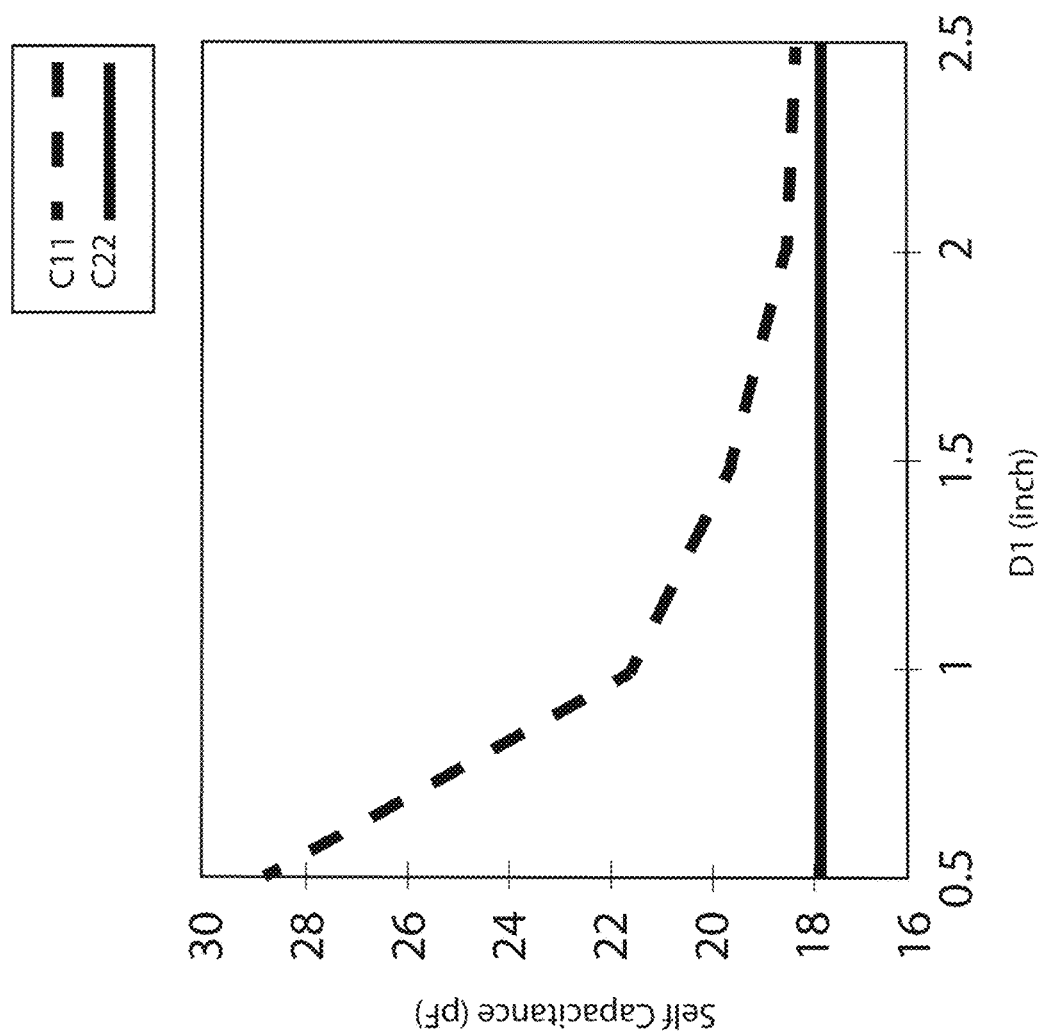
FIG. 10 is a graph of self-capacitances versus separation distance for the wireless power transfer system of FIG. 1.

Turning now to FIG. 10, a graph depicting the equivalent-capacitance ($C_{Tx}$) of the transmit capacitor 52 and the equivalent-capacitance ($C_{Rx}$) between the active electrodes 48 of the receive resonator 44 versus the separation distance (D1) between the active electrodes 28 of the transmit resonator 24 and the passive electrode 60 is shown. The equivalent-capacitance ($C_{Tx}$) of the transmit capacitor 52 decreases from approximately 29 pF to approximately 18.5 pF as the separation distance (D1) between the active electrodes 28 of the transmit resonator 24 and the passive electrode 60 increases from 0.5 inches to 2.5 inches. In contrast, the equivalent-capacitance ($C_{Rx}$) between the active electrodes 48 of the receive resonator 44 remains relatively constant as the separation distance (D1) between the active electrodes 28 of the transmit resonator 24 and the passive electrode 60 increases from 0.5 inches to 2.5 inches.

Figure 11:
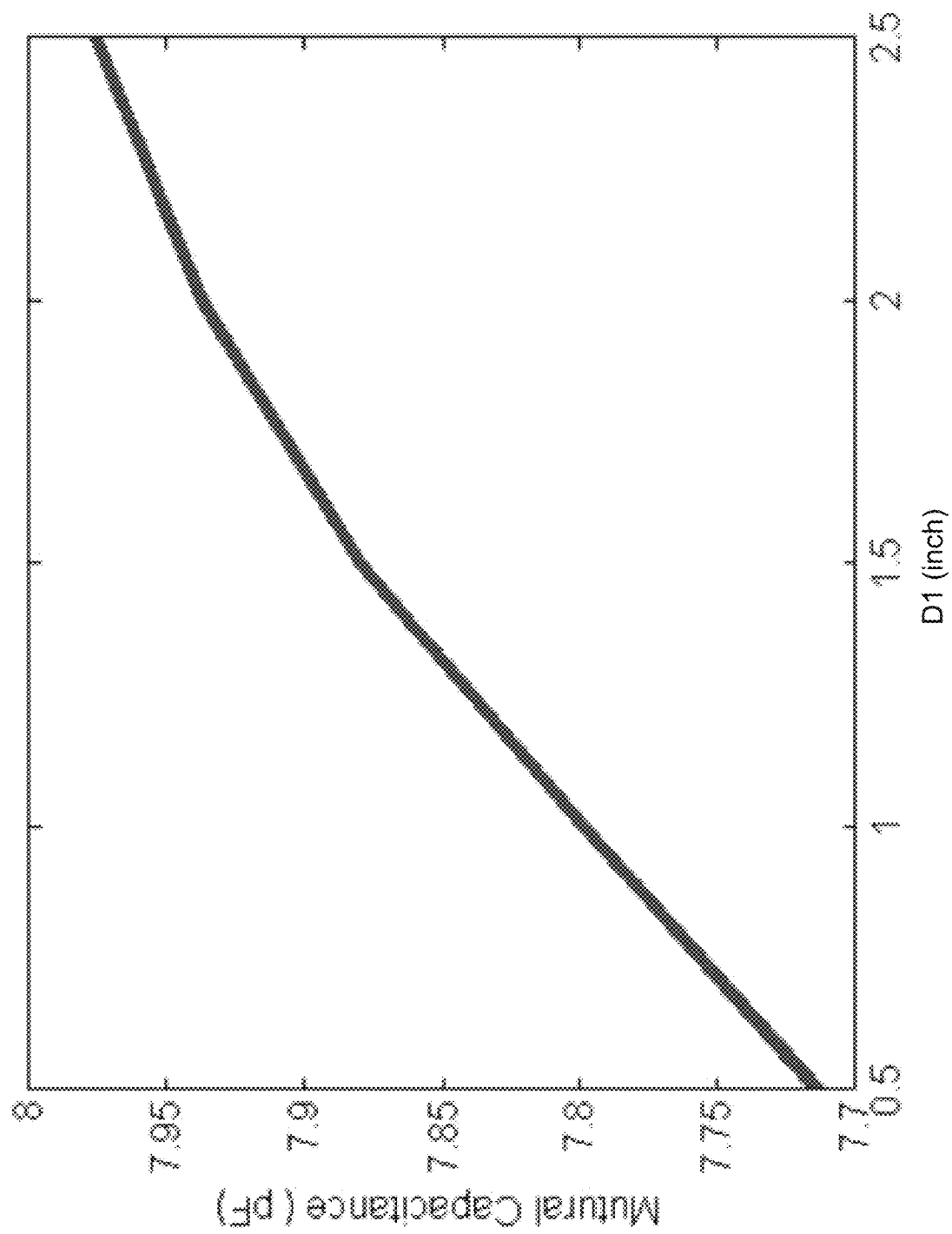
FIG. 11 is a graph of the mutual capacitance versus separation distance for the wireless power transfer system of FIG. 1.

Turning now to FIG. 11, a graph depicting the mutual capacitance ($C_M$) versus the separation distance (D1) between the active electrodes 28 of the transmit resonator 24 and the passive electrode 60 is shown for D=1. As the separation distance (D1) increases from 0.5 to 2.5 inches, the mutual capacitance ($C_M$) increases from approximately 7.71 pF to approximately 7.97 pF.

Figure 12:
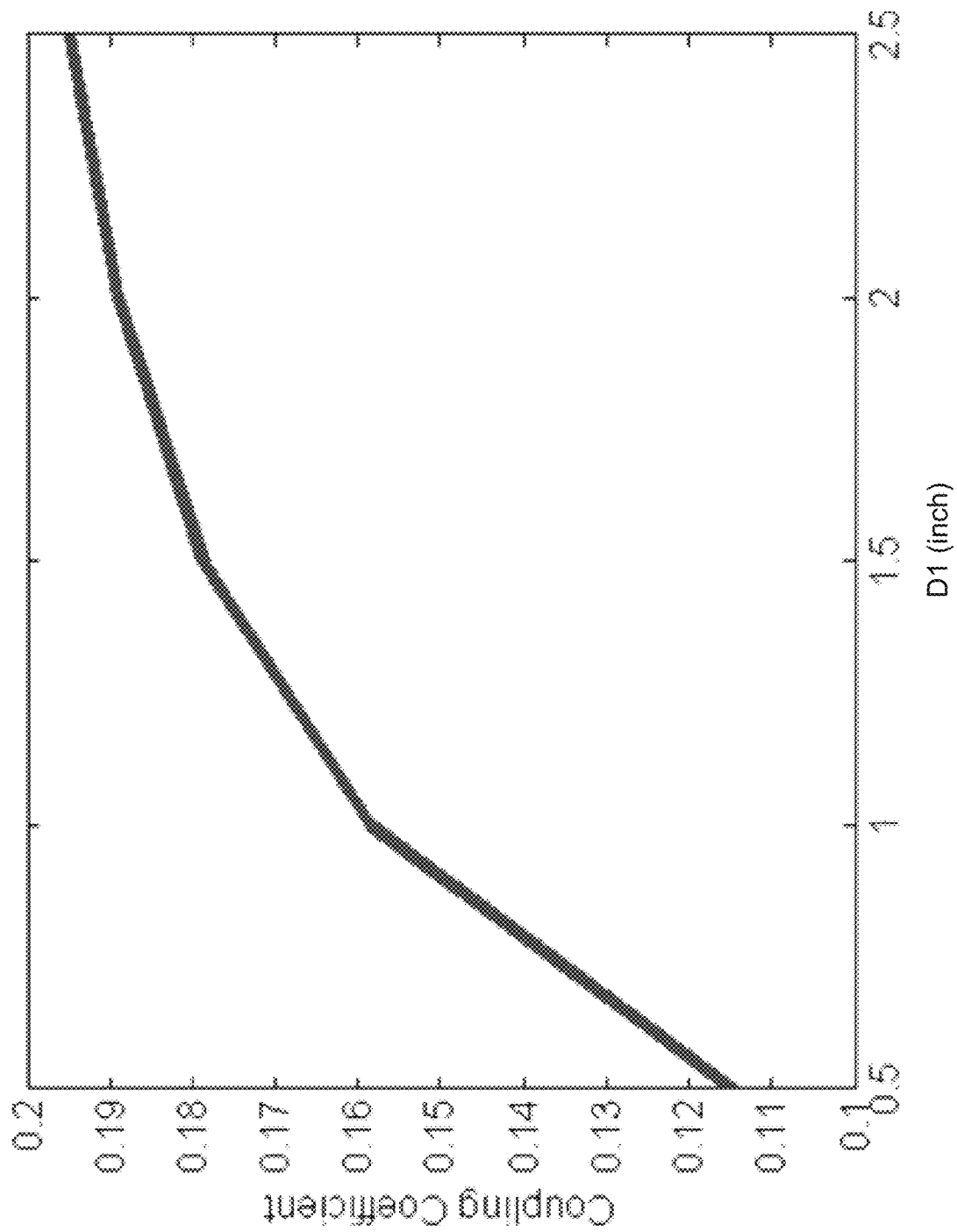
FIG. 12 is a graph of the coupling coefficient versus separation distance for the wireless power transfer system of FIG. 1.

Turning now to FIG. 12, a graph depicting the coupling coefficient (CC) versus the separation distance (D1) between the active electrodes 28 of the transmit resonator 24 and the passive electrode 60 is shown. As the separation distance (D1) increases from 0.5 to 2.5 inches, the coupling coefficient (CC) increases from approximately 0.115 to 0.195. For the data depicted in FIGS. 10 to 12, the width (Ws) of the passive electrode 60 is equal to 5 inches and the angle of rotation (φ) is 0°.

Figure 13:
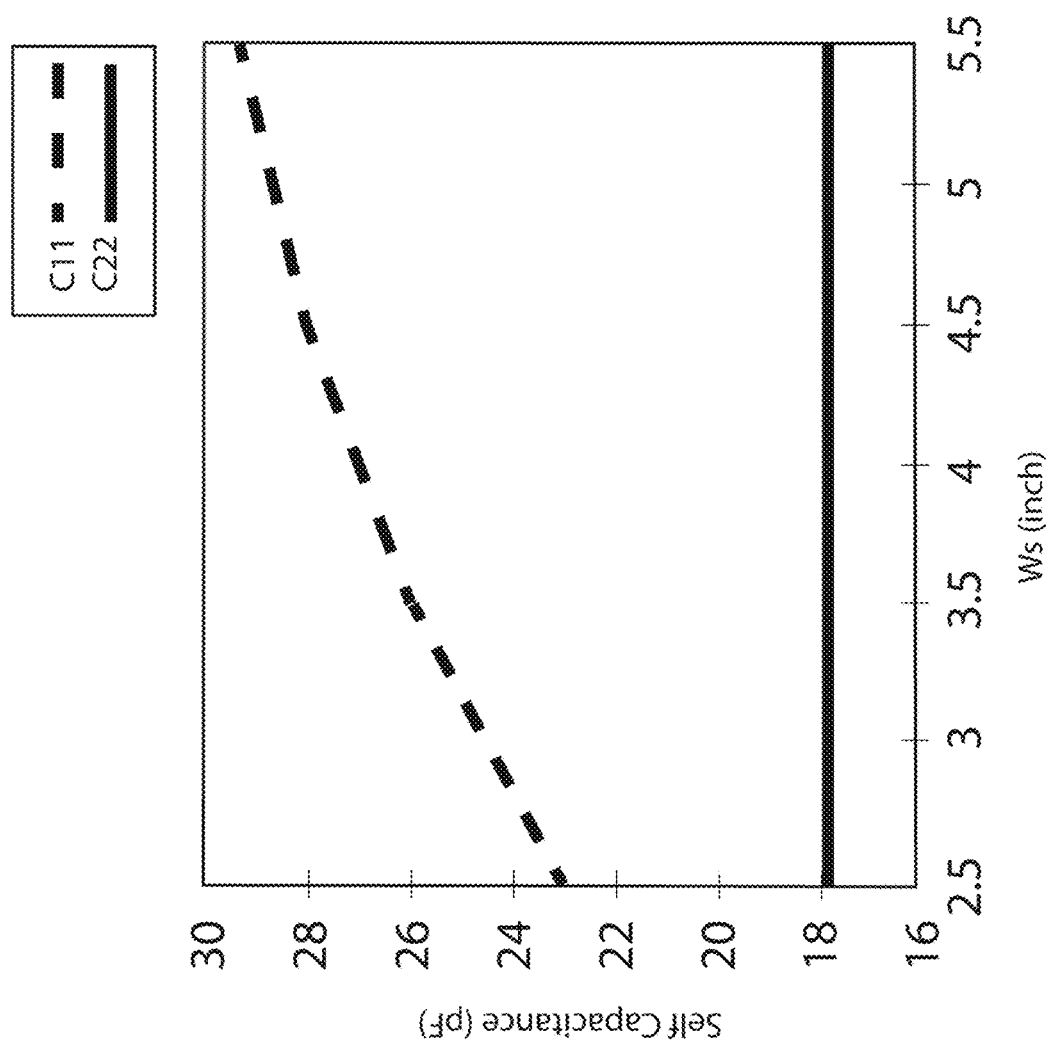
FIG. 13 is a graph of the self-capacitance versus the width of the passive electrode of the wireless power transfer system of FIG. 1.

Turning now to FIG. 13, a graph depicting the equivalent-capacitance ($C_{Tx}$) of the transmit capacitor 52 and the equivalent-capacitance ($C_{Rx}$) between the active electrodes 48 of the receive resonator 44 versus the width (Ws) of passive electrode 60 is shown. As the width (Ws) of the passive electrode 60 increases from 2.5 to 5.5 inches, the equivalent-capacitance ($C_{Tx}$) of the transmit capacitor 52 increases from approximately 23 pF to approximately 29.5 pF. In contrast, as the width (Ws) of the passive electrode 60 increases from 2.5 to 5.5 inches, the equivalent-capacitance ($C_{Rx}$) between the active electrodes 48 of the receive resonator 44 remains relatively constant at approximately 18 pF.

Figure 14:
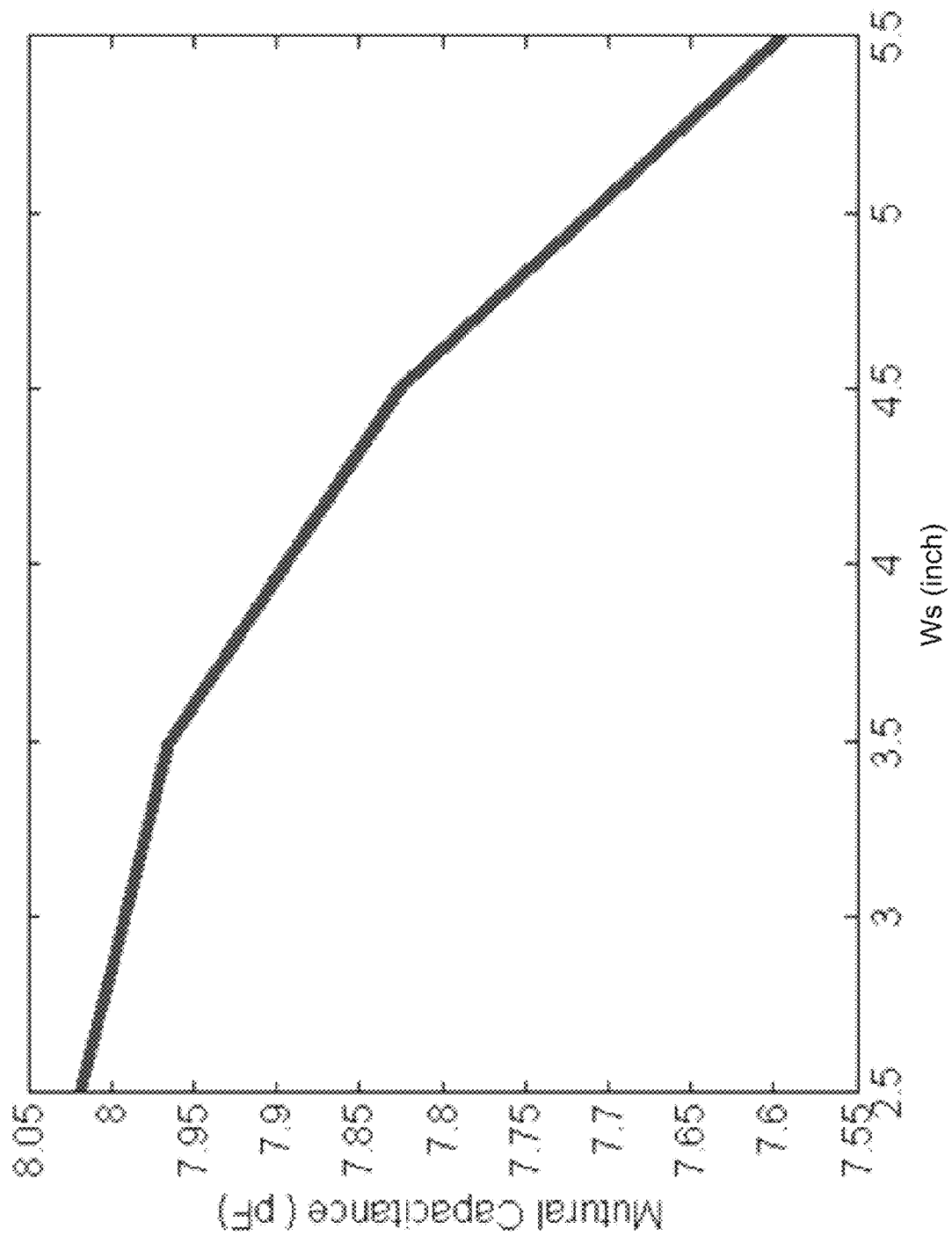
FIG. 14 is a graph of the mutual capacitance versus the width of the passive electrode of the wireless power transfer system of FIG. 1.

Turning now to FIG. 14, a graph depicting the mutual capacitance ($C_M$) versus the width (Ws) of passive electrode 60 is shown. As the width (Ws) increases from 2.5 to 5.5 inches, the mutual capacitance ($C_M$) decreases from approximately 8.02 pF to approximately 7.60 pF.

Figure 15:
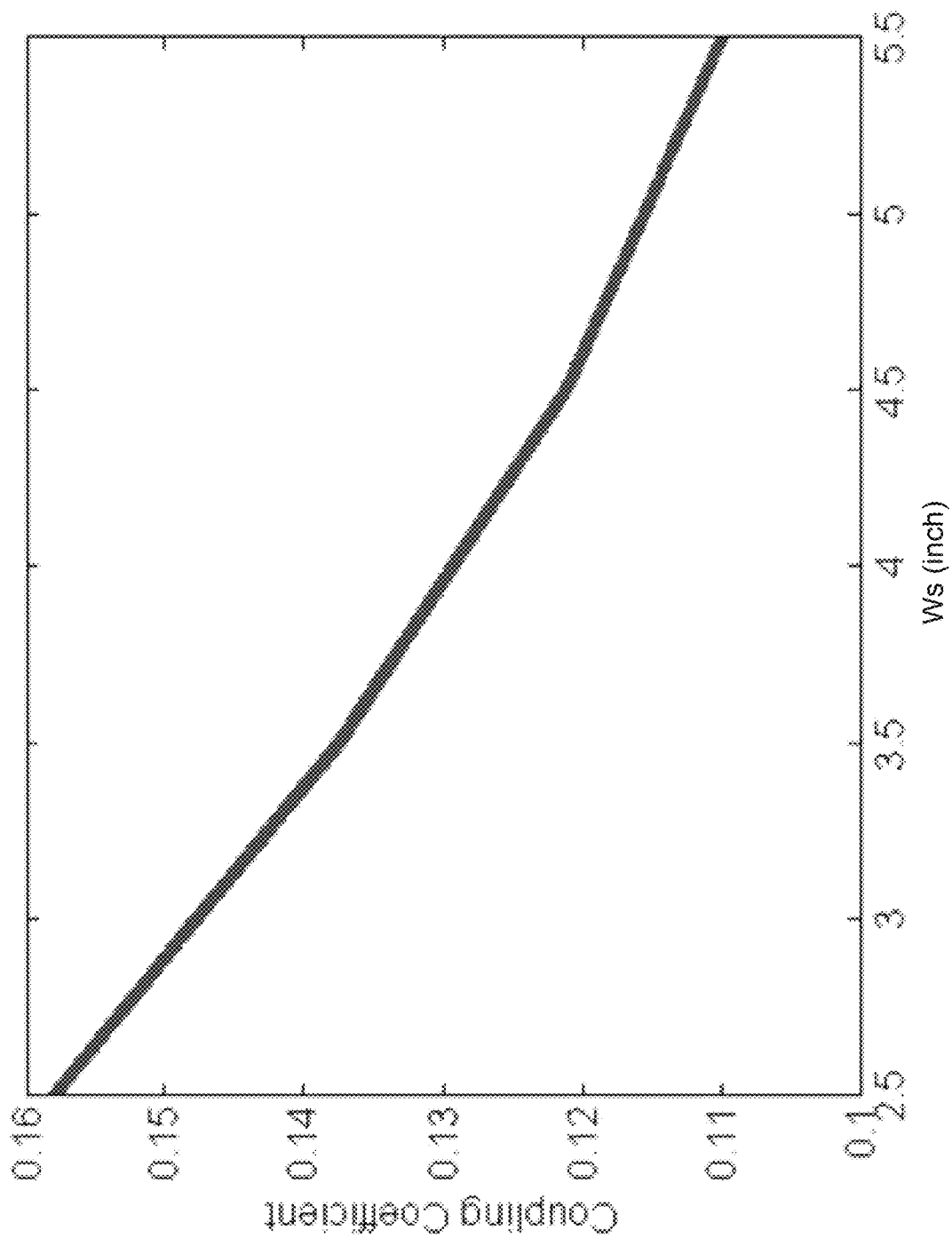
FIG. 15 is a graph of the coupling coefficient versus the width of the passive electrode of the wireless power transfer system of FIG. 1.

Turning now to FIG. 15, a graph depicting the coupling coefficient (CC) versus the width (Ws) of passive electrode 60 is shown. As the width (Ws) increases from 2.5 to 5.5 inches, the coupling coefficient (CC) decreases from approximately 0.16 to approximately 0.11. For the data depicted in FIGS. 13 to 15, the separation distance (D1) is equal to 1 inch and the angle of rotation (φ) is 0°.

Figure 16:
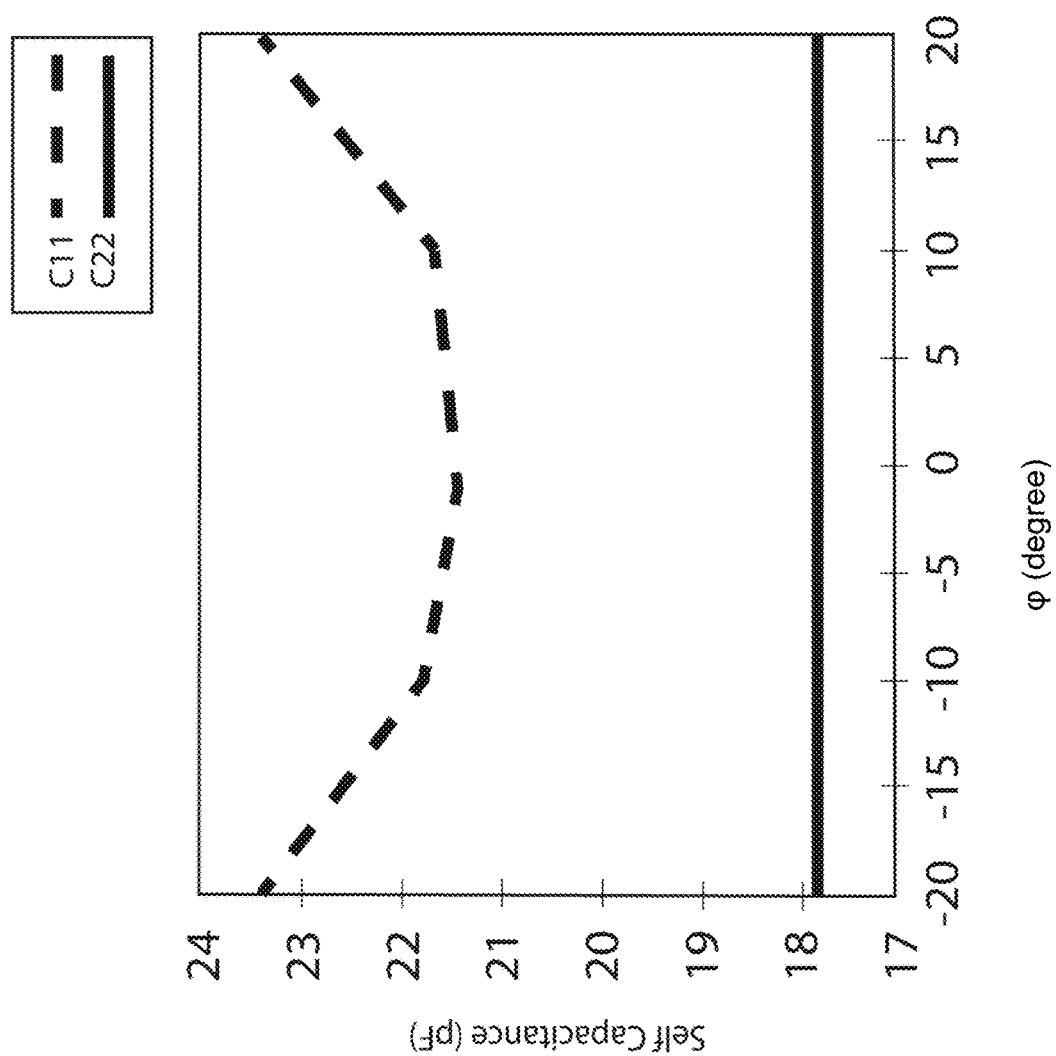
FIG. 16 is a graph of the self-capacitance versus the angle of rotation of the passive electrode of the wireless power transfer system of FIG. 1.

Turning now to FIG. 16, a graph depicting the equivalent-capacitance ($C_{Tx}$) of the transmit capacitor 52 and the equivalent-capacitance ($C_{Rx}$) between the active electrodes 48 of the receive resonator 44 versus the angle of rotation ((p) of the passive electrode 60 is shown. As the passive electrode 60 rotates and the angle of rotation (φ) increases and decreases away from zero, in either direction, the equivalent-capacitance ($C_{Tx}$) of the transmit capacitor 52 increases from approximately 21.5 pF to approximately 23.5 pF. Furthermore, as the passive electrode 60 rotates and the angle of rotation (φ) moves away from zero, in either direction, the equivalent-capacitance ($C_{Rx}$) between the active electrodes 48 of the receive resonator 44 decreases from approximately 18.9 pF to approximately 18.8 pF. The equivalent-capacitance ($C_{Tx}$) of the transmit capacitor 52 is affected by the increasing capacitance between one of the active electrodes 28 of the transmit resonator 24 and the passive electrode 60, and the decreasing capacitance between the other active electrode 28 of the transmit resonator 24 and the passive electrode 60.

Figure 17:
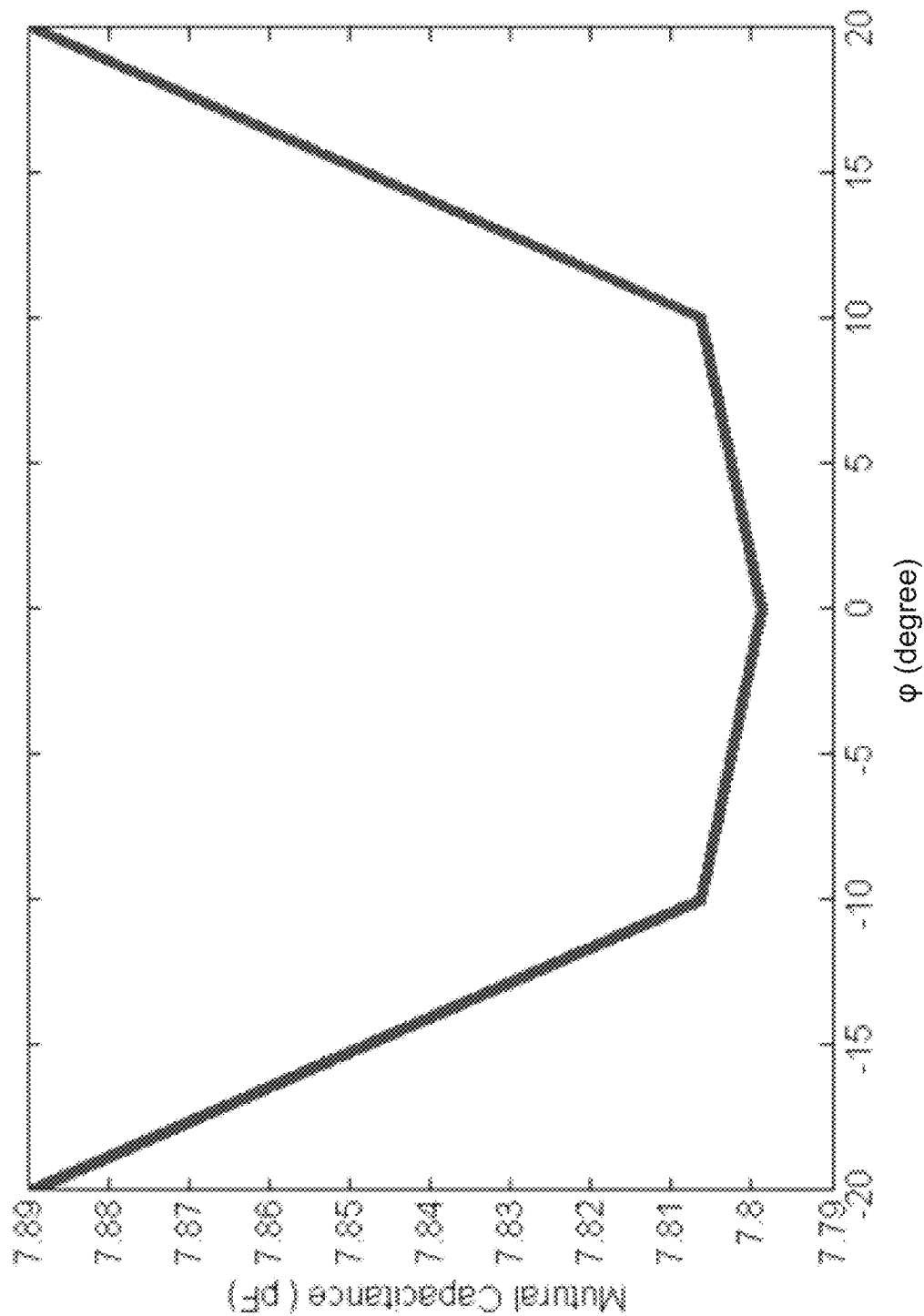
FIG. 17 is a graph of the mutual capacitance versus the angle of rotation of the passive electrode of the wireless power transfer system of FIG. 1.

Turning now to FIG. 17, a graph depicting the mutual capacitance ($C_M$) versus the angle of rotation (φ) of the passive electrode 60 is shown. As the passive electrode 60 rotates and the angle of rotation (φ) moves away from zero, in either direction, the mutual capacitance ($C_M$) increases from approximately 7.80 pF to approximately 7.89 pF. This change of approximately 0.09 pF is smaller than the approximate 0.42 pF change observed when the width (Ws) of the passive electrode 60 is varied and is smaller than the approximate 0.26 pF change observed when the separation distance (D1) between the active electrodes 28 of the transmit resonator 24 and the passive electrode 60 is varied.

Figure 18:
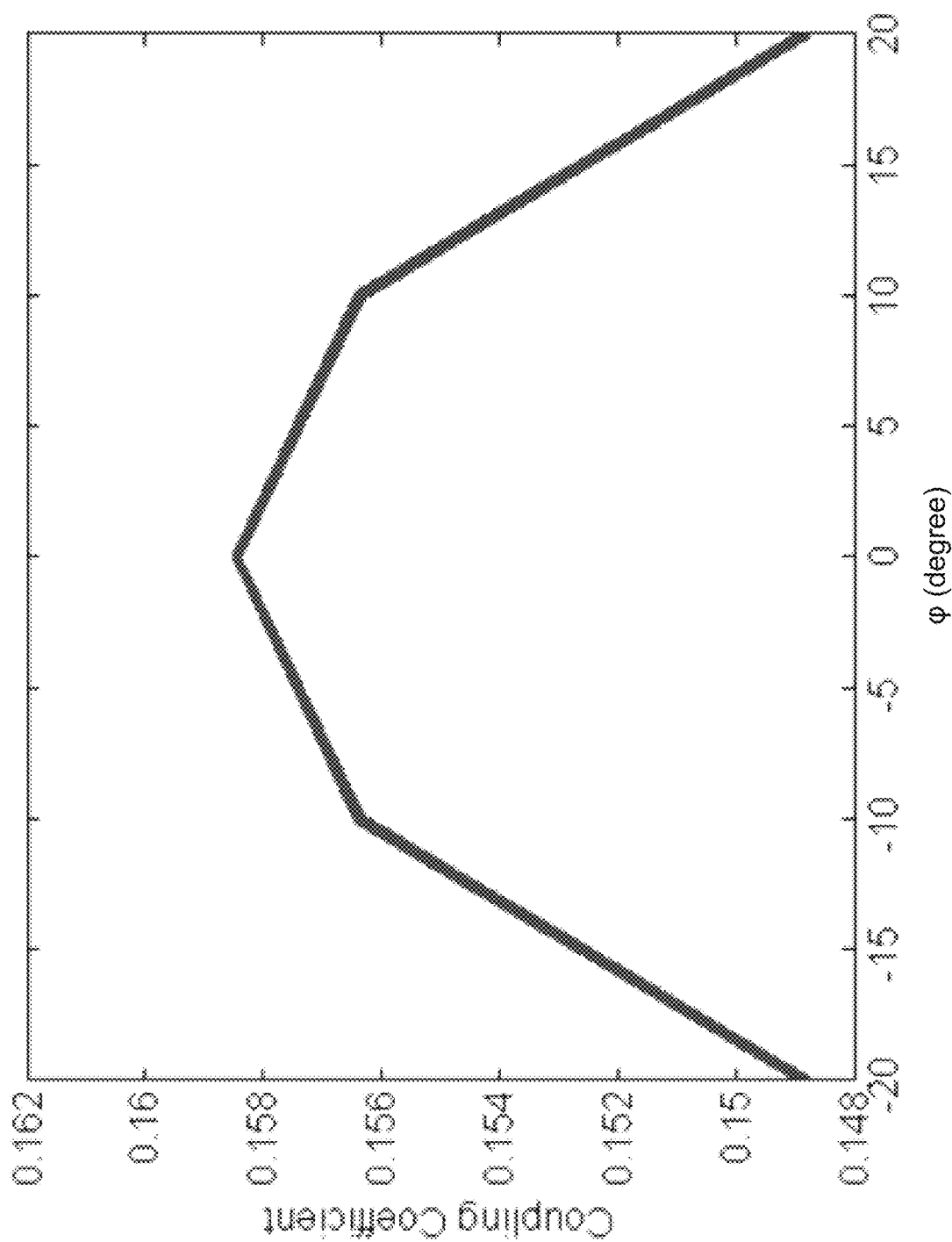
FIG. 18 is a graph of the coupling coefficient versus the angle of rotation of the passive electrode of the wireless power transfer system of FIG. 1.

Turning now to FIG. 18, a graph depicting the coupling coefficient (CC) versus the angle of rotation (φ) of the passive electrode 60 is shown. As the passive electrode 60 rotates and the angle of rotation (φ) moves away from zero, in either direction, the coupling coefficient (CC) decreases from approximately 0.158 to approximately 0.149. The coupling coefficient (CC) decreases since the change in the transmit equivalent-capacitance ($C_{Tx}$) of the transmit capacitor 52 is dominant over the change in mutual capacitance ($C_M$) and the change in receiver equivalent-capacitance ($C_{Rx}$). The equivalent-capacitance ($C_{Tx}$) of the transmit capacitor 52 is increasing due to the active electrode 28 of the transmit resonator 24 moving closer to the passive electrode 60 through the rotation of the passive electrode 60 by the angle of rotation (φ). The mutual capacitance ($C_M$ is increasing due to the passive electrode 60 moving away from the gap (G1) between the active electrodes 28. For the data depicted in FIGS. 16 to 18, the width (Ws) of the passive electrode 60 is equal to 5 inches and the separation distance (D1) is equal to 1 inch.

While a particular embodiment of the system 20 has been described, one of skill in the art will appreciate that variations are possible. In another embodiment, the system 20 further comprises a dielectric positioned between the passive electrode 60 and the active electrodes 28 of the transmit resonator 24. The dielectric has the same length and width as the passive electrode 60. The dielectric has a permittivity 3.48 and a loss tangent of 0.0037 at 10 GHz. The dielectric has a high breakdown voltage. The dielectric with a high breakdown voltage reduces the potential for arcing. This allows the system 20 to operate at high power levels. Examples of dielectrics include: fiberglass and thermoplastics. Examples of thermoplastics include polyethylene and polypropylene The potential of the passive electrode 60 will float between the voltages of the active electrodes, unless it has been grounded. The active electrodes 28 of the transmit resonator have potentials typically in the hundreds of volts, depending on the precise specification of the system 20. In this embodiment, the potentials of the active electrodes 28 of the transmit resonator are approximately 600 V. The electric field is created in between the active electrodes 28 and the passive electrode 60 and will increase in magnitude as the active electrodes 28 and the passive electrode 60 move closer together. Care must be taken when designing the system 20 to avoid arcing between the passive electrode 60 and the active electrodes 28. Arcing can damage components of the system 20 and ignite fires.

The potential for arcing can be decreased by lowering the potential difference between the active electrodes 28 and the passive electrode 60. In this embodiment, an electric field below $3 \times 10^6$ V/m ensures arcing does not occur as $3 \times 10^6$ V/m is the approximate dielectric breakdown voltage for air. To maintain the same power transfer, the current of the system 20 must be increased. The increase in current increases resistive losses of the system 20. The potential for arcing can also be decreased by transferring less power. The dielectric positioned between the passive electrode 60 and the active electrodes 28 of the transmit resonator reduces the potential difference between the active electrodes 28 and the passive electrode 60. Thus, the dielectric recues the potential for arcing.

Figure 19:
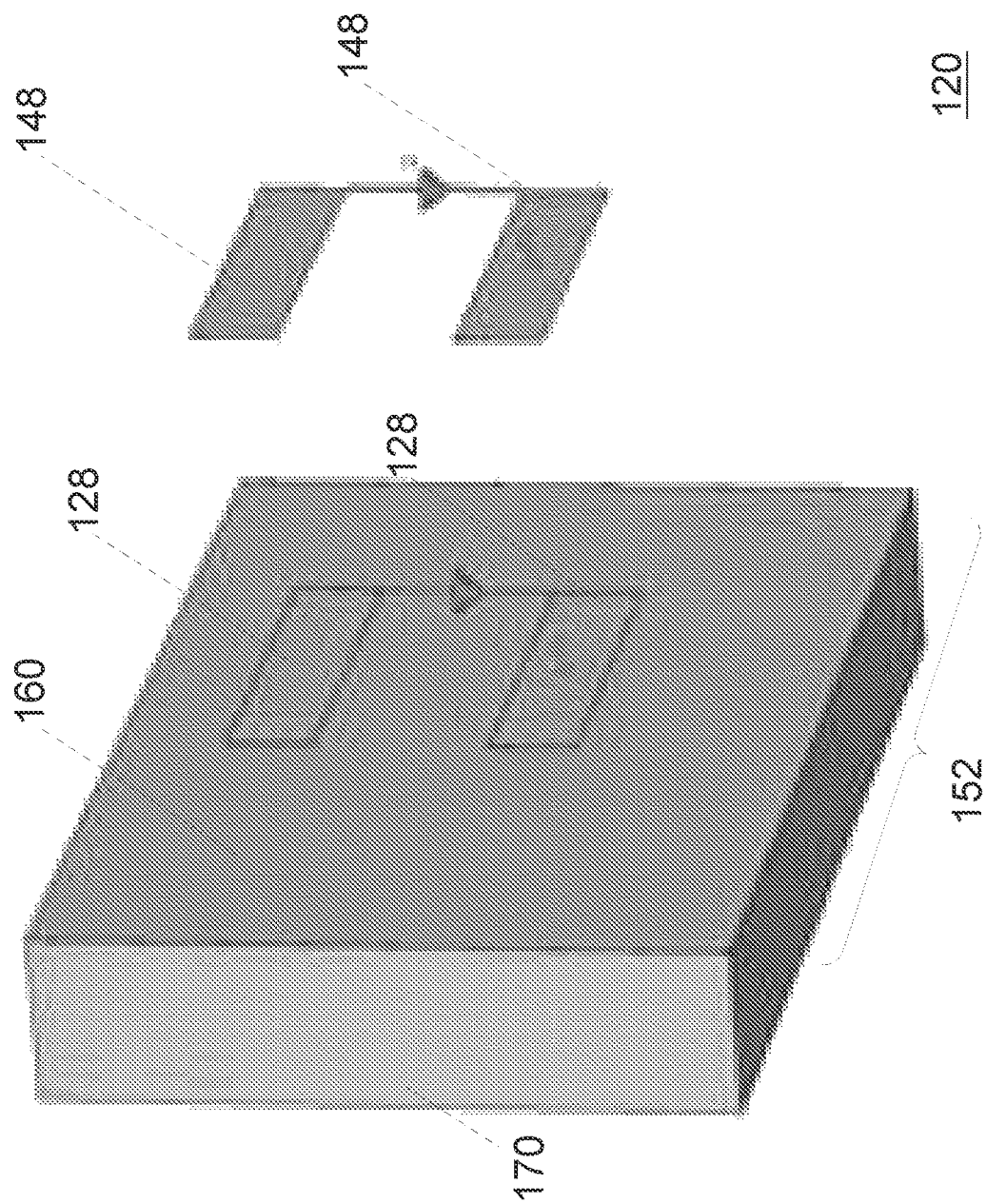
FIG. 19 is a perspective view of elements of another embodiment of a wireless power transfer system.

Turning now to FIG. 19, a perspective view of elements of another embodiment of a wireless power transfer system is shown. The wireless power system is generally identified by reference numeral 120. The wireless power transfer system 120 shown in FIG. 19 is similar to the wireless power transfer system 20 previously described and as such like elements are referred to with identical reference characters increased by 100. The active electrodes 128 and 148 of the transmit resonator and receive resonator, respectively, and the passive electrode 160 of the system 120 are shown in FIG. 19. While the system 120 comprises further components, these are not depicted in FIG. 19. As previously described, the active electrodes 128 of the transmit resonator and the passive electrode 160 form a capacitor 152. In this embodiment, the active electrodes 128 of the transmit resonator are electrically wired to each other and the active electrodes 148 of the receive resonator are electrically wired to each other for simulation purposes. In this embodiment, each active electrode 128 and 148 is formed of copper, however, one of skill in the art will appreciate that other metals are possible. In this embodiment, the resonant frequency of the transmit resonator is 13.56 MHz of the system 120. In this embodiment, each active electrode 128 and 148 is 50 mm by 200 mm. The active electrodes 128 of the transmit resonator are 100 mm from the active electrodes 148 of the receive resonator. The passive electrode 160 is 400 mm by 600 mm.

In this embodiment, a block of test material 170 is positioned on one side of the passive electrode 160 opposite the active electrodes 128. The block of test material 170 represents different media that may be present in the operating environment of the system 120. The block of test material 170 is present as a block of aluminum, concrete, dry ground, wet ground, water, sea water or wood.

As previously discussed, the additional capacitance from the passive electrode 160 compared to a wireless power transfer system that does not comprise the passive electrode 160 also reduces the inductance required of the inductive coils (not pictured) in the wireless power transfer system 120 to operate at a resonant frequency of 13.56 MHz. In this embodiment, the inductance required to resonate the inductive coils of the system 120 is reduced from 43.2 µH to 39.5 µH.

Figure 20:
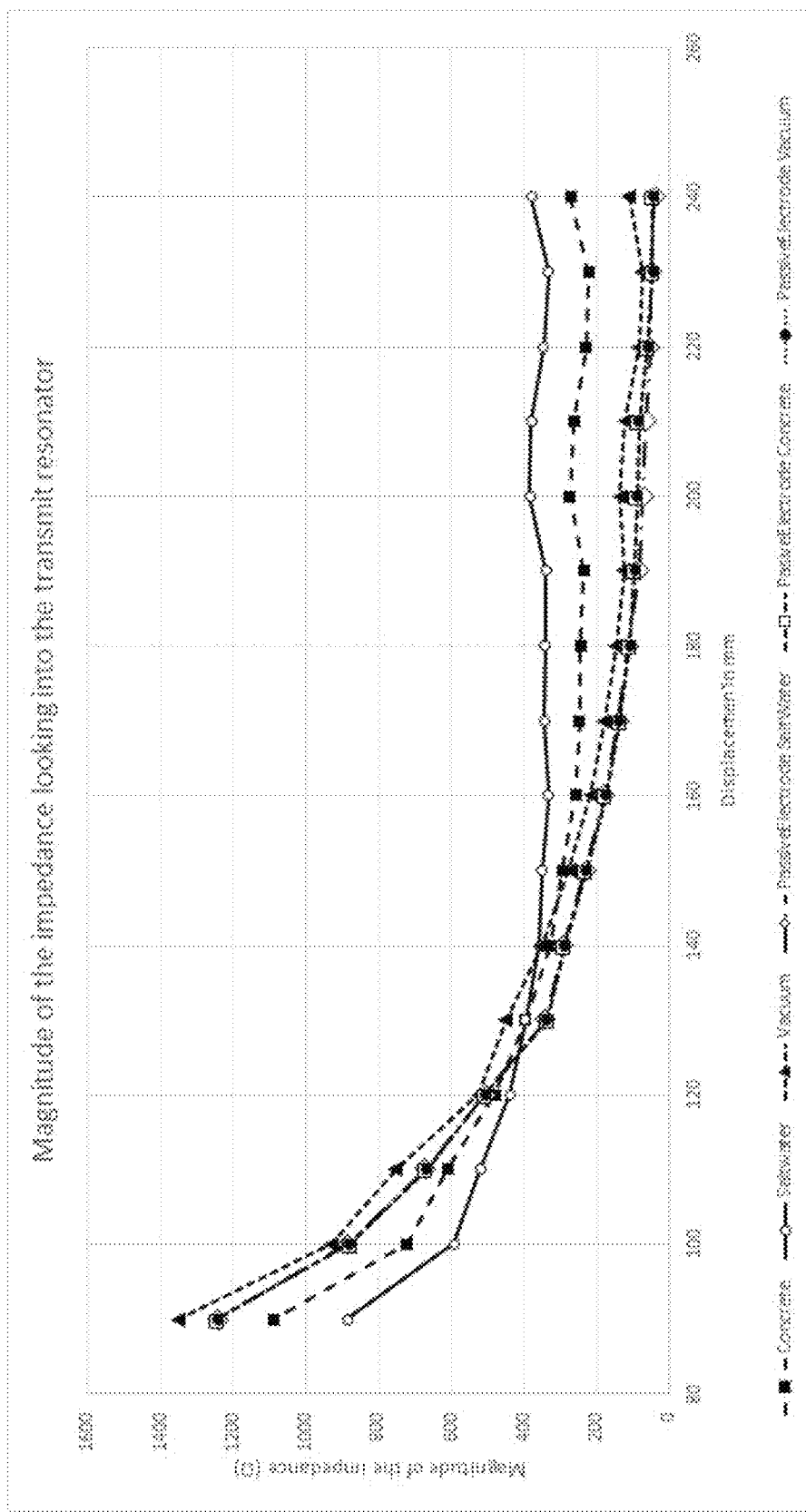
FIG. 20 is a graph of impedance magnitude versus displacement for the elements of FIG. 19.
Figure 21:
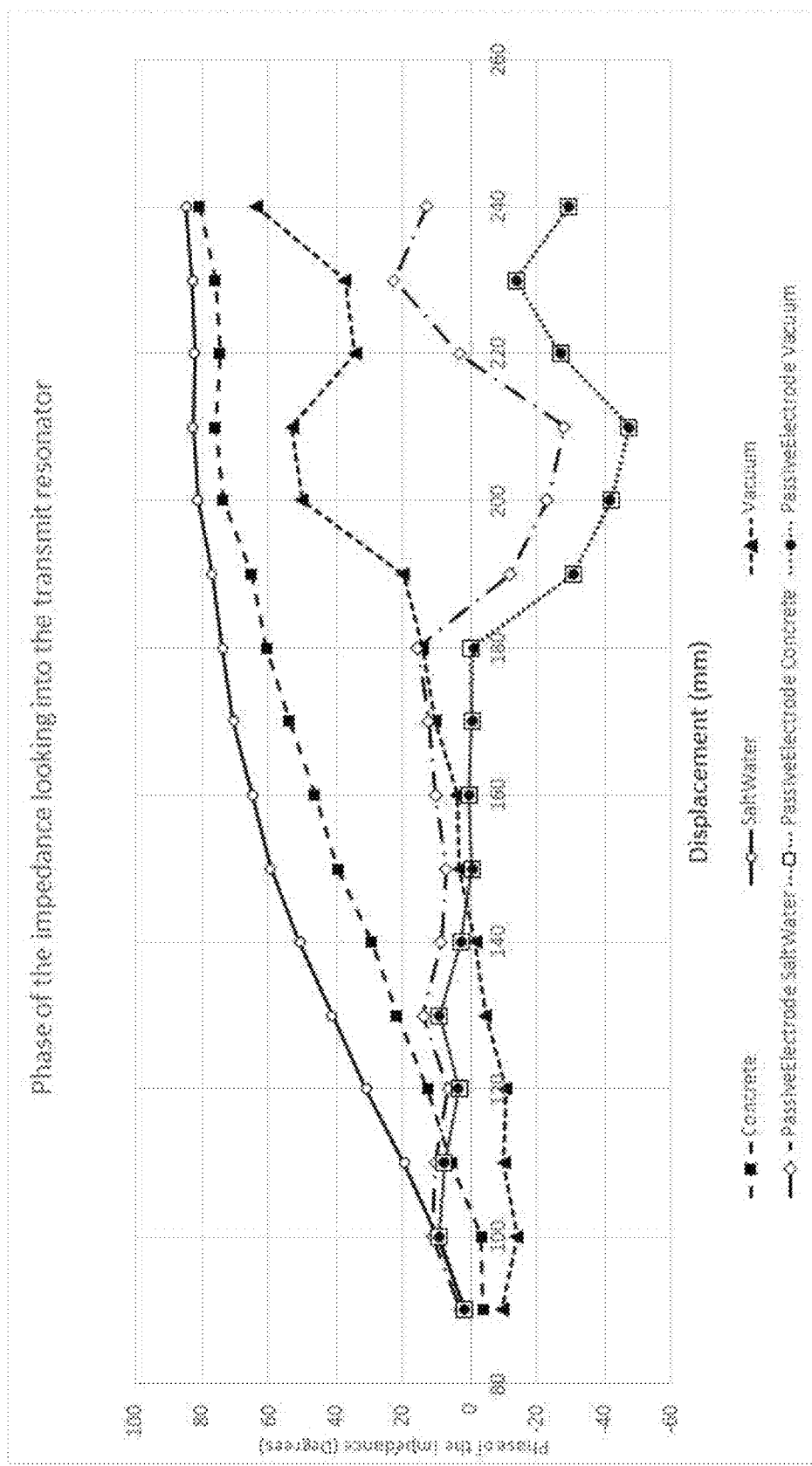
FIG. 21 is a graph of impedance phase versus displacement for the elements of FIG. 19.

Electromagnetic field simulations using CST Microwave Studio software were performed to demonstrate the stability of the system 120 for different materials of the block of test material 170 for a range of longitudinal displacements between the transmitter and the receiver. Turning now to FIGS. 20 and 21, graphs depicting the impedance magnitude and phase, respectively, looking into the transmit resonator versus the longitudinal displacement of the receiver from the transmitter are shown. In the first three cases of both FIGS. 20 and 21, the passive electrode 160 is not present and the block of material 170 is concrete, saltwater and a vacuum. In the final three cases of FIGS. 20 and 21, the passive electrode 160 is present and the block of material 170 is concrete, saltwater and a vacuum.

A constant impedance looking into the transmit resonator is desirable as power sources are generally optimized to deliver power efficiently to a given load impedance. The input impedance of the transmit resonator varies significantly during operation, depending on the tuning of both the transmit resonator and receive resonator, the system 120 load impedance and the degree of coupling between the transmit and receive resonators. The passive electrode 160 minimizes the environmental influences affecting the active electrodes 128. The passive electrode 160 also provides additional capacitance to the system 120, reducing the required inductance.

As shown in FIG. 20, the cases with a passive electrode 160 are generally consistent in magnitude independent of the test material of the block of test material 170. Without the passive electrode 160 the impedance magnitude looking into the transmit resonator varies significantly.

Turning now to FIG. 21, the variance in the phase between the transmit electrodes 128 and the receive electrodes 148 over a displacement range of 90 to 180 mm is less than 20 degrees when the passive electrode 160 is present. However, when the passive electrode 160 is not present, the variance is as high as 80 degrees. In general, low phase angles are preferred as it is difficult to design the wireless power transfer system 120 such that all phases may be accommodated.

Figure 22:
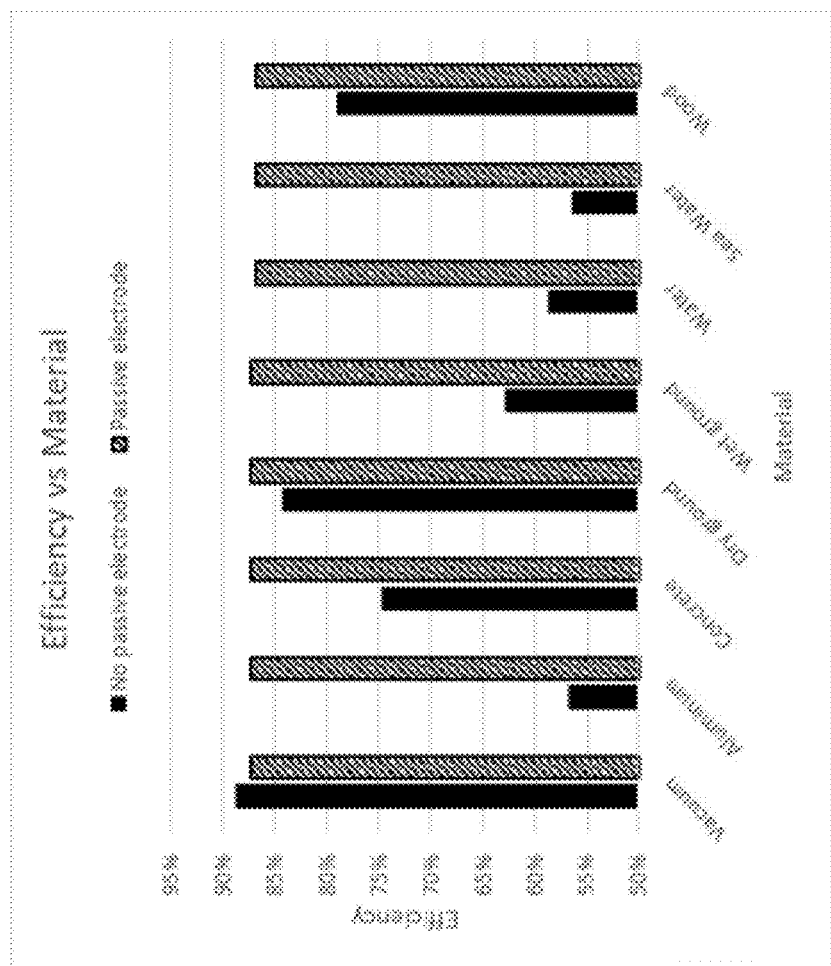
FIG. 22 is a graph of RF efficiency of the wireless power transfer system for different test materials for the elements of FIG. 19.

Turning now to FIG. 22, the RF efficiency for the system 120 is shown with a larger variety of materials for the block of test material 170. When the block of test material 170 is not present the RF efficiency is labeled as vacuum. In other configurations, the block of test material 170 is present as a block of aluminum, concrete, dry ground, wet ground, water, sea water or wood. The system 120 was tuned in a vacuum for the test material and a displacement of 150 mm between the transmit electrodes 128 and the receive electrode 148.

The system 120 with the passive electrode 160 has an almost constant RF efficiency of 87% for every block of test material 170, while a system 120 without the passive electrode 160 has an RF efficiency that varies from 56% when the block of test material 160 is aluminum to 89% when the block of test material 160 is not present (labeled as vacuum in FIG. 22).

Figure 23:
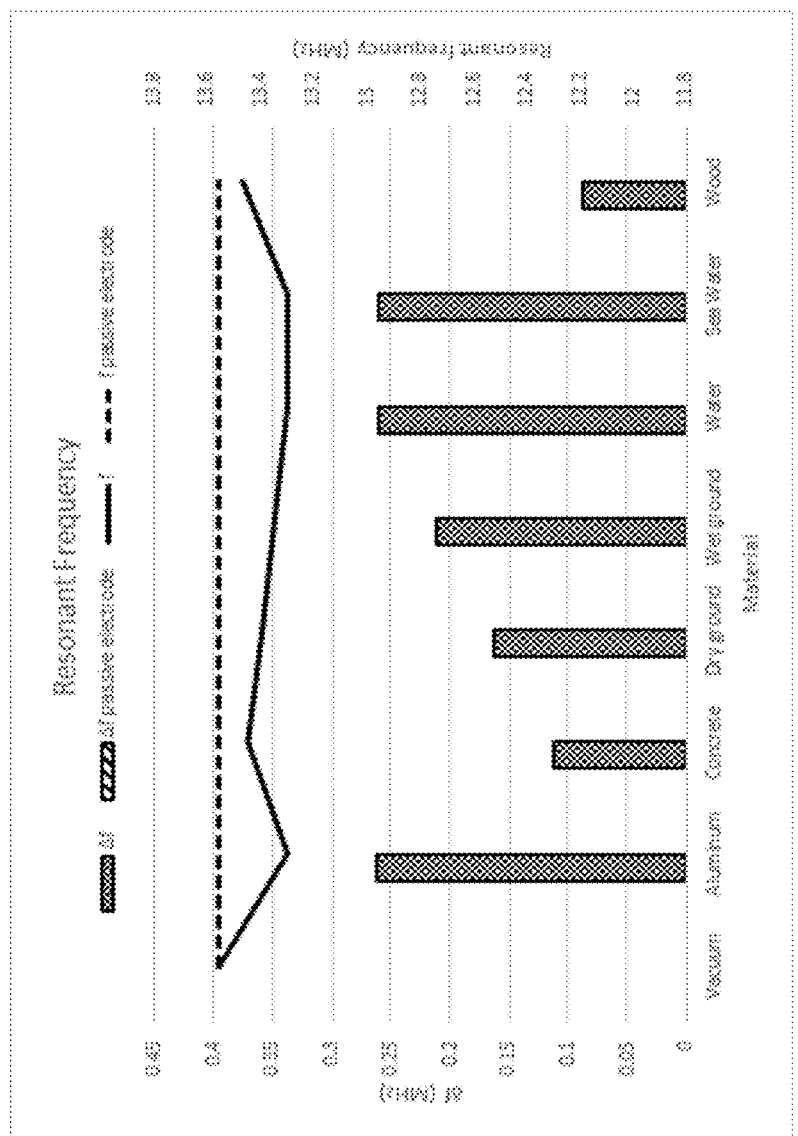
FIG. 23 is a graph of the change in resonant frequency for different materials for the elements of FIG. 19.

Turning now to FIG. 23, the change in resonant frequency for the system 120 is shown with various materials for the block of test material 170. When the block of test material 170 is not present, the resonant frequency is labeled as vacuum. The block of test material is present as a block of aluminum, concrete, dry ground, wet ground, water, sea water or wood. As previously stated, the resonant frequency of the system 120 is 13.56 MHz. As shown in FIG. 23, when the passive electrode 160 is not present in the system 120, the resonant frequency of the system 20 changes depending on the block of test material 170. However, when the passive electrode 160 is present in the system 120, the resonant frequency of the system 120 is constant with no variance. The change in frequency ($\Delta f$) is zero when the passive electrode 160 is present regardless of the material of the block of test material 170. The resonant frequency of the system 120 without the passive electrode 160 varies from 13.56 MHz down to 13.30 MHz depending on the block of test material 170. The change in frequency ($\Delta f$) varies from 0 MHz to over 0.25 MHz when the passive electrode 160 is not present depending on the material of the block of test material 170.

Figure 24:
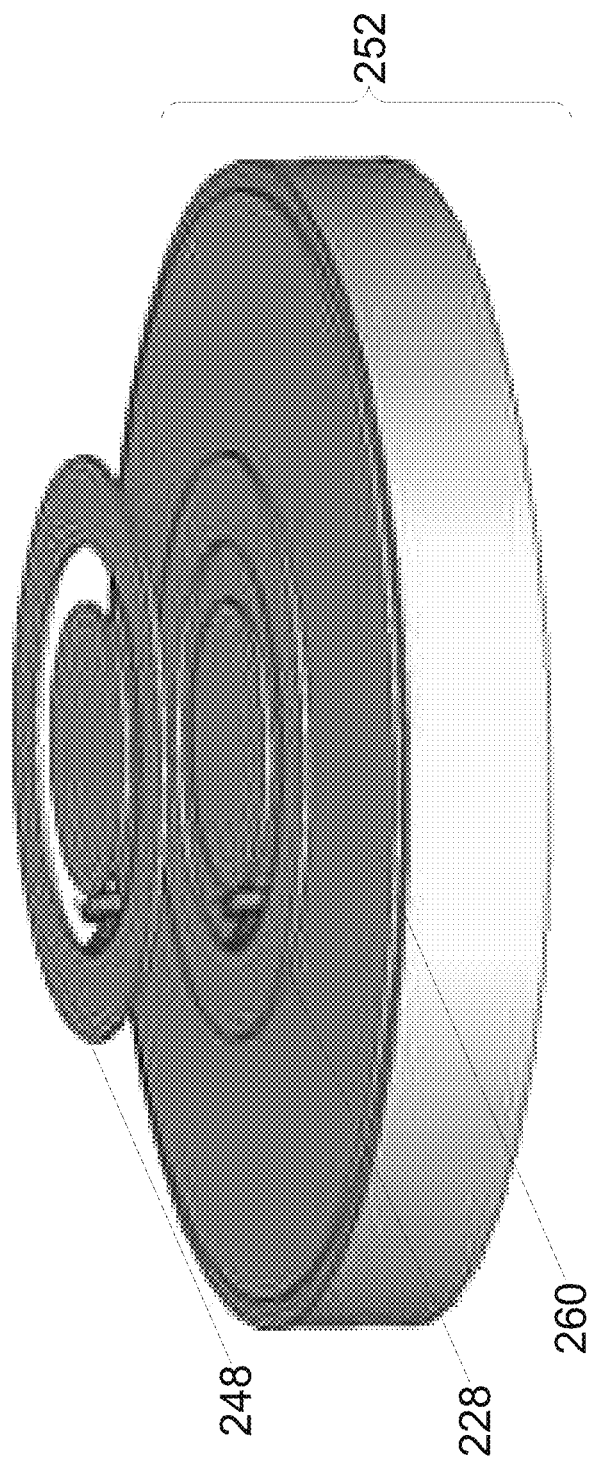
FIG. 24 is a perspective view of another embodiment of active electrodes of the transmit resonator, active electrodes of the receive resonator and a receive passive electrode of the wireless power transfer system of FIG. 1.

While a particular size and shape of the active electrodes 28 and 48 and the passive electrode 60 have been described, one of skill in the art will appreciate that variations are possible. Another embodiment of active electrodes 228 and 248 and passive electrode 260 is shown in FIG. 24.

In this embodiment, the active electrodes 228 of the transmit resonator are two concentric electrodes in the form of a ring and a disc. The active electrodes 248 of the receive resonator are two concentric electrodes in the form of a ring and a disc. The passive electrode 260 is a disc electrode. The active electrodes 228 and 248, and the passive electrode 260 are coplanar. As previously described, the active electrodes 228 of the transmit resonator and the passive electrode 260 form a capacitor 252.

While the passive electrode 260 has been described as a disc electrode, one of skill in the art will appreciate that other configurations are possible. In another embodiment, the passive electrode 260 is a ring with an inner radius that is less than or equal to the inner radius of an inner active electrode.

For the purpose of the subject application, concentric is defined as at least including one of the following: (i) the two electrodes have a common central axis, (ii) the two electrodes have a common center of rotation, (iii) the two electrodes have a common center of mass, (iv) the two electrodes have a common center of volume, (v) the two electrodes have a common center of curvature, (vi) the outer electrode of the two electrodes circumscribes the inner electrode of the two electrodes, and (vii) the shape formed by extending the periphery of the outer electrode in the z-axis circumscribes the inner electrode.

Figure 25:
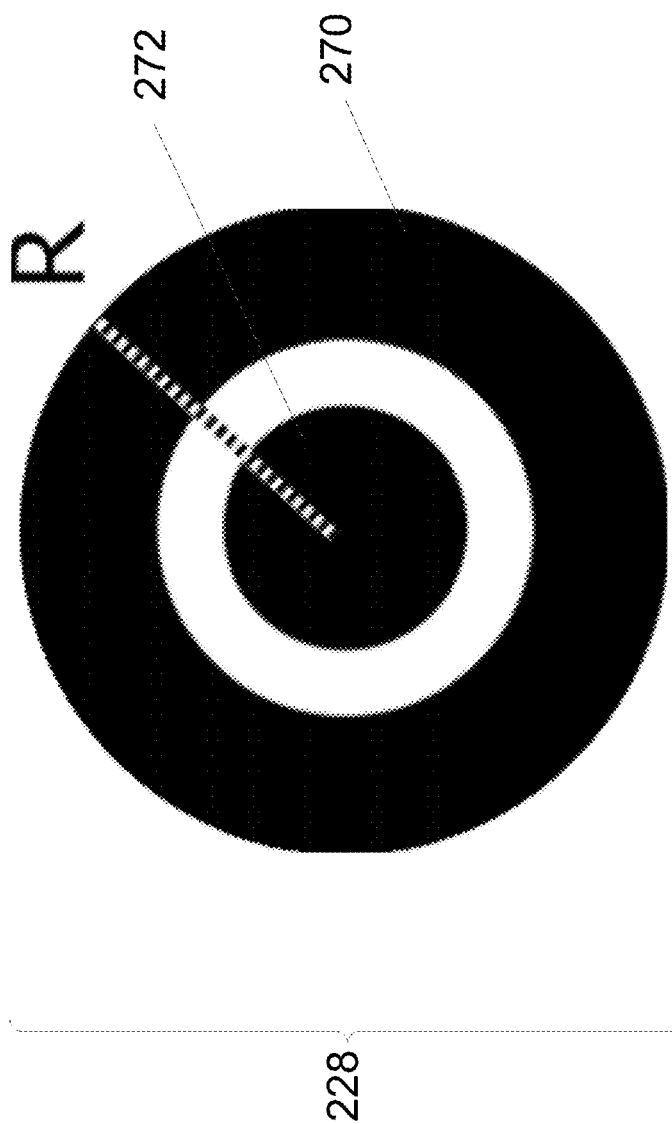
FIG. 25 is a plan view of the active electrodes of the transmit resonator of FIG. 24.

Turning now to FIG. 25, a plan view of the active electrodes 228 of the transmit resonator are shown. As previously stated, the active electrodes 228 are two concentric electrodes that take the form of a ring 270 and a disc 272. The ring 270 has an outer radius R of 50 mm and an inner radius $R_{in}$ of 35 mm. The disc 272 has an outer radius r of 25 mm. Thus, the distance between the ring 270 and the disc 272 is 10 mm. In this embodiment, the gap between the active electrodes 228 of the transmit resonator and the active electrodes 248 of the receive resonator is 24 mm. The separation distance between the active electrodes 228 of the transmit resonator and the passive electrode 260 is 3 mm. While the active electrodes 228 of the transmit resonator are shown, the active electrodes 248 of the receive resonator have the same dimensions.

As the passive electrode 260 encompasses the active electrodes 228 of the transmit resonator, the radius of the passive electrode 260 must be greater than the outer radius R of the disc 270 of the active electrodes 228 of the transmit resonator.

Figure 26:
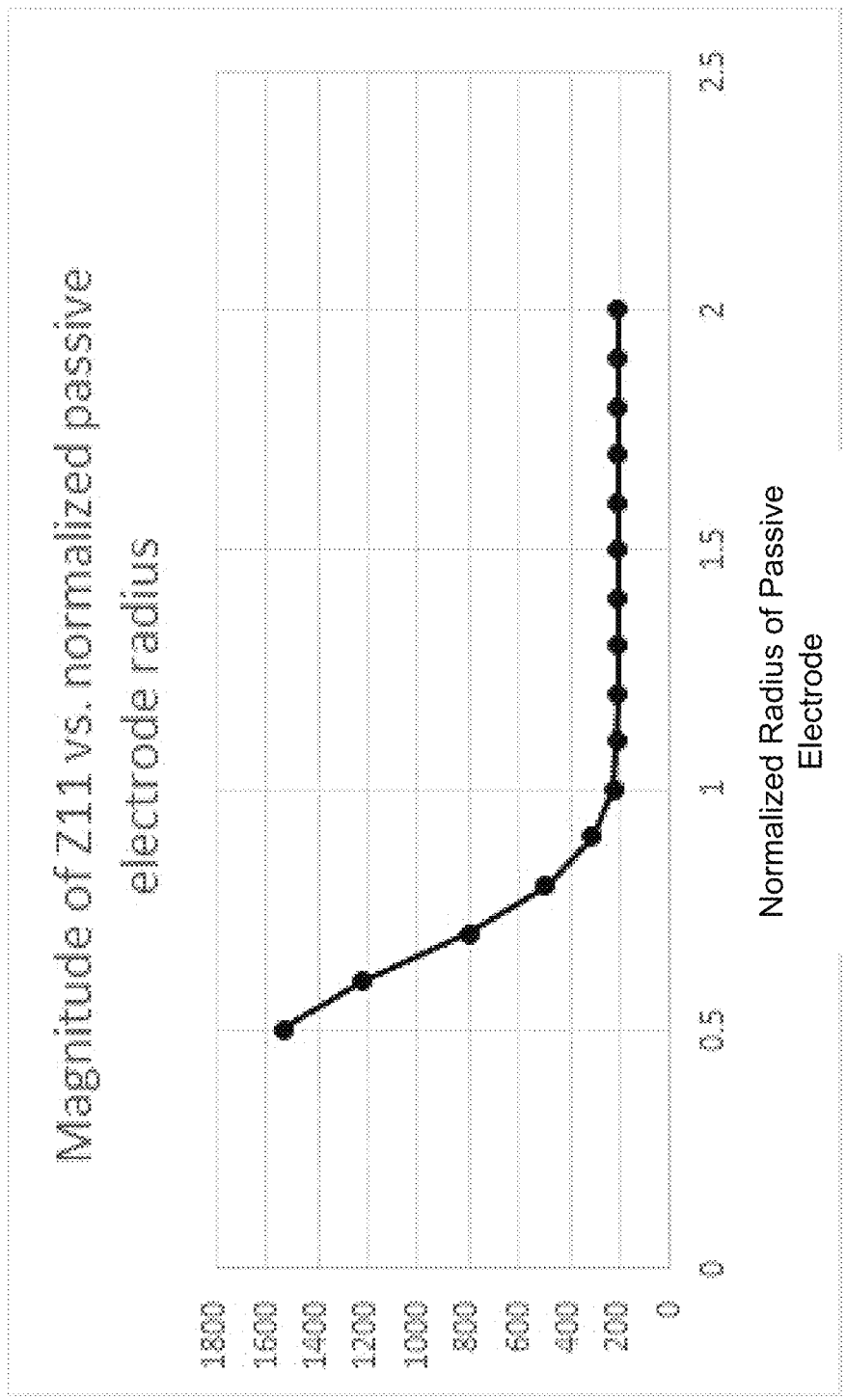
FIG. 26 is a graph of self-impedance of the active electrodes of the transmit resonator versus the normalized radius of the passive electrode of FIG. 24.

Turning now to FIG. 26, a graph depicting the self-impedance of the active electrodes 228 of the transmit resonator versus the normalized radius of the passive electrode 260 of FIG. 24 is shown. The normalized radius is the radius of the passive electrode 260 divided by the outer radius R of the ring 270. The impedance of the active electrodes 228 is influenced by a material of the passive electrode 260 when the radius of the passive electrode 260 is less than the outer radius R. To avoid this influence, the radius of the passive electrode 260 should be greater than the outer radius R of the ring 270.

Figure 27:
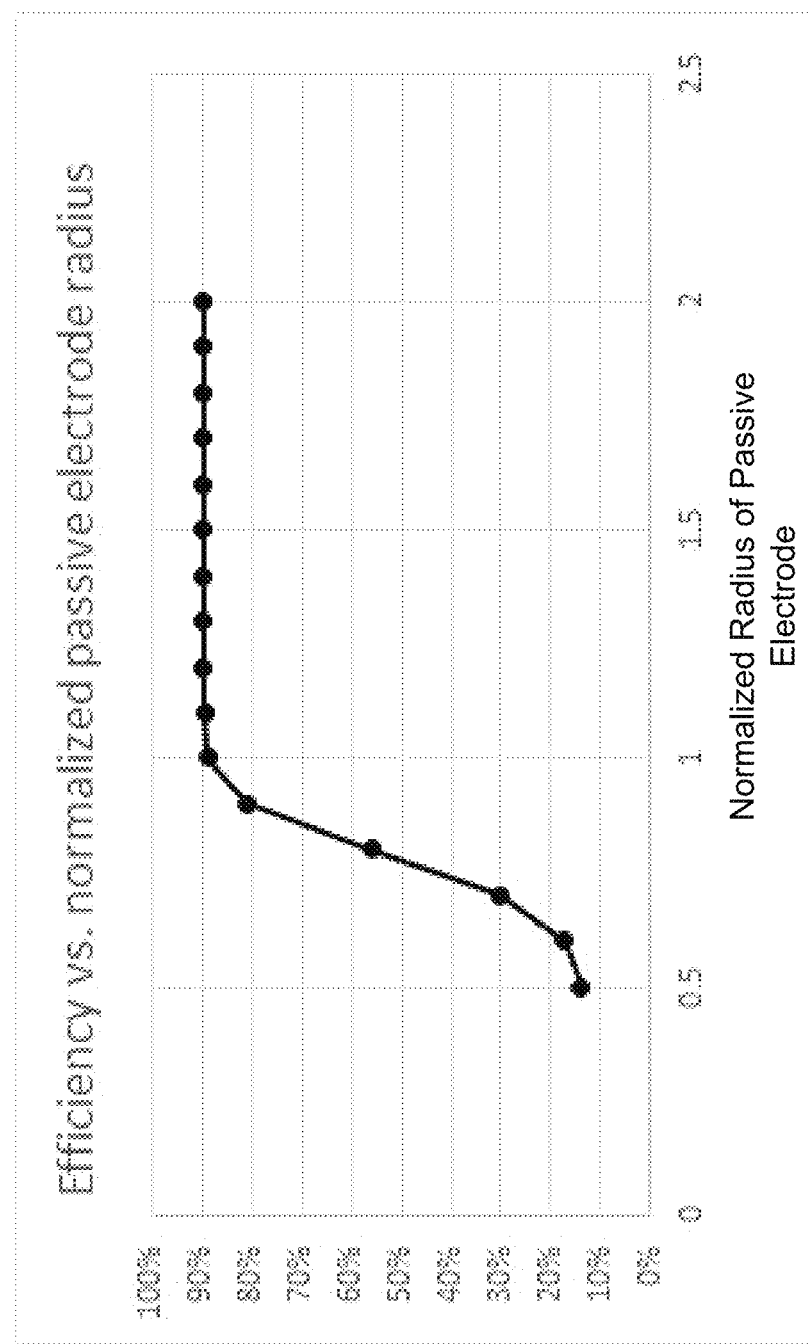
FIG. 27 is a graph of the RF efficiency of the wireless power transfer system comprising the active electrodes and passive electrode of FIG. 24 versus the normalized radius of the passive electrode of FIG. 24.

Turning now to FIG. 27, a graph depicting the RF efficiency of the system 20 comprising active electrodes 228 and 248, and passive electrode 260 versus the normalized radius of the passive electrode 260 of FIG. 24 is shown. When the radius of the passive electrode 260 is less than the outer radius R of the ring 270, the RF efficiency drops significantly below 90%.

Figure 28:
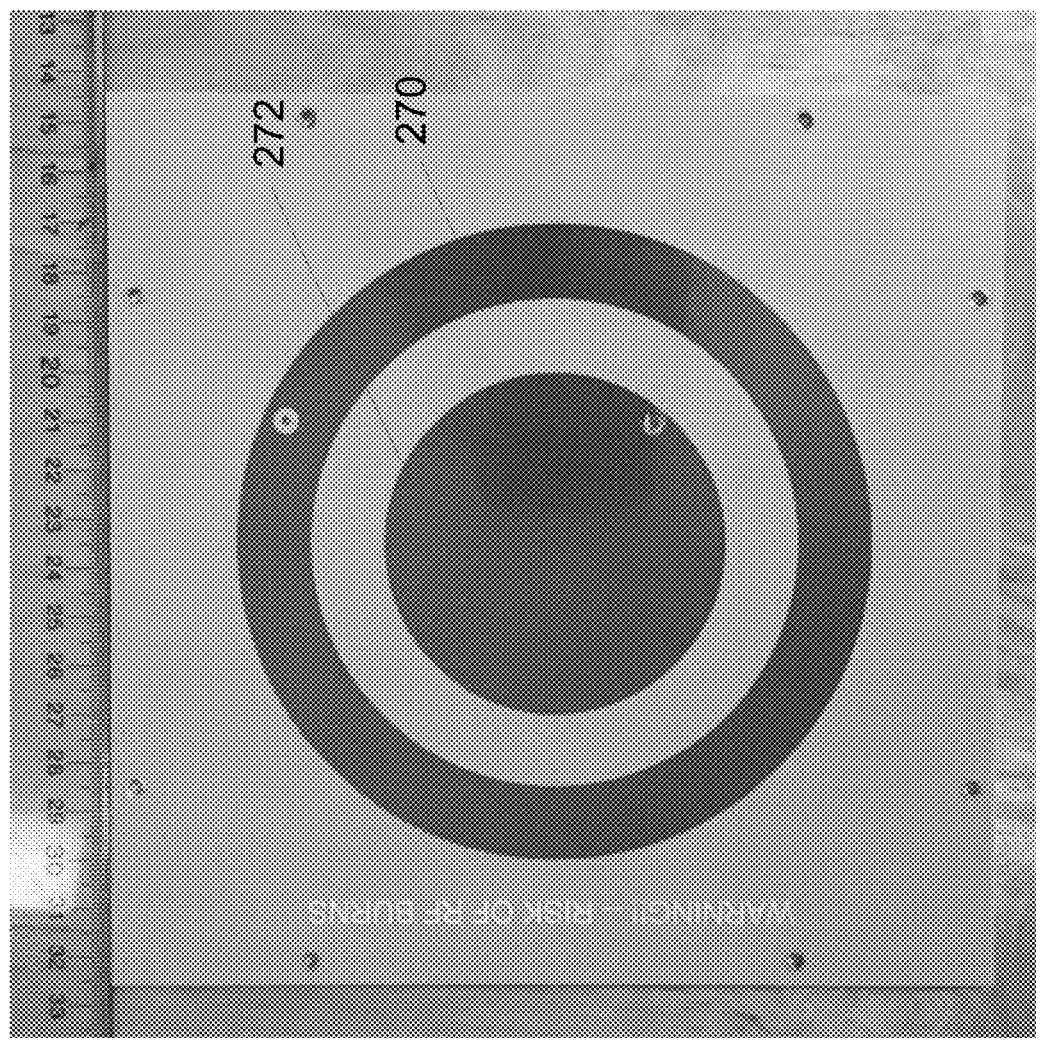
FIG. 28 is a plan view of the manufactured active electrodes of FIG. 25.

Turning now to FIG. 28, a plan view of a manufactured implementation of the active electrodes 228 for use in the system 20 is shown. As previously stated, the active electrodes 228 comprise two concentric electrodes in the form of a ring 270 and a disc 272, respectively. In this manufactured implementation, the ring 270 and disc 272 are printed on a PCB. The ring 270 has an outer radius R of 65 mm and an inner radius $R_{in}$ of 50 mm. The disc 272 has an outer radius r of 35 mm. The PCB has dimensions of 180 mm by 180 mm by 1.6 mm. The PCB is otherwise substantially featureless besides mounting holes.

Figure 29:
FIG. 29 is a perspective view of another embodiment of a passive electrode of the wireless power transfer system of FIG. 1 for use with the active electrodes of FIG. 28.

Turning now to FIG. 29, a perspective view of another embodiment of a passive electrode 274 for use with the active electrode 228. The passive electrode 274 is configured to be mounted opposite the disc 272 and the ring 272 depicted in FIG. 28. In this embodiment, the passive electrode 274 is shaped like an open box such that the sides of the box support the active electrodes 228 of the transmit resonator. In this embodiment, the sides of the box also support the perimeter of the PCB so that the disc 270 and ring 272 are elevated above the largest face of the passive electrode 274. The largest face of the passive electrode 274 is the bottom of the box. The depth of the box is 5.5 mm. The bottom of the box is 160 mm by 160 mm.

Figure 30:
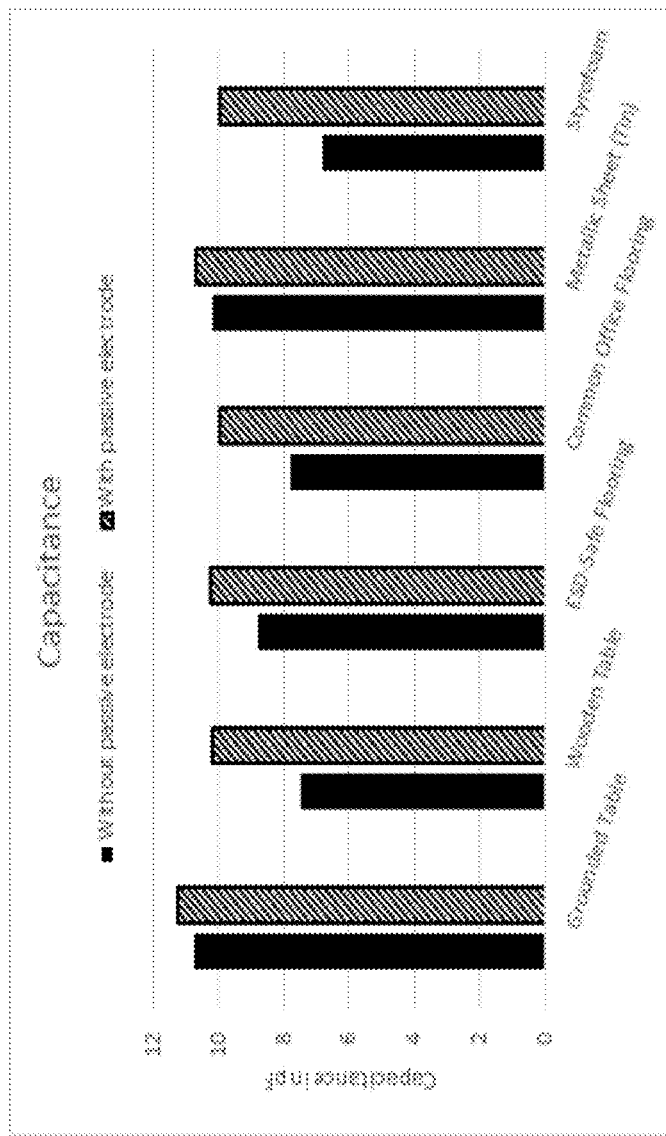
FIG. 30 is a graph of the capacitance of the active electrodes of the transmit resonator with and without the passive electrode of FIG. 29 on top of different test materials.

Turning now to FIG. 30, a graph of the capacitance of the capacitor 52 of the transmit resonator of the system 20 with and without the passive electrode 274 of FIG. 29 on top of different test materials is shown. The test materials are a grounded table, a wooden table, electrostatic discharge (ESD) safe flooring, common office flooring, a metallic sheet of tin and Styrofoam. The capacitance of the capacitor 52 was measured with a Rohde & Schwarz ZNB 4 Vector Network Analyzer. As previously described, the passive electrode 274 provides additional capacitance to the capacitor 52. When the test materials are highly conductive (e.g. grounded table, metallic sheet), the capacitance of the capacitor 52 with and without the passive electrode 274 are similar. The passive electrode 274 prevents variation in the capacitance of the capacitor 52 between test materials. The standard deviation of the capacitance is: 1.44 pF without the passive electrode 294; and 0.46 pF with the passive electrode 274. The Styrofoam material is representative of the free space capacitance as Styrofoam is an airy foam.

Figure 31:
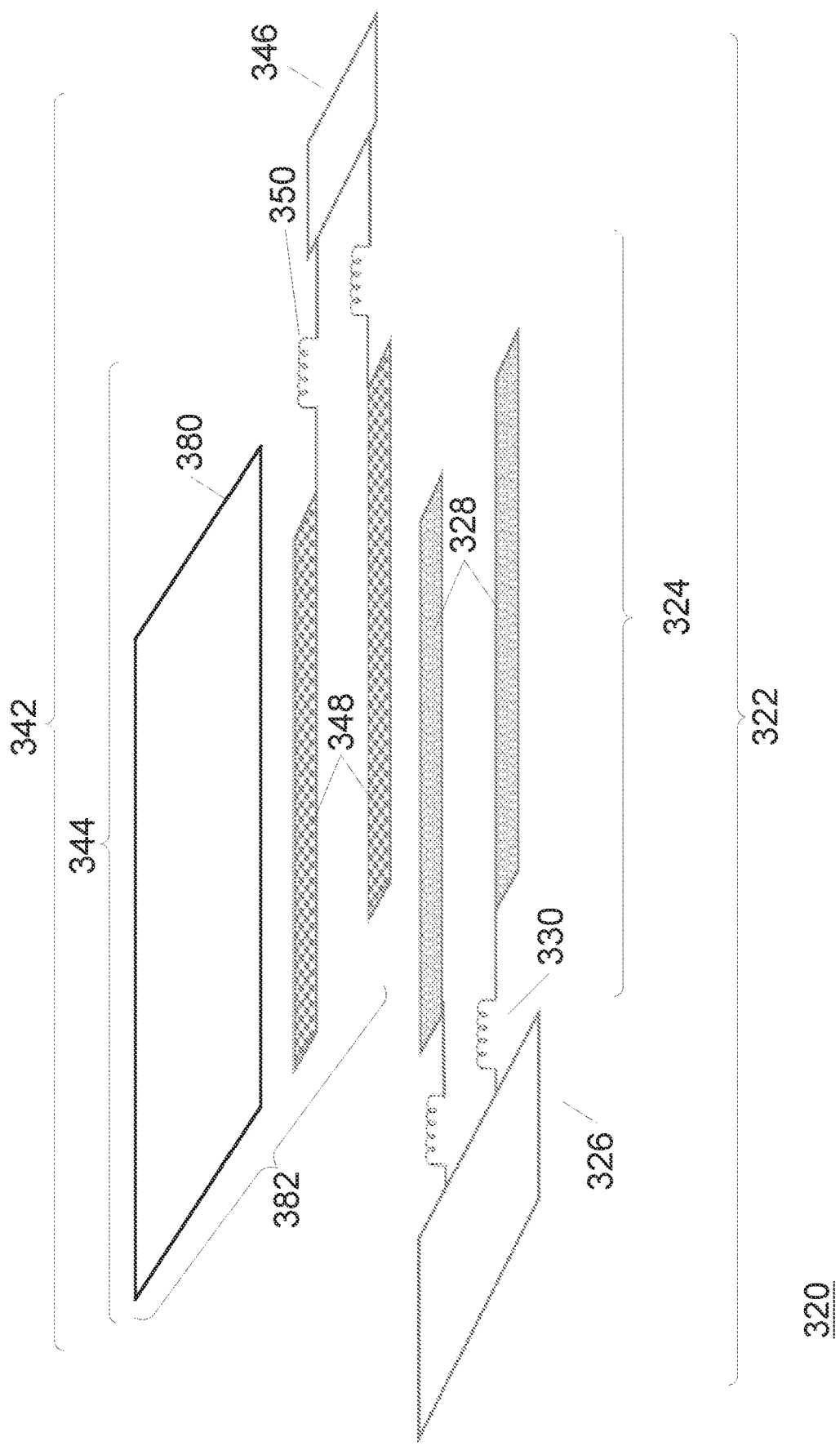
FIG. 31 is a schematic layout of another embodiment of a wireless power transfer system in accordance with an aspect of the disclosure.

While a system 20 comprising a passive electrode 60 adjacent two active electrodes 28 of a transmit resonator 24 has been described, one of skill in the art will appreciate that other configurations are possible. Turning now to FIG. 31, another embodiment of a wireless power transfer system is shown and is generally identified by reference numeral 320. The elements of the wireless power transfer system 320 are similar to the elements of the wireless power transfer system 20 previously described, unless otherwise stated, and are referred to with identical reference characters increased by 300. However, in contrast with the wireless power transfer system 20 shown in FIG. 1, the wireless power transfer system 320 does not comprise a passive electrode 60 adjacent active electrodes 328 of the transmit resonator 324.

In this embodiment, the active electrodes 348 of the receive resonator 342 form a receive capacitor 382 with a passive electrode 380. In particular, the receiver 342 comprises the receive resonator 342 electrically connected to a load 346. The receive resonator 342 comprises the receive capacitor 382 and two inductive coils 350. The receive capacitor 382 comprises two active electrodes 348 and the passive electrode 380. Similar to the passive electrode 60 of the wireless power transfer system 20, the passive electrode 380 is configured to encompass the active electrodes 348 to at least partially eliminate environmental influences affecting the active electrodes 348. The passive electrode 380 provide additional capacitance to the system, reducing the required inductance. Each inductive coil 350 is electrically connected to an active electrode 348 and the load 346.

The passive electrode 380 is configured to encompass the active electrodes 348 to at least partially eliminate environmental influences affecting the active electrodes 348 such that the active electrodes 348 are presented with a generally constant environment regardless of the actual environment that lies on the opposite side of the passive electrode 380 relative to the active electrodes 348 as previously described. The passive electrode 380 also provides additional capacitance to the system 320, reducing the required inductance.

In this embodiment, the passive electrode 380 comprises an elongate element. The elongate element is formed of electrically conductive material. The elongate element is in the form of a generally rectangular, planar plate with opposed major surfaces. The passive electrode 380 is adjacent the active electrodes 348. The passive electrode 380 encompasses the active electrodes 348. The passive electrode 380 and the active electrodes 348 form the capacitor 382. In this embodiment, the passive electrode 380 is generally parallel to the active electrodes 348. The active electrodes 348 and the passive electrode 380 are in generally parallel planes.

In this embodiment, the passive electrode 380 is ungrounded. The passive electrode 380 is isolated.

In this embodiment, the passive electrode 380 is non-radiating.

In this embodiment, the components of the receive resonator 344 are configured to operate in the near field. Therefore, the passive electrode 380 is configured to operate in the near field.

In this embodiment, the passive electrode 380 is electrically small. The passive electrode 380 is electrically small when the physical length of the passive electrode 380 is less than $\lambda/10$. $\lambda$ is the wavelength of a source signal from a power source. For the source signal with a frequency of 13.56 MHz output by the power source 26, $\lambda$ is approximately 22 m. Therefore, the passive electrode 380 is electrically small when the physical length of the passive electrode 380 is less than approximately 2.2 m.

The receive resonator 344 is configured to extract power from a generated electric field via resonate electric field coupling as previously described.

Figure 32:
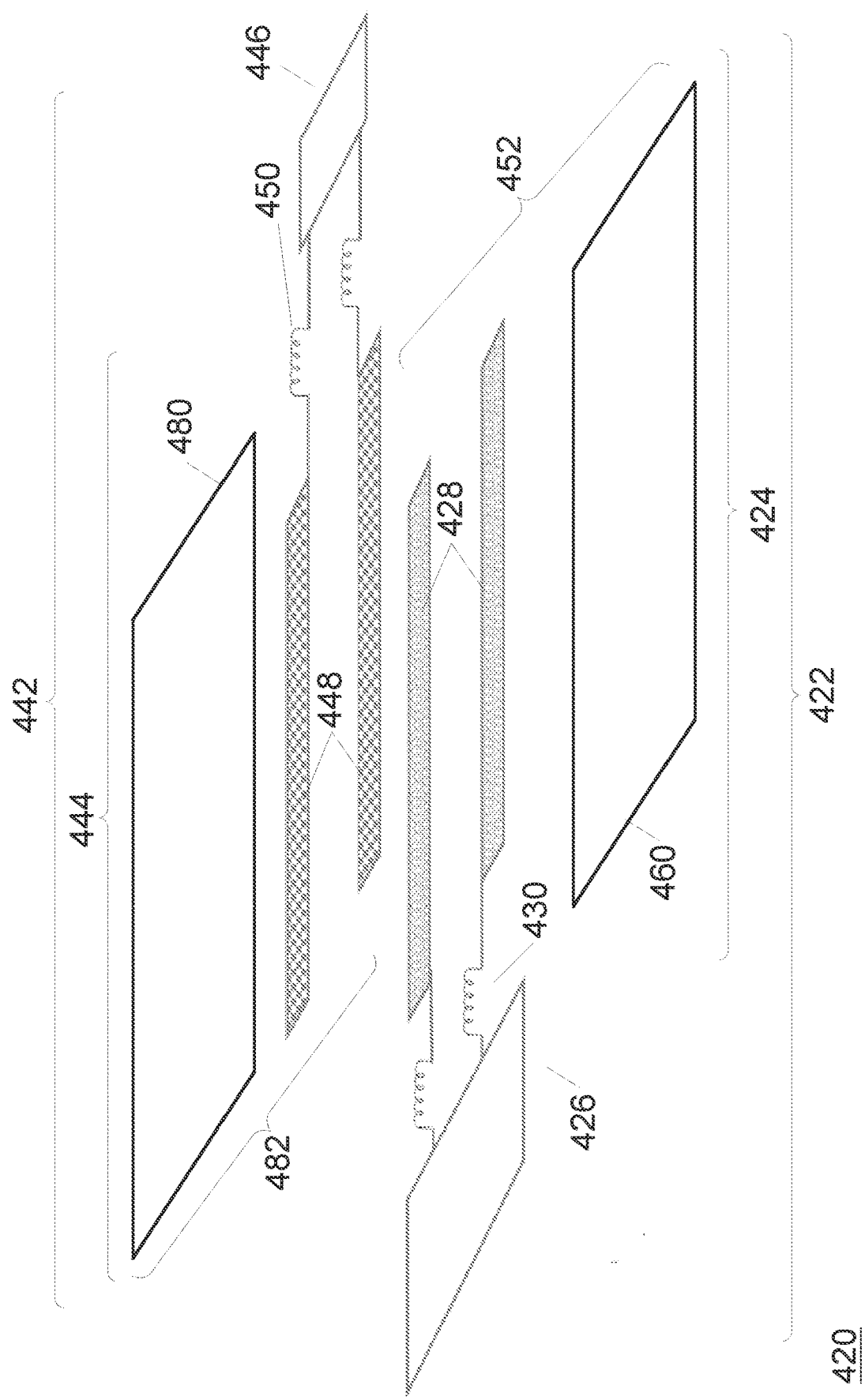
FIG. 32 is a schematic layout of another embodiment of a wireless power transfer system in accordance with an aspect of the disclosure.

While a system 20 comprising a passive electrode 60 adjacent two active electrodes 28 of a transmit resonator 24 has been described, one of skill in the art will appreciate that other configurations are possible. Turning now to FIG. 32, another embodiment of a wireless power transfer system is shown and is generally identified by reference numeral 420. The elements of the wireless power transfer system 420 are similar to the elements of the wireless power transfer system 20 previously described, unless otherwise stated, and are referred to with identical reference characters increased by 400.

In this embodiment, the active electrodes 428 of the transmit resonator 424 form a capacitor 452 with a first passive electrode 460, and the active electrodes 448 of the receive resonator 444 form a capacitor 482 with a second passive electrode 480. In particular, the transmitter 422 comprises the transmit resonator 424 electrically connected to a power source 426. The transmit resonator 424 comprises two active electrodes 428 and the first passive electrode 460. Each inductive coil 430 is electrically connected to an active electrode 428 and the power source 426.

The receiver 442 comprises the receive resonator 444 electrically connected to a load 446. The receive resonator 444 comprises the capacitor 482 and two inductive coils 450. The capacitor 482 comprises two active electrodes 448 and the second passive electrode 480. Each inductive coil 450 is electrically connected to an active electrode 448 and the load 446.

Similar to the passive electrode 60 of the wireless power transfer system 20, the first passive electrode 460 is configured to encompass the active electrodes 428 of the transmit resonator 424 to at least partially eliminate environmental influences affecting the active electrodes 428, and the second passive electrode 480 is configured to encompass the active electrodes 448 of the receive resonator 444 to at least partially eliminate environmental influences affecting the active electrodes 448. The first and second passive electrodes 460 and 480, respectively, also provide additional capacitance to the system 420, reducing the required inductance.

The first passive electrode 460 is configured to encompass the active electrodes 428 to at least partially eliminate environmental influences affecting the active electrodes 428 such that the active electrodes 428 are presented with a generally constant environment regardless of the actual environment that lies on the opposite side of the first passive electrode 460 relative to the active electrodes 428 as previously described. The first passive electrode provides additional capacitance to the system, reducing the required inductance. Similarly, the second passive electrode 480 is configured to encompass the active electrodes 448 to at least partially eliminate environmental influences affecting the active electrodes 448 of the receive resonator 444 such that the active electrodes 448 are presented with a generally constant environment regardless of the actual environment that lies on the opposite side of the passive electrode 480 relative to the active electrodes 448 as previously described. The second passive electrode provides additional capacitance to the system, reducing the required inductance.

In this embodiment, each of the first and second passive electrodes 460 and 480 comprise an elongate element. The elongate element is formed of electrically conductive material. The elongate element is in the form of a generally rectangular, planar plate with opposed major surfaces. The first passive electrode 460 is adjacent the active electrodes 428 of the transmit resonator 424. The second passive electrode 480 is adjacent the active electrodes 448 of the receive resonator 444. The first passive electrode 460 encompasses the active electrodes 428 of the transmit resonator 424. The second passive electrode 480 encompasses the active electrodes 448 of the transmit resonator 444. The first passive electrode 460 and the active electrodes 428 of the transmit resonator 424 form the capacitor 452. The second passive electrode 480 and the active electrodes 448 of the receive resonator 444 form the capacitor 482. In this embodiment, the first and second passive electrodes 460 and 480 are generally parallel to the active electrodes 428 and 448. The active electrodes 428 and 448, and the first and second passive electrodes 460 and 480 are in generally parallel planes.

In this embodiment, the first and second passive electrodes 460 and 480 are ungrounded. The first and second passive electrodes 460 and 480 are isolated.

In this embodiment, the first and second passive electrodes 460 and 480 are non-radiating.

In this embodiment, the components of the transmit and receive resonator 424 and 444 are configured to operate in the near field.

In this embodiment, the first and second passive electrodes 460 and 480 are electrically small. The first and second passive electrodes 460 and 480 are electrically small when the physical length of each passive electrode 460 and 480 is less than $\lambda/10$. $\lambda$ is the wavelength of the source signal from a power source. For a source signal with a frequency of 13.56 MHz, $\lambda$ is approximately 22 m. Therefore, the first and second passive electrodes 460 and 480 are electrically small when the physical length of the first and second passive electrodes 460 and 480 is less than approximately 2.2 m.

In this embodiment, the resonant frequency of the transmit resonator 424 is 13.56 MHz. In this embodiment, each active electrode 428 and 448 is 50 mm by 200 mm. The active electrodes 428 of the transmit resonator 424 are 100 mm from the active electrodes 448 of the receive resonator 444. Each of the first and second passive electrodes 460 and 480 are 400 mm by 600 mm.

As previously discussed, the additional capacitance from the first and second passive electrodes 460 and 480 compared to a wireless power transfer system that does not comprise the first and second passive electrodes 460 and 480, reduces the required inductance for the inductive coils 430 and 450 in both the transmitter 422 and the receiver 442 to operate at a resonant frequency of 13.56 MHz. In this embodiment, the inductance of the inductive coils 430 and 450 of the wireless power transfer system 420 is reduced from 43.2 µH to 39.5 µH.

Figure 33:
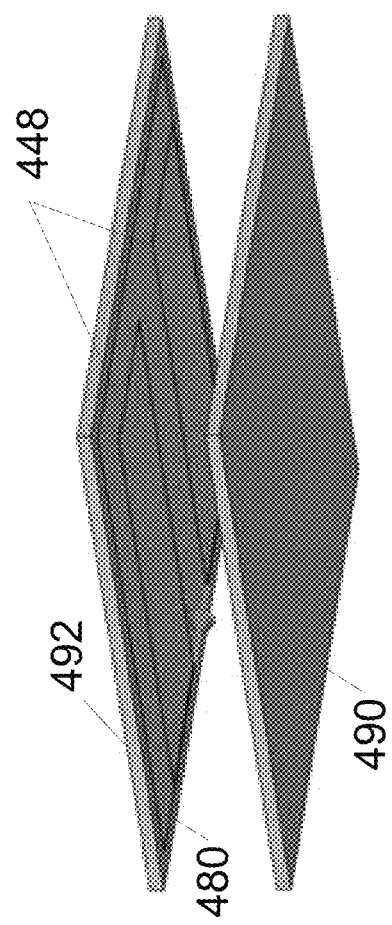
FIG. 33 is a perspective view of another embodiment of the transmit and receive resonators, and passive electrodes of the wireless power transfer system of FIG. 32.

While an embodiment of the first and second passive electrodes 460 and 480 have been described, one of skill in the art will appreciate that variations are possible. Turning now to FIG. 33, a perspective view of elements of the first and second passive electrodes 460 and 480, respectively, and the active electrodes 448 of the receive resonator 444 is shown. The active electrodes 428 of the transmit resonator 424 are present, but not pictured.

In this embodiment, the active electrodes 428 and 428 each have a length (h) equal to 100 mm and a width (w) equal to 37.5 mm. The passive electrodes 460 and 480 each have a length (y) equal 110 mm to and a width (x) equal to 110 mm. The lateral gap (g) between the active electrodes 428 of the transmit resonator 424 is equal to the lateral gap between the active electrodes 448 of the receive resonator 444, and is equal to 25 mm. The separation distance (D1) between the active electrodes 428 of the transmit resonator 424 and the first passive electrode 460 is equal to 2 mm. The separation distance (D) between the active electrodes 428 of the transmit resonator 424 and the active electrodes 448 of the receive resonator 444 is equal to 20 mm. The inductance on each resonator is 12.6 pH when the passive electrodes 460 and 480 are present. The efficiency of the system 420 is 88%. The inductance of each resonator is 12.7 pH when the passive electrodes 460 and 480 are not present.

In this embodiment, the first and second passive electrodes 460 and 480, respectively, each further comprise dissipative material affixed to the edges and/or along the perimeter of the each passive electrode 460 and 480. The dissipative material is affixed to the respective passive electrode on a face of the passive electrode opposite the respective active electrodes. The edges and corners of the passive electrodes 460 and 480 can be sources of high electric field strength, via stray electric fields. These stray electric fields may cause electromagnetic interference. The dissipative material on the edges and/or along the perimeter of the passive electrodes 460 and 480 suppresses the stray electric fields emanating from the passive electrodes 460 and 480.

The dissipative material affixed to each passive electrode 460 and 480 has a conductivity between $10^{-6}$ and $10^{-12}$ S/m. This range of conductivities provides ideal absorption of electric field energy. Below this range induced currents are met with little resistance; therefore, little energy is lost. Above this range charge induced currents are inhibited by the resistance of the dissipative material; therefore, only a small amount of energy is dissipated. The containment of stray electric fields is desirable for safety and electromagnetic interference (EMI) purposes. Examples of dissipative materials include plastics with carbon additives and carbon fiber. The dissipative material does not influence the efficiency of the system 420 as the dissipative material is positioned on a side of the respective passive electrode 460 and 480 that opposite the active electrodes 428 and 448 of the transmit and receive resonators 424 and 444, respectively.

In this embodiment, a first dissipative material 490 is affixed to the first passive electrode 460 and a second dissipative material 492 is affixed to the second passive electrode 480. The first dissipative material 490 is a plastic sheet placed adjacent the first passive electrode 460 opposite the active electrodes 428 of the transmit resonator 424. The second dissipative material 492 is a plastic sheet placed adjacent the second passive electrode 480 opposite the active electrodes 448 of the transmit resonator 444. The plastic sheets have identical dimensions. Each plastic sheet has the dimensions of 121 mm (length)×121 mm (width)×1 mm (thickness).

Figure 34:
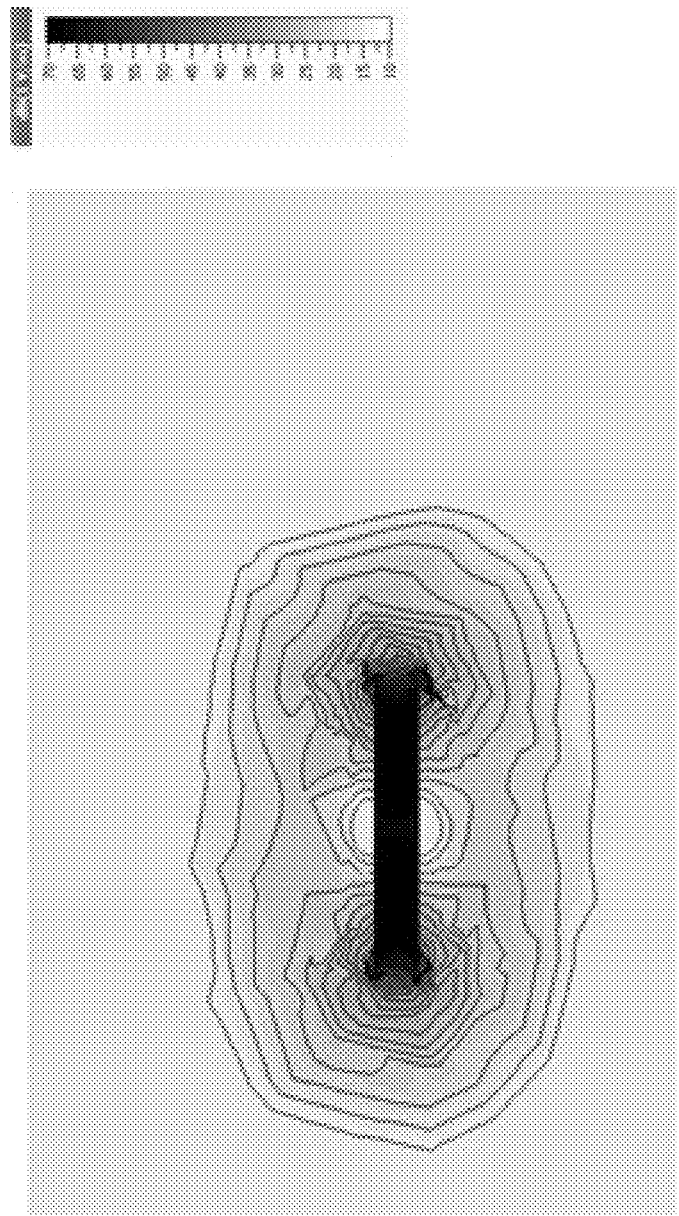
FIG. 34 is a contour plot of the electric field emanating from the system of FIG. 33.
Figure 35:
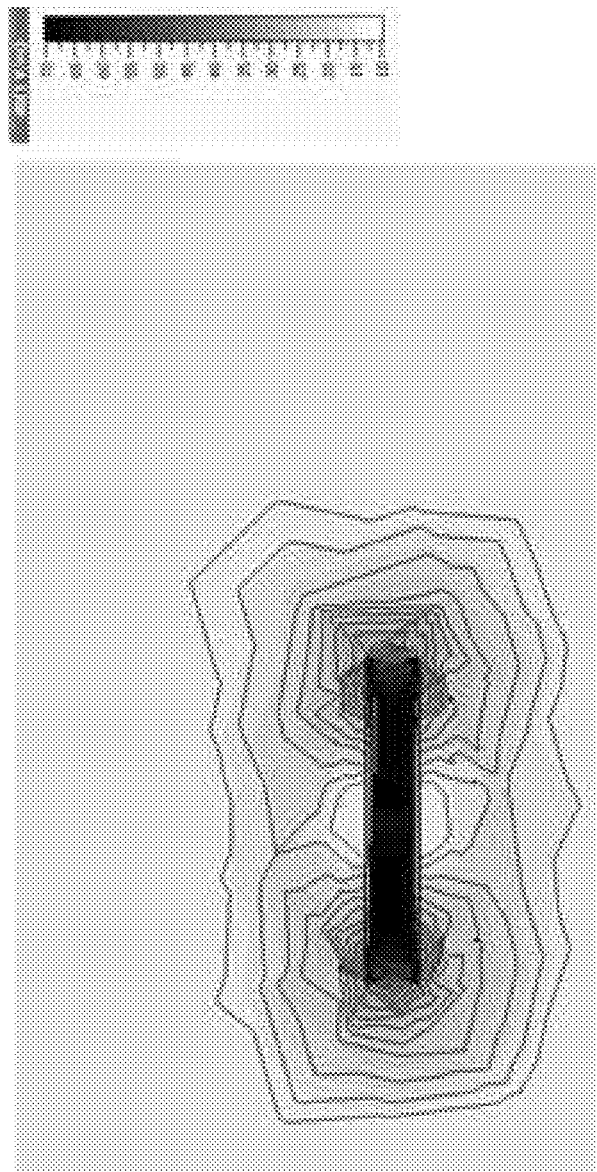
FIG. 35 is another contour plot of the electric field emanating from the system of FIG. 33.
Figure 36:
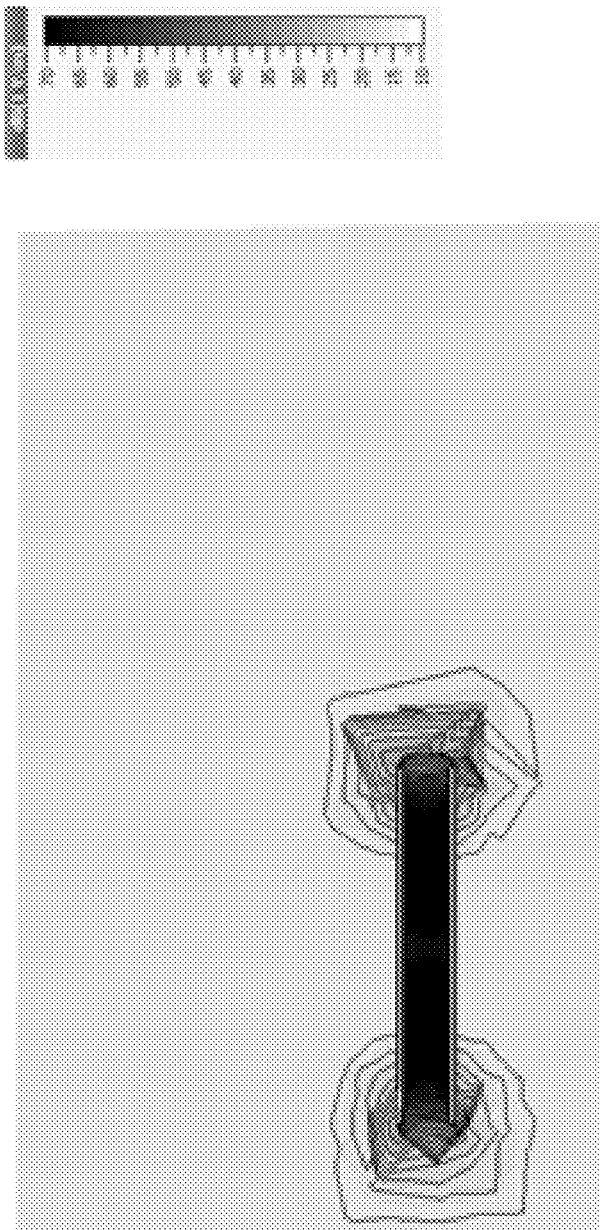
FIG. 36 is another contour plot of the electric field emanating from the system of FIG. 33.

Turning now to FIGS. 34 to 36, contour plots of the electric field emanating from the wireless power system 420 are shown. The contour plots are cross-sectional views taken along the diagonal of the capacitors 452 and 482, and the cross section is perpendicular to the passive electrodes 460 and 480. The scale on the contour plots is in dBV/m and each contour is an increment of 2.5 dBV/m.

FIG. 34 is a contour plot of the electric field emanating from the wireless power system 420 when the first and second dissipative materials 490 and 492 are not present.

FIG. 35 is a contour plot of the electric field emanating from the wireless power system 420 when the first and second dissipative materials 490 and 492 are present, and the dissipative materials 490 and 492 are plastic sheets.

FIG. 36 is a contour plot of the electric field emanating from the wireless power system 420 when the first and second dissipative materials 490 and 492 are present, and the dissipative materials 490 and 492 are plastic sheets. The conductivity of the plastic sheets was increased from 0 (perfect insulator) to $10^{-8}$ S/m. At this conductivity the plastic sheets become dissipative and easily absorb RF energy. Clearly, the addition of the dissipative plastic sheets more effectively suppresses the stray electric field compared to stray electric fields present in the contour plots of FIGS. 34 and 35.

While a particular embodiment of a resonator has been described, one of skill in the art will appreciate that variations are possible. In another embodiment, the resonator comprises a capacitor and a single inductive coil. The capacitor comprises two active electrodes and a passive electrode adjacent the active electrode. The passive electrode is configured to encompass the active electrodes to at least partially eliminate environmental influences affecting the active electrodes. The passive electrode is configured to provide additional capacitance to the system. The passive electrode is configured to lower the inductance required to achieve resonance. The inductive coil is electrically connected to an active electrode. In this embodiment, the inductive coil is located on the opposite side of the passive electrode relative to the active electrodes. The inductive coil is electrically connected to the active electrodes via one or more wires that pass through a hole in the passive electrode. The hole in the passive electrode is larger than the radius of the wire. The hole is not greater than 10 times the radius of the wire connecting the inductive coil and the active electrodes.

In another embodiment, the hole is filled with an insulating material.

In another embodiment, the wire connecting the active electrodes with the inductive coil is insulated. The hole is sized to accommodate the insulation around the wire connecting the active electrode with the inductive coil.

In another embodiment, the wires connecting the coil and active electrodes run around the passive electrode.

Figure 37:
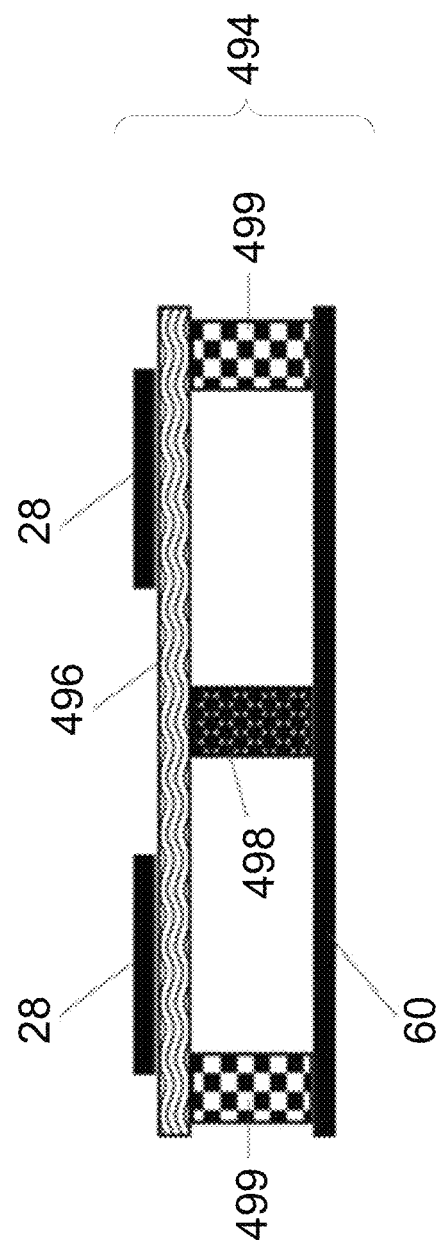
FIG. 37 is a side elevation view of another embodiment of the capacitor of the wireless power transfer system of FIG. 1.

While a particular embodiment of the capacitor 52 of the wireless power transfer system 20 has been described, one of skill in the art will appreciate that variations are possible. Turning now to FIG. 37, another embodiment of a capacitor 494 is shown. Generally, the capacitor 494 is configured to control the separation distance between the passive electrode 60 and the active electrodes 28 of the transmit resonator 24.

In this embodiment, the capacitor 494 comprises the active electrodes 28 of the transmit resonator 24 and passive electrode 60 as previously described; and further comprises a substrate 496 upon which the active electrodes 28 are affixed, an actuator 498 and two (2) telescopic supports 499 extending between the substrate 496 and the passive electrode 60, and a microcontroller.

The substrate 496 is configured to not affect the wireless power transfer between the transmit resonator 24 and the receive resonator 44 of the system 20. The active electrodes 28 are affixed to the substrate 496 and the substrate 496 extends between the active electrodes 28. A major surface of each active electrode 28 is affixed to the substrate 496. In this embodiment, the substrate 496 is plastic. In other embodiments, the substrate 496 is one of fiberglass, ceramic and styrofoam. In another embedment, the substrate 496 is a printed circuit board. The substrate 496 is an elongate rigid member that at least spans the perimeter of the active electrodes 28. The substrate 496 has similar dimensions as the passive electrode 60. The substrate 496 is parallel to the passive electrode 60 in the x-y axis. The x and y axes are perpendicular to each other and to the normal vectors of the passive electrode 60 and the substrate 496 major faces.

The passive electrode 60 is spaced from the substrate 496. The actuator 498 is within this space extending between the passive electrode 60 and the substrate at a point that is approximately central to both the passive electrode 60 and the substrate 496 in the x-y axis defined by the passive electrode 60 and the substrate 496. The actuator 498 is affixed to a major surface of the substrate 496 and to a major surface of the passive electrode 60. In this embodiment, the actuator 498 is a motor. In another embodiment, the actuator 498 is a piezoelectric device.

The two (2) telescopic supports 499 are within the space between the passive electrode 60 and the substrate 496. Each telescopic support 499 is affixed to a major surface of the substrate 496 and to a major surface of the passive electrode 60. The telescopic supports 499 are generally located at opposite ends of the substrate 496 and passive electrode 60. The telescopic supports 499 are equidistant from the actuator 498. The telescopic supports 499 are configured to extend thereby increasing the separation distance between the passive electrode 60 and the active electrodes 28 of the transmit resonator 24, and to telescope thereby decreasing the separation distance between the passive electrode 60 and the active electrodes 28 of the transmit resonator 24. While two (2) telescopic supports 499 are described, one of skill in the art will appreciate that more may be included.

In this embodiment, actuation of the actuator 498 is controlled by a microcontroller (not pictured). The microcontroller is programmable with software to control the actuator 498. The microcontroller is located remote from the actuator 498 and communicates with the actuator 498 via conventional communication methods such as BlueTooth™ or WiFi™.

In use, the actuator 498 is actuated to increase the separation distance between the passive electrode 60 and the active electrodes 28, or to decrease the separation distance between the passive electrode 60 and the active electrodes 28. As the actuator 498 increases or decreases the separation distance, the telescopic supports 499 extend or telescope, respectively, such that the separation distance is uniformly increased or decreased along the entire spans of the active electrodes 28 and passive electrode 60.

As previously stated, actuation of the actuator 498 is controlled by the microcontroller. In another embodiment, actuation of the actuator 498 is manually controlled. In another embodiment, the microcontroller receives inputs from sensors that detect at least one of the separation distance between the passive electrode 60 and the active electrodes 28 and electric field strength.

As previously stated, the capacitor 494 is configured to control the separation distance between the passive electrode 60 and the active electrodes 28 of the transmit resonator 24. As previously stated, decreasing the separation distance between the passive electrode 60 and the active electrodes 28 reduces the potential range of the electric field generated by the transmit resonator 24 which decreases the power transfer efficiency if the distance between the transmit and receive resonators 24 and 44 is maintained. Furthermore, decreasing the separation distance between the passive electrode 60 and the active electrodes 28 increases the capacitance added to the capacitor 494 and decreases the required inductance of the system 20. Varying the capacitance of the system 20 by varying the capacitance added to the capacitor 494 tunes the resonant frequency of the transmit resonator 24.

The microcontroller is programmed to control power transfer efficiency, the additional capacitance provided to the system 20 by the passive electrode 60 and the decrease in the required inductance of the system 20 by varying the separation distance between the passive electrode 60 and the active electrodes 28 such that the desired balance between these parameters may be achieved. Furthermore, the microcontroller can control the capacitance of the system 20 by varying the separation distance to tune the resonant frequency of the transmit resonator 24.

As one of skill in the art will appreciate, the various wireless power transfer systems 20, 120, 320 and 420 discussed may be employed in a variety of diverse applications. For example, in one application the wireless power transfer system 20 is employed in connection with charging a battery of an autonomous vehicle. Autonomous vehicles are used in agriculture, golf course maintenance and households for surveillance and robotic labour, such as a robotic lawn mower. In this application, the transmitter 22 is positioned in soil or the ground and used to recharge the battery of the autonomous vehicle. The transmitter 22 is positioned in the soil or the ground such that soil or ground material is not located between the passive electrode 60 and the active electrodes 28. Furthermore, the transmitter 22 is positioned on the soil or the ground such that soil or ground material is not immediately adjacent the active electrodes 28. The autonomous vehicle comprises the receiver 42.

The wireless transfer of power between the transmitter 22 on the soil and the receiver 42 in the autonomous vehicle allows the autonomous vehicle to be recharged without user input. When the transmitter 22 is positioned in or on soil, the dielectric properties of soil can affect the power transfer of power between the transmitter 22 and receiver 42 as previously described. Similarly, when the transmitter 22 is positioned in the ground, the power transfer between the transmitter 22 and receiver 42 may be affected by environmental influences. Positioning the passive electrode 60 adjacent the active electrode 28 of the transmit resonator 24 opposite the receiver 42 at least partially eliminates environmental influences affecting the active electrodes 28 and provides additional capacitance, reducing the required inductance of the system as previously described.

Figure 38:
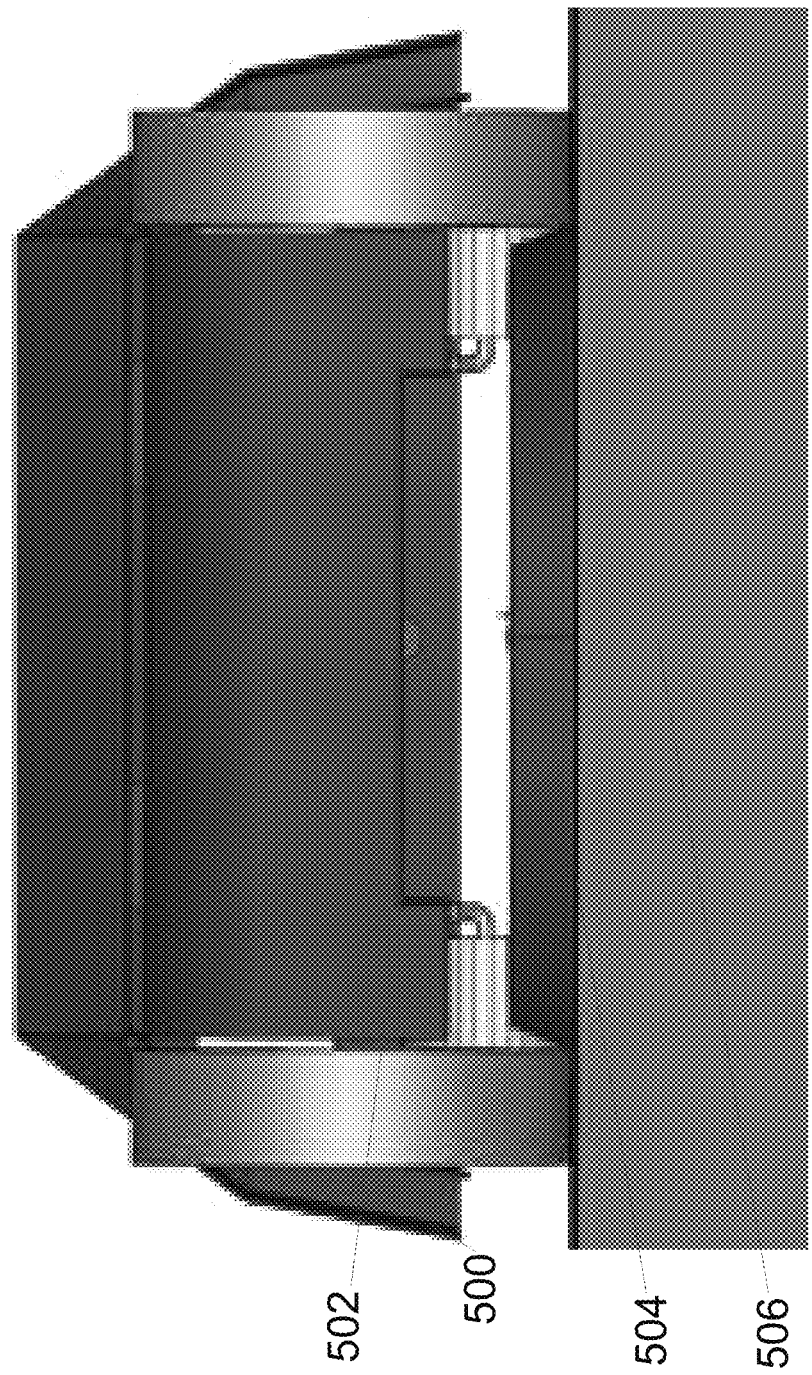
FIG. 38 is a front elevation view of an autonomous vehicle equipped with a receiver positioned over a transmitter and a passive electrode.

Accordingly, an example application of the passive electrode is provided. A front elevation view of an autonomous vehicle is shown in FIG. 38. The autonomous vehicle is generally identified by reference numeral 500. The autonomous vehicle 500 comprises a propulsion system configured to propel the vehicle 500, a power system configured to power the propulsion system, a series of sensors (touch, optical, etc.) configured to detect environmental information (such as obstacles, bar codes, QR codes, colour) and a control system configured to process the information from the sensors in order to control the propulsion system and the power system to achieve a predefined goal or goals. The propulsion system comprises a motor connected to two or more wheels. The power system comprises a receive resonator electrically connected to a load in the form of a battery.

One of skill in the art will appreciate that the propulsion system may comprise other components such as, but not limited to, tracks and/or actuators.

The receive resonator comprises a capacitor and two inductive coils. The capacitor comprises two active electrodes 502 electrically connected in series to the inductive coils. The inductive coils are electrically connected to the load. The receiver is configured to extract power from a transmitter via wireless resonant electric field coupling as previously described. The transmitter comprises a transmit resonator electrically connected to a power source. The transmit resonator comprises a capacitor and two inductive coils. The inductive coils are electrically connected to the power source. The capacitor comprises two active electrodes 504 and a passive electrode 106 positioned adjacent the active electrodes 504 of the transmit resonator opposite the autonomous vehicle 500. The inductive coils are electrically connected in series to the active electrodes 504. The transmit resonator is configured to generate an electric field to transfer power to the receiver via resonant electric field coupling as previously described. The passive electrode 506 is configured to encompass the active electrodes 504 to at least partially eliminate environmental influences affecting the active electrodes 504 such that the active electrodes 28 are presented with a generally constant environment independent of soil conditions (or other substrates) as previously described. The passive electrode 506 provides additional capacitance to the capacitor of the transmit resonator as previously described. The passive electrode 506 reduces the amount of inductance needed to resonate at the resonant frequency as previously described. In this embodiment the autonomous vehicle 500 does not contain an auto tuning circuit, which reduces costs and allows for more power to be delivered to the load.

In this embodiment, the passive electrode 506 is ungrounded. The passive electrode 506 is isolated.

In this embodiment, the passive electrode 506 is non-radiating.

In this embodiment, the passive electrode 506 is electrically small. The passive electrode 506 is electrically small when the physical length of the passive electrode 506 is less than λ/10. A is the wavelength of the source signal from a power source. For a source signal with a frequency of 13.56 MHz, A is approximately 22 m. Therefore, the passive electrode 506 is electrically small when the physical length of the passive electrode 506 is less than approximately 2.2 m.

During operation, power is transferred from the power source to the active electrodes 504 of the transmit resonator via the inductive coil. The power signal from the power source transmitted to the active electrodes 504 via the inductive coil excites the transmit resonator causing the transmit resonator to generate an electric field. In this embodiment, the generated electric field is a near field. A differential voltage is applied on the active electrodes 504 of the transmit resonator, which creates an electric field in the surrounding environment. When the receive resonator is placed within the generated electric field and tuned to the resonant frequency of the transmit resonator, the receive resonator extracts power from the transmit resonator via resonant electric field coupling. The extracted power is then transferred from the receive resonator to a load electrically connected to the receive resonator. While the transmit resonator may generate a magnetic field, little, if any, power is transferred via magnetic field coupling.

Turning now to FIG. 39, a table showing the RF efficiency versus dielectric properties for a range of dielectric constants and loss tangents (the ratio of the imaginary to the real parts of the permittivity) for power transfer between the transmitter and receiver of FIG. 38 when the passive electrode 506 is present. As clearly shown in FIG. 39 the RF efficiency is generally uniform when the passive electrode 506 is present. Furthermore, there is a less than 5% variation in RF efficiency for the entire range of dielectric properties. The variation in RF efficiency is low such that the gradient in RF efficiency is not generally discernible. The range of dielectric constants represents a wide variety of soil conditions and other surfaces such as wood, asphalt and plastic.

Turning now to FIG. 40, a table showing the RF efficiency versus dielectric constants for a range of dielectric constants for power transfer between the transmitter and receiver of FIG. 38 when the passive electrode 506 is not present is shown. In comparison to the table of FIG. 39, there is a large region in FIG. 40 where the RF efficiency is less than 90%. The range of dielectric constants represents a wide variety of soil conditions and other surfaces such as wood and plastic.

Turning now to FIG. 41, a table showing the phase of the impedance seen by power the power supply versus dielectric properties for a range of dielectric constants and loss tangents (the ratio of the imaginary to the real parts of the permittivity) for power transfer between the transmitter and receiver of FIG. 38 when the passive electrode 506 is present. As clearly shown in FIG. 41, the phase of the impedance is generally low)(<7° when the passive electrode 506 is present. The power supply prefers to see impedances with a low phase, especially for higher powers, and may automatically shut off for phases above a predefined value (10 for example). The range of dielectric constants represents a wide variety of soil conditions and other surfaces such as wood, asphalt and plastic.

Turning now to FIG. 42, a table showing the phase of the impedance seen by power the power supply versus dielectric constants for a range of dielectric constants for power transfer between the transmitter and receiver of FIG. 38 when the passive electrode 506 is not present. In comparison to the table of FIG. 41, the majority of the dielectric properties in FIG. 42 have impedances with phase angles greater than 25, such that the power supply is presented with an unfavorable impedance. The range of dielectric constants represents a wide variety of soil conditions and other surfaces such as wood and plastic As will be appreciated, the passive electrode 506 ensures that the transmitter is robust enough to operate consistently on top of a wide variety of substrates, such as different types of flooring, pavement, and concrete, without the receive resonator needing to be re-tuned to the resonant frequency of the transmit resonator.

Figure 43:
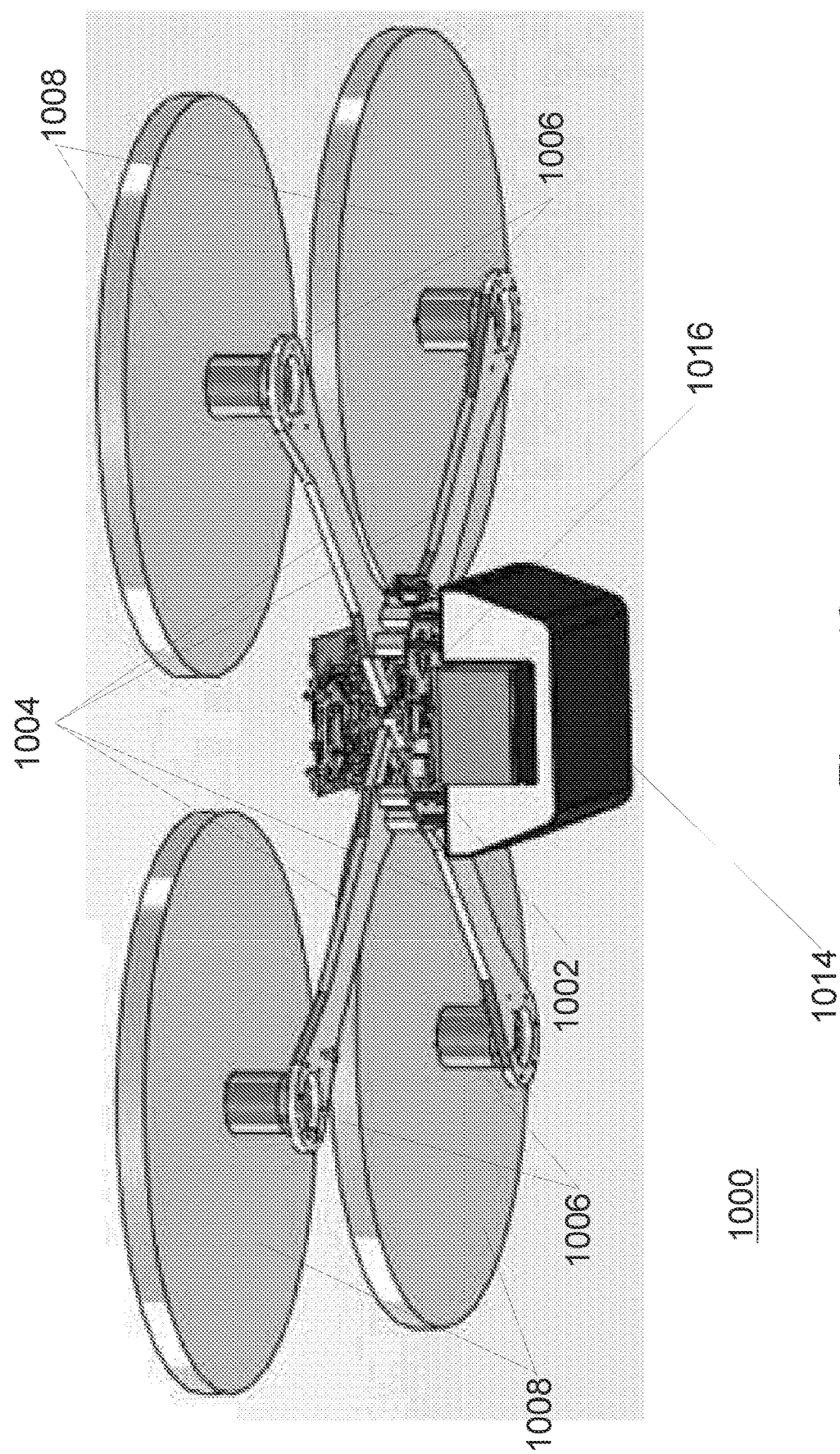
FIG. 43 is a perspective view of a UAV in accordance with an aspect of the disclosure.
Figure 44:
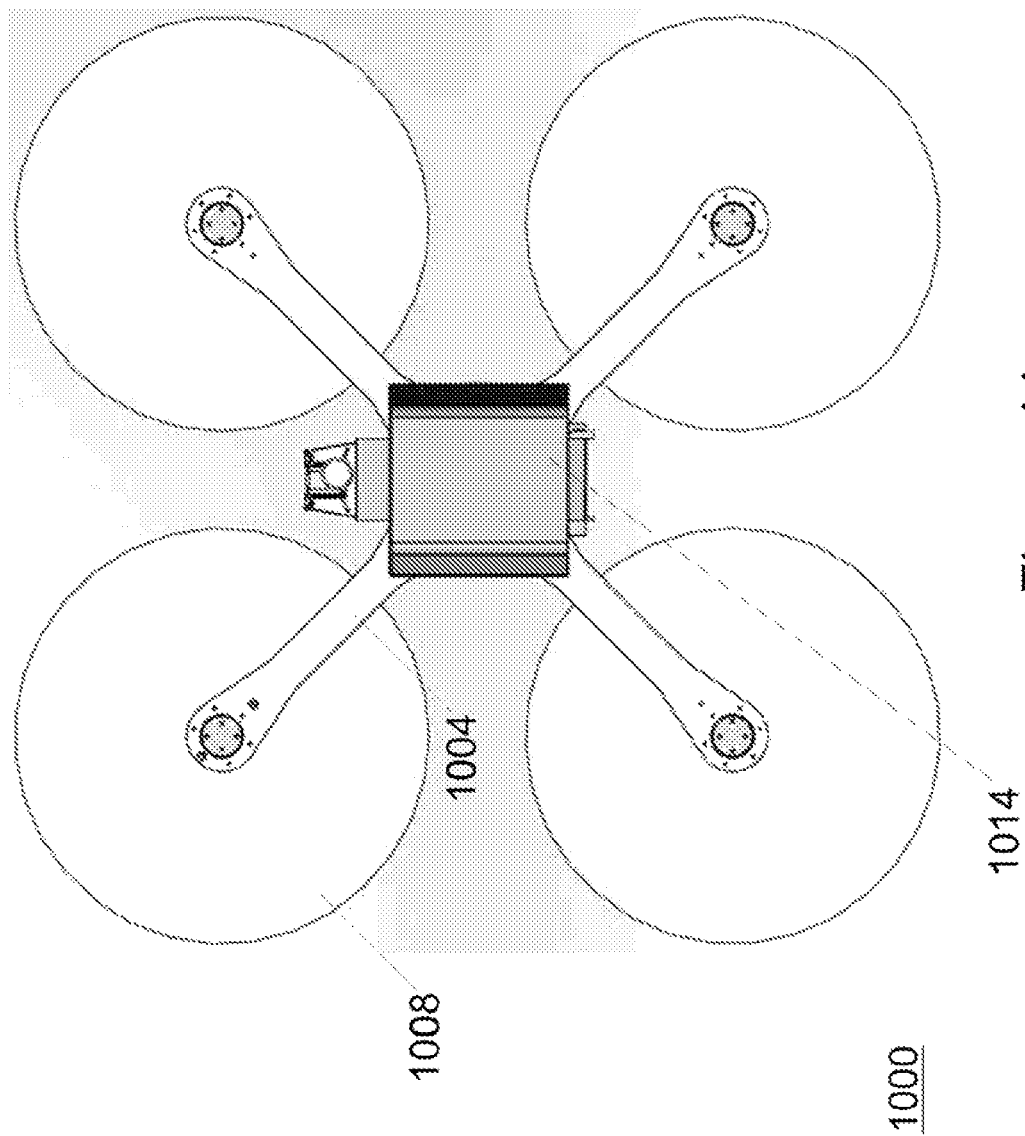
FIG. 44 is a bottom plan view of the UAV of FIG. 43.
Figure 45:
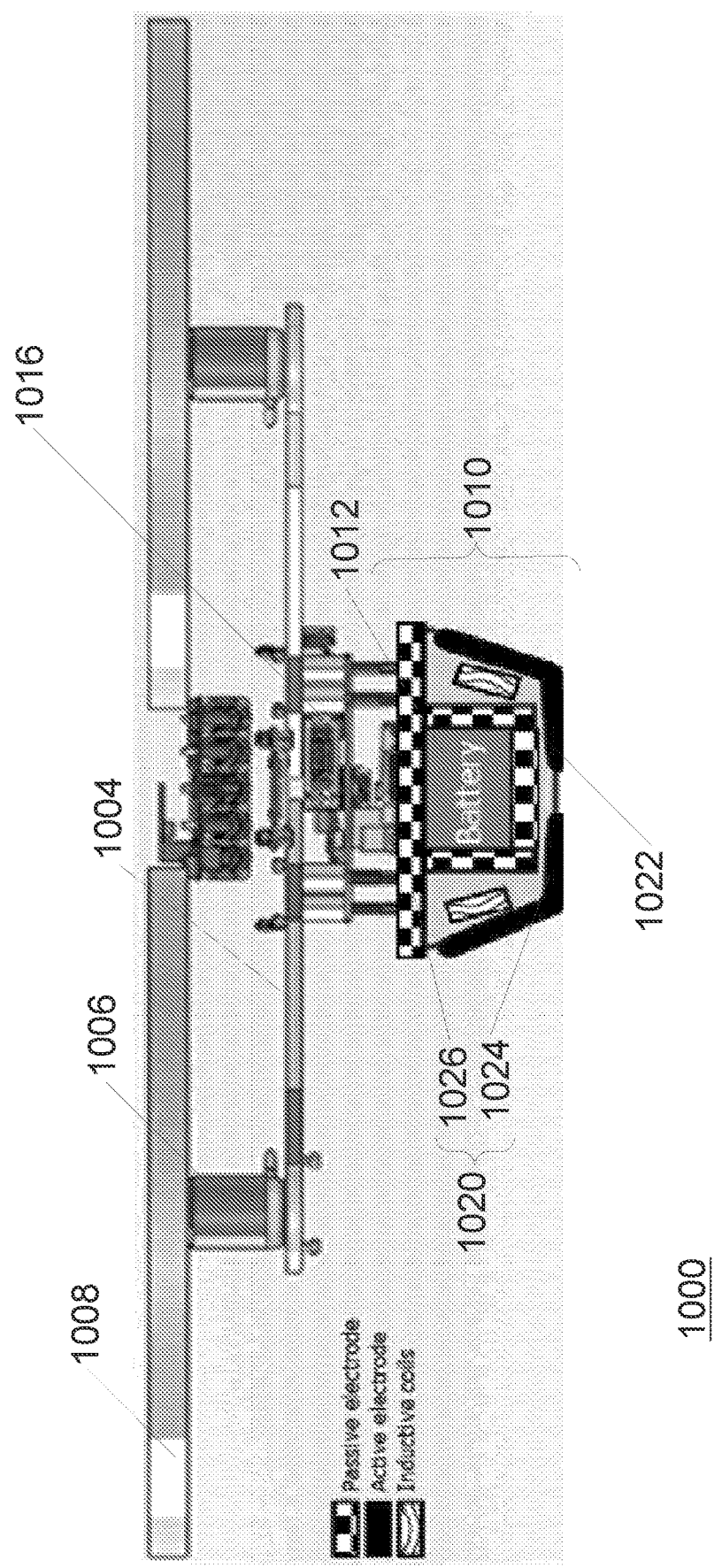
FIG. 45 is a side elevation view of the UAV of FIG. 43.

While one application has been described, one of skill in the art will appreciate that other applications are possible. The wireless power transfer systems 20, 120, 320 and 420 may be employed in other applications besides an autonomous vehicle. For example, the wireless power transfer system 320 may be employed in a UAV. Turning now to FIGS. 43 to 45 a UAV in accordance with an aspect of the disclosure is shown. The UAV is generally identified as reference character 1000. The UAV 1000 employs the wireless power transfer system 320 previously described. The UAV 1000 comprises a support structure, a propulsion system mounted to the support structure and configured to provide lift and thrust of the UAV 1000, a power system mounted to the support structure and configured to power the propulsion system, and a control system mounted to the support structure and configured to control the propulsion system and the power system.

In this embodiment, the support structure comprises a frame 1002 and four arms 1004. The frame 1002 is rigid. Each arm 1004 is coupled to the frame 1002. Each arm 1004 extends from the frame 1002. The arms 1006 are spaced generally equidistant from each other. One with skill in the art will appreciate that more or less arms 1004 can be used.

In this embodiment, the propulsion system comprises four motors 1006 and four propellers 1008. Each motor 1006 is affixed on the end of an arm 1006 opposite the frame 1002. Each motor 1006 is a brushless dc (BLDC) motor with electronic speed controllers (ESC) for variable thrust control. Each propeller 1008 is connected to the driving end of a respective motor 1006. In this embodiment, each propeller 1008 is a 28 cm long two-blade propeller encased in circular casing.

The power system comprises a receive resonator 1010 electrically connected to a battery 1012, casing 1014 and a receiver board 1016. The receive resonator 1010 and the battery 1012 are contained within the casing 1014. The battery 1012 is rechargeable. The casing 1014 is a dielectric material. The casing 1014 is thin enough such that it does not significantly affect power transfer to the UAV 1000.

Turning now to FIG. 45, a view of the UAV 1000 is shown with the casing 1014 partially removed. The receive resonator 1010 comprises a capacitor 1020 and two inductive coils 1022. The capacitor 1020 comprises two active electrodes 1024 and a passive electrode 1026 adjacent the active electrodes 1024. The passive electrode 1026 is configured to encompass the active electrodes 1024. The passive electrode 1026 at least partially eliminates environmental influences affecting the active electrodes 1024 and provides additional capacitance to the system, reducing the required inductance to resonate the receive resonator at the desired resonance frequency. The passive electrode 1026 is opposite an electric field source relative to the active electrodes 1024 as will be described. The passive electrode is 7.4 mm away from the active electrodes (D1). The inductive coils 1022 are electrically connected in series to the active electrodes 1024. The receive resonator 1010 is configured to extract power from a generated electric field via resonant electric field coupling. In this embodiment, the inductive coils 1022 are ferrite core inductors. One of skill in the art will appreciate that other types of inductive coils are possible. While two inductive coils 1022 have been shown, one of skill in the art will appreciate that one or more inductive coils may be employed.

The receiver board 1016 comprises a rectifier that converts the power extracted by the receive resonator 1010 via resonant electric field coupling to regulated DC power. The regulated DC power charges the battery 1012. The receiver board 1016 further comprises a wireless data transmitter. The wireless data transmitter wirelessly transmits telemetry data to a transmitter. The telemetry data comprises voltages and current at the receive resonator 1010. The transmission of telemetry data allows for tracking of the power extracted by the receive resonator 1010. Tracking the power extracted by the receive resonator 1010 is used to maintain and sustain a consistent charging rate of the battery 1012.

Figure 46:
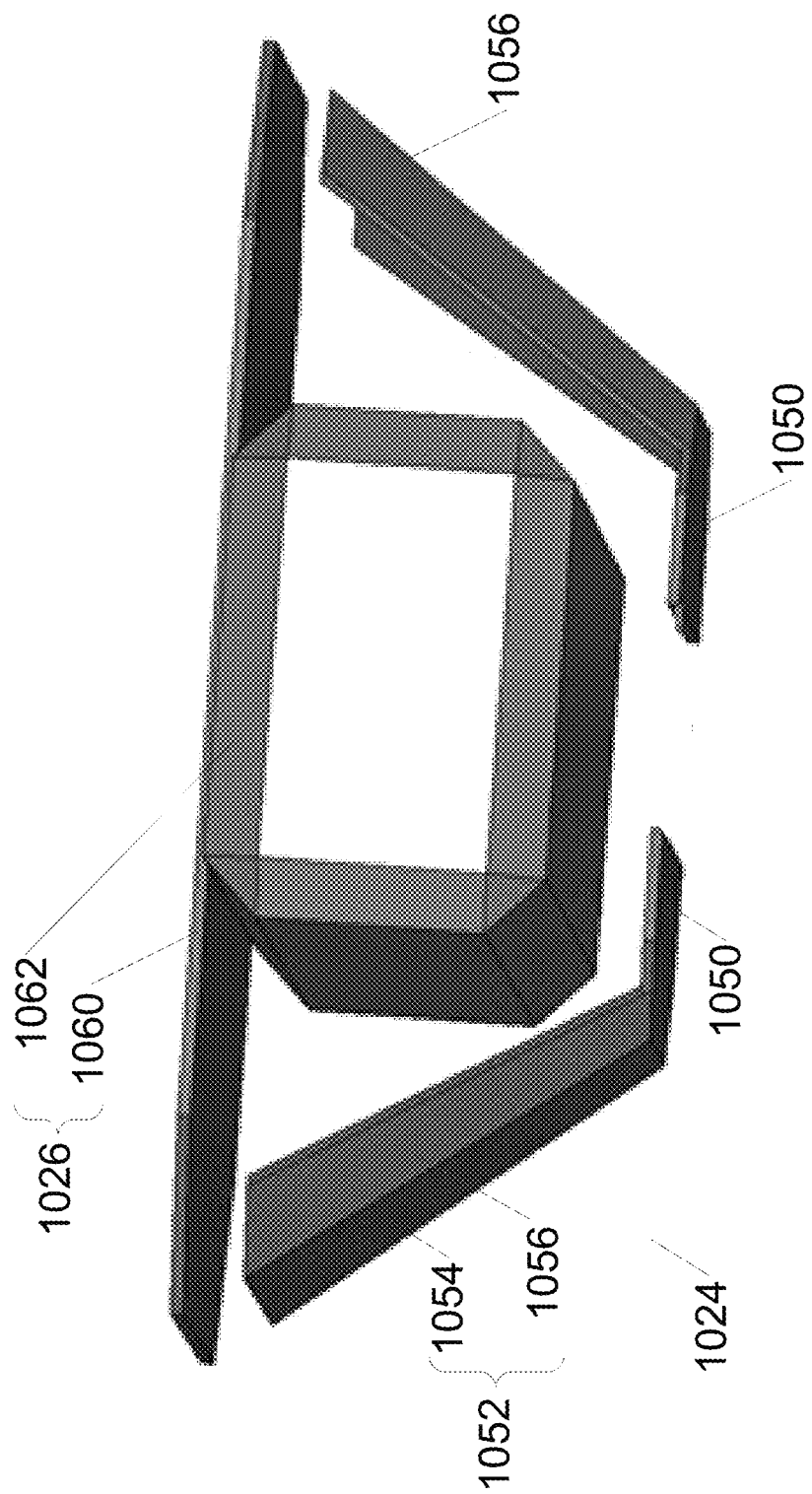
FIG. 46 is a perspective view of a capacitor of the UAV of FIG. 43.
Figure 47:
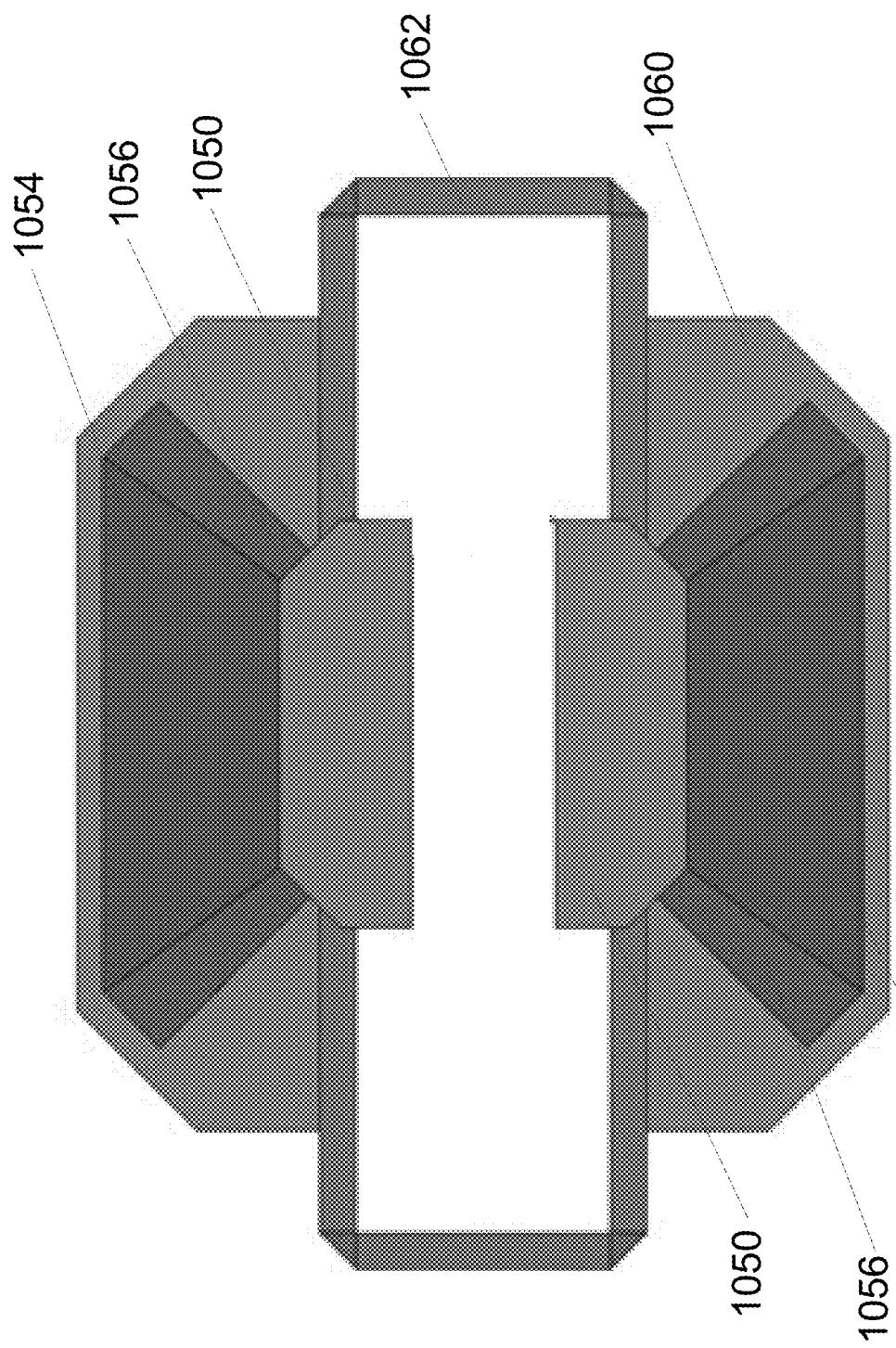
FIG. 47 is a bottom plan view of the capacitor of the UAV of FIG. 43.

Turning now to FIGS. 46 and 47, the capacitor 1020 of the UAV 1000 is shown in isolation. As previously stated, the capacitor 1020 comprises two active electrodes 1024 and a passive electrode 1026. In this embodiment, the active electrodes 1024 of the receive resonator 1010 are laterally spaced. The active electrodes 1024 are formed of electrically conductive material. While two active electrodes 1024 are depicted, one of skill in the art will appreciated that more electrodes may be used.

Each active electrode 1024 comprises an electrode plate 1050 and an arm 1052 extending diagonally from the electrode plate 1050. The arm 1052 has a central plate 1054 and two sidewalls 1056. Each sidewall 1056 extends from a longitudinal side of the central plate 1054. Each sidewall 1056 extends from the central plate 1054 at an approximate 135° angle to the central plate 1054.

The passive electrode 1026 encompasses the active electrodes 1024. In this embodiment, the passive electrode 1026 is located generally between the active electrodes 1024 and the receiver board 1016. The passive electrode 1026 comprises a passive electrode plate 1060 and a housing 1062. The passive electrode plate 1060 is attached to the housing 1062. In this embodiment, the passive electrode plate 1060 is a planar plate. The passive electrode plate 1060 is a metal plate. The housing 1062 is sized to contain the battery 1012. The housing 1062 is a metal housing. The battery 1012 is mounted within the housing 1062 of the passive electrode 1026.

One of skill in the art will appreciate that while the passive electrode 1026 is shown as comprising a passive electrode plate 1060 that is planar other configurations are possible. For example, the passive electrode plate 1060 may be non-planar and still encompass the active electrodes 1028 of the UAV 1022.

In this embodiment, the passive electrode 1026 is ungrounded. The passive electrode 1026 is isolated.

In this embodiment, the passive electrode 1026 is non-radiating.

In this embodiment, the passive electrode 1026 is configured to operate in the near field.

In this embodiment, the passive electrode 1026 is electrically small. The passive electrode 1026 is electrically small when the physical length of the passive electrode 1026 is less than $\lambda/10$. $\lambda$ is the wavelength of the source signal from a power source. For a source signal with a frequency of 13.56 MHz, $\lambda$ is approximately 22 m. Therefore, the passive electrode 1026 is electrically small when the physical length of the passive electrode 1026 is less than approximately 2.2 m.

The passive electrode 1026 is configured to encompass the active electrodes 1024 to at least partially eliminate environmental influences affecting the active electrodes 1024 such that the active electrodes 1024 are presented with a generally constant environment regardless of the actual environment that lies on the side opposite the passive electrode 1026 relative to the active electrodes 1024 and provide additional capacitance to the system, reducing the required inductance to resonate the system at the desired frequency.

In this embodiment, the minimum separation distance (Ds) between the passive electrode 1026 and the active electrodes 1024 is equal to 7.4 mm.

As previously stated, a surface charge is induced on the passive electrode 1026 in response to the electric field encountered by the receive resonator 1010. For metals (e.g. copper and aluminum), alloys (e.g. steel and brass) and other conductors like graphene or conducting fabrics the charge dissipation time is on the order of $10^{-19}$ s. The oscillation period of the electric field is approximately $10^{-9}$ s when the resonant frequency is 13.56 MHz. Thus, the charge dissipation time is many orders of magnitude less than the oscillation period of the electric field. Thus, the charge redistribution can be thought as being instantaneous.

The induced surface charge creates its own electric field that counteracts the electric field encountered by the receive resonator 1010, as negatively charged particles will be drawn to areas on the surface of high potential where their presence will neutralize the electric field parallel to the surface. Consequently, the net electric field acting on the surface of the passive electrode 1026 is perpendicular to the surfaces of the passive electrode 1026. Thus, the electric field extracted by the receive resonator 1010 terminates at the passive electrode 1026 and does not circumvent the passive electrode 1026. The conducting surfaces of the passive electrode 1026 opposite the active electrodes 1024 act as a boundary to the electric field generated by the passive electrode 1026. Therefore, a change in the environment on the opposite side of the passive electrode 1026 does not influence the electric field on other side.

As previously discussed, the surface charge induced on the passive electrode 1026 provides additional capacitance to the UAV 1000. The net electric field at the surface of the passive electrode 1026 acts as an energy storage medium for the UAV 1000. In this way, the active electrodes 1024 and the passive electrode 1026 form the capacitor 1020 with a capacitance greater than that of a capacitor comprising just the active electrodes 1024. The passive electrode 1026 and active electrodes 1024 behaving as the capacitor 1020 reduces the amount of inductance needed to resonate at the resonant frequency.

As previously stated, in this embodiment, the inductive coil 1022 of the receive resonator 1010 is a ferrite core inductor. Commonly used ferrite-based inductors are heavy, lossy, and limit power due to core saturation and heating. Therefore, it is desirable to reduce the required inductance of the UAV 1000. The additional capacitance from the passive electrode 1026 reduces the required inductance for each inductive coil 1022. Simulations of the UAV 1000 have shown that the passive electrode 1026 of the UAV 1000 increases the capacitance of the UAV 1000 by approximately 79% from 4.5 pF to 8.0 pF.

Figure 48:
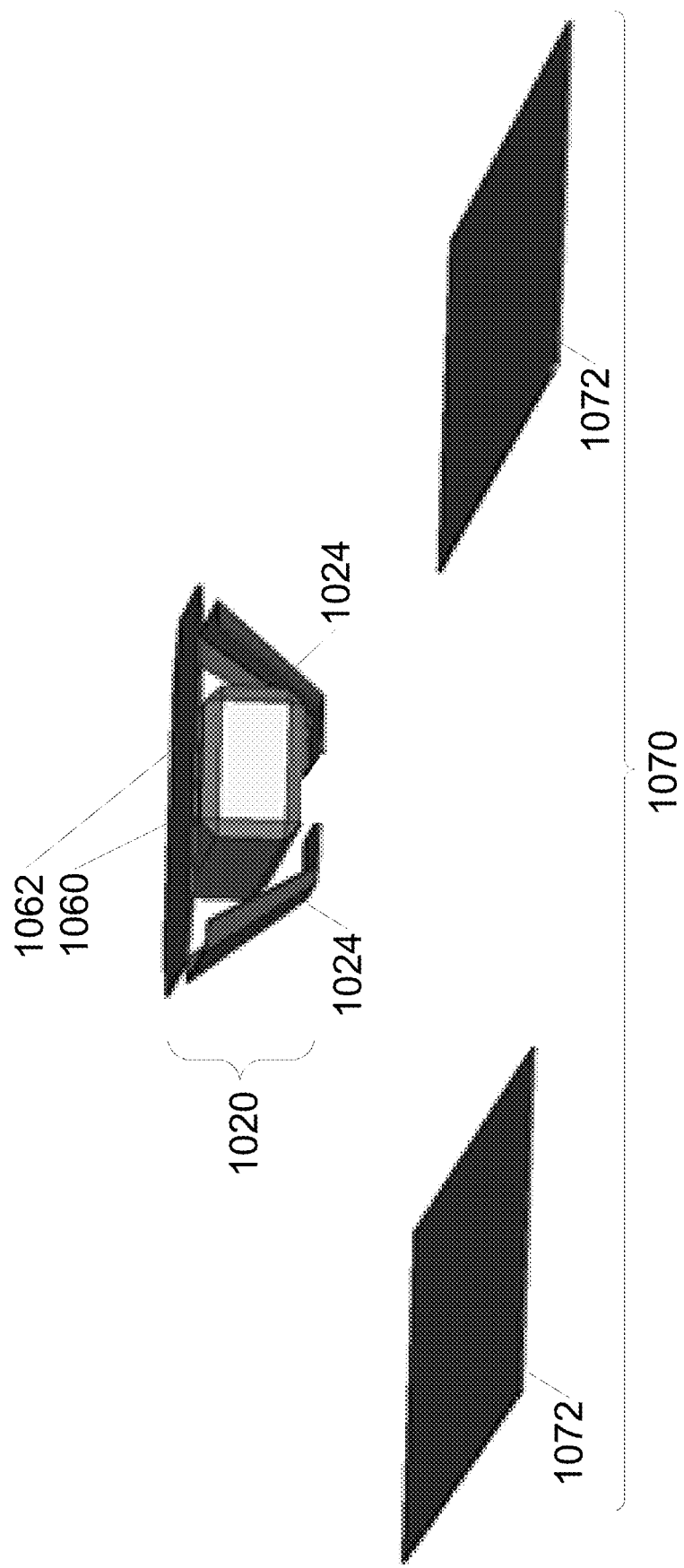
FIG. 48 is perspective view of a partial wireless power transfer system comprising the capacitor of the UAV of FIG. 43.

Turning now to FIG. 48, a partial wireless power transfer system is shown. The wireless power transfer system comprises the UAV 1010 and an electric field source. The capacitor 1020 of the UAV 1010 is shown in FIG. 48 with the electric field source. In this embodiment, the electric field source takes the form of a transmitter 1070. The transmitter 1070 comprises a transmit resonator. The transmit resonator comprises two active electrodes 1072 and two inductive coils (not shown) electrically connected to the active electrodes 1072. The active electrodes 1072 are electrically connected to the inductive coils in series. The active electrodes are laterally spaced. The active electrodes 1072 are coplanar. The active electrodes 1072 are conductors. In this embodiment, the conductors are elongate and generally rectangular planar plates. The conductors are formed of copper foil tape. While two active electrodes 1072 are depicted, one of skill in the art will appreciate that more active electrodes 1072 may be used. One of skill in the art will also appreciate that more than two inductive coils can be used. One of skill in the art will also appreciate that one inductive coil may be used.

The active electrodes 1072 of the transmit resonator and the inductive coils are configured to resonate and generate an electric field. The receive resonator 1010 is in tune with the resonant frequency of the transmit resonator. The receive resonator 1010 is configured to extract power from the transmitter 1070 via resonant electric field coupling. While the transmit resonator may also generate a magnetic field, little or no power is transferred via the generated magnetic field.

In this embodiment, the minimum separation distance (D) between the active electrodes 1072 of the transmit resonator and the active electrodes 1024 of the receive resonator 1010 is equal to 50 mm.

During operation, power is transferred from a power source to active electrodes of a transmit resonator. The power signal from the power source transmitted to the active electrodes 1072 of the transmit resonator via the inductive coils excites the transmit resonator causing the transmit resonator to generate an electric field. In this embodiment, the generated electric field is a near field. A differential voltage is applied on the active electrodes 1072 of the transmit resonator, which creates an electric field in the surrounding environment. When the receive resonator 1010 is placed within the generated electric field and is in tune with the resonant frequency of the transmit resonator, the receive resonator 1010 extracts power from the transmitter via resonant electric field coupling. The extracted power is then transferred from the receive resonator 1010 to the DC converter/regulator. The extracted power is then regulated/converted by the DC converter/regulator. The regulated/converted power is then used to charge the battery 1012.

In this embodiment, the active electrodes 1072 are positioned on a landing platform (not shown) for the UAV 1000. When landed there is a 50 mm gap between the active electrodes of the transmitter and the active electrodes of the receiver (D).

In this embodiment, the control system comprises a flight controller that communicates with the motors and the power system. The flight controller is housed in the center of the frame 1002.

The UAV 1000 further comprises a sensor system comprising at least one sensor configured to detect at least one parameter and generate a signal to the control system. The sensor is housed in the frame 1002. In this embodiment the sensor system comprises at least one of a global positioning system (GPS) receiver unit; and an inertial measurement unit (IMU) consisting of an accelerometer, gyroscope and magnetometer.

In this embodiment, the control system comprises a flight controller that communicates with the motors and the power system. The flight controller is housed in the center of the frame 1002.

While a propulsion system comprising four motors 1006, four propellers 1008 and four arms 1004 has been shown, one of skill in the art will appreciate that one or a plurality of motors, propellers and arms may be used.

One skilled in the art will recognize that the passive electrode need not be planar, for example the passive electrode could be cylindrical to conform to cylindrical active electrodes or to eliminate the environmental influence of the contents of a pipe.

One skilled in the art will recognize that the passive electrode may be in the form of a ring when paired with active electrodes of ring form.

One skilled in the art will recognize that the separation between the passive electrode and the active electrodes may be maintained using spacers and/or standoffs.

One skilled in the art will recognize that the passive electrode may be perforated, but the effectiveness of the passive electrode and added capacitance will decrease with increasing perforation.

One of skill in the art will appreciate that while specific dimensions have been described these are examples and the dimensions described may be varied depending on the particular environment.

One of skill in the art will appreciate that while specific embodiments of unmanned vehicles are provided, that various other applications and environments are possible.

Although embodiments have been described above with reference to the figures, those of skill in the art will appreciate that variations and modifications may be made without departing from the scope thereof as defined by the appended claims.

What is claimed is:

1. A resonator of a wireless power transfer system, the resonator comprising:
    a capacitor comprising:
        at least two active electrodes comprising an inner arcuate electrode and an outer arcuate electrode; and
        a passive electrode adjacent to the active electrodes and configured to encompass the active electrodes to at least partially eliminate environmental influences affecting the active electrodes; and
    at least one inductor electrically connected to the active electrodes,
    wherein the at least one inductor is configured to excite the capacitor to generate an electric field to transfer power or to extract power from a generated electric field,
    wherein the passive electrode provides additional capacitance to the capacitor of the resonator and lowers the inductance of the inductor required to resonate the system.

2. The resonator of claim 1, wherein surface charge on the passive electrode creates an electric field configured to counteract the generated electric field.

3. The resonator of claim 1, wherein the resonator forms part of a transmitter configured to wirelessly transfer power, and wherein the resonator is configured to generate the electric field.

4. The resonator of claim 3, wherein the resonator is configured to generate a resonant electric field.

5. The resonator of claim 3, wherein an area of the passive electrode is greater than an area of the active electrodes of the resonator by at least the area between the active electrodes of the resonator.

6. The resonator of claim 1, wherein the resonator is a transmit resonator.

7. The resonator of claim 1, wherein the resonator forms part of a receiver configured to wirelessly extract power, and wherein the resonator is configured to extract power from the generated electric field via resonant electric field coupling.

8. The resonator of claim 7, wherein the resonator is configured extract power from a generated resonant electric field.

9. The resonator of claim 1, wherein the active electrodes are concentric.

10. The resonator of claim 1, wherein the passive electrode is an elongate plate or a disc.

11. The resonator of claim 1, wherein the passive electrode is a ring with an inner radius that is less than or equal to the inner radius of the inner arcuate electrode.

12. The resonator of claim 1, wherein the passive electrode comprises dissipative material affixed to edges of the passive electrode and/or along the perimeter of the passive electrode.

13. The resonator of claim 1, wherein the inductor is located on the opposite side of the passive electrode relative to the active electrodes, and wherein the inductor is electrically connected to the active electrode through a hole in the passive electrode.

14. The resonator of claim 1, wherein the capacitor further comprises:
a substrate upon which the active electrodes are affixed; and
an actuator extending between the substrate and the passive electrode, the actuator controllable to vary a separation distance between the active electrodes and the passive electrode.

15. The resonator of claim 14, wherein the capacitor further comprises:
at least two telescopic supports extending between the substrate and the passive electrode, the supports configured to extend or telescope as the separation distance between the active electrodes and the passive electrode is varied.

16. The resonator of claim 14, wherein actuation of the actuator is controlled by a microcontroller.

17. The resonator of claim 1, wherein the passive electrode is ungrounded.

18. A wireless power transfer system comprising the resonator of claim 1.

19. An unmanned aerial vehicle (UAV) comprising:
a frame;
a propulsion system mounted to the frame and configured to provide lift and thrust of the UAV;
a power system mounted to the frame and configured to power the propulsion system, the power system comprising:
a resonator comprising:
a capacitor comprising:
at least two active electrodes comprising an inner arcuate electrode and an outer arcuate electrode; and
a passive electrode adjacent to the active electrodes and configured to encompass the active electrodes to at least partially eliminate environmental influences affecting the active electrodes, wherein the passive electrode is opposite an electric field source relative to the active electrodes; and
at least one inductor electrically connected to the active electrodes, wherein the at least one inductor is configured to excite the capacitor to extract power from a generated electric field via resonant electric field coupling, wherein the passive electrode provides additional capacitance to the capacitor of the resonator and lowers the inductance of the inductor required to resonate the system; and
a control system mounted to the frame configured to control the propulsion system and the power system.

20. A wireless power transfer system comprising:
the UAV of claim 19; and
a transmit resonator comprising:
at least two active electrodes; and
at least one inductor electrically connected to the active electrodes,
wherein the at least one inductor is configured to excite the at least two active electrodes to generate an electric field to transfer power to the UAV via resonant electric field coupling.

* * * * *